US009820120B2

(12) United States Patent
deCharms

(10) Patent No.: US 9,820,120 B2
(45) Date of Patent: *Nov. 14, 2017

(54) MOBILE SECURITY TECHNOLOGY

(71) Applicant: Christopher deCharms, Montara, CA (US)

(72) Inventor: Christopher deCharms, Montara, CA (US)

(*) Notice: Subject to any disclaimer, the term of this patent is extended or adjusted under 35 U.S.C. 154(b) by 37 days.

This patent is subject to a terminal disclaimer.

(21) Appl. No.: 14/686,069

(22) Filed: Apr. 14, 2015

(65) Prior Publication Data

US 2016/0192166 A1    Jun. 30, 2016

Related U.S. Application Data

(63) Continuation of application No. 14/476,629, filed on Sep. 3, 2014, now Pat. No. 9,014,661, which is a
(Continued)

(51) Int. Cl.
*H04W 4/22* (2009.01)
*H04M 1/725* (2006.01)
(Continued)

(52) U.S. Cl.
CPC ............ *H04W 4/22* (2013.01); *G06Q 50/265* (2013.01); *G08B 13/196* (2013.01);
(Continued)

(58) Field of Classification Search
CPC ....... H04W 4/22; H04W 76/023; H04W 4/02; H04W 4/021; H04N 7/148; H04N 7/15; H04N 7/147; H04L 67/26; G08B 13/196; G06Q 50/265; H04M 1/72536; H04M 2203/306; H04M 2201/50; H04M 2242/30; H04M 2242/04; H04M 3/567
See application file for complete search history.

(56) References Cited

U.S. PATENT DOCUMENTS 7,149,533 B2    12/2006 Laird et al.
8,749,634 B2     6/2014 Taylor et al.
(Continued)

OTHER PUBLICATIONS

BSAFE, Meet bSafe, Mar. 26, 2014, Available Online at: https://web.archive.org/web/20143261342 45/http://getbsafe.com/features/, Accessed Sep. 2, 2014, 5 pages.
(Continued)

*Primary Examiner* — Marcos Torres
(74) *Attorney, Agent, or Firm* — Krenz Patent Law, LLC

(57) ABSTRACT

In one implementation, a computer-implemented method includes determining a location of a mobile computing device using one or more of a plurality of data sources; communicating, by the mobile computing device, with another computing device as part of a two-way video chat session over a first network connection, the communicating including transmitting the location of the mobile computing device; displaying, as part of the two-way video chat session, real-time video from the other computing device; recording video using one or more cameras that are accessible to the mobile computing device; and transmitting, over a second network connection, the video to a remote storage system for persistent storage.

53 Claims, 27 Drawing Sheets

Related U.S. Application Data continuation-in-part of application No. PCT/US2014/036871, filed on May 5, 2014.

(60) Provisional application No. 61/924,901, filed on Jan. 8, 2014, provisional application No. 61/872,690, filed on Aug. 31, 2013, provisional application No. 61/819,575, filed on May 4, 2013.

(51) Int. Cl.
| | |
|---|---|
| *G06Q 50/26* | (2012.01) |
| *H04N 7/14* | (2006.01) |
| *G08B 13/196* | (2006.01) |
| *H04W 4/02* | (2009.01) |
| *H04L 29/08* | (2006.01) |
| *H04N 7/15* | (2006.01) |
| *H04W 76/02* | (2009.01) |
| *H04L 29/06* | (2006.01) |
| *H04M 3/56* | (2006.01) |

(52) U.S. Cl.
CPC ...... *H04L 65/1059* (2013.01); *H04L 65/1069* (2013.01); *H04L 65/1096* (2013.01); *H04L 65/403* (2013.01); *H04L 67/18* (2013.01); *H04L 67/26* (2013.01); *H04M 1/72536* (2013.01); *H04N 7/147* (2013.01); *H04N 7/148* (2013.01); *H04N 7/15* (2013.01); *H04W 4/02* (2013.01); *H04W 4/021* (2013.01); *H04W 76/023* (2013.01); *H04M 3/567* (2013.01); *H04M 2201/50* (2013.01); *H04M 2203/306* (2013.01); *H04M 2242/04* (2013.01); *H04M 2242/30* (2013.01)

(56) References Cited

U.S. PATENT DOCUMENTS

| | | | |
|---|---|---|---|
| 2007/0092070 A1* | 4/2007 | Croy | H04M 3/42348 379/45 |
| 2008/0062248 A1* | 3/2008 | Sahashi | H04M 11/085 348/14.01 |
| 2008/0267360 A1 | 10/2008 | Spector | |
| 2011/0111728 A1 | 5/2011 | Ferguson et al. | |
| 2011/0117878 A1* | 5/2011 | Barash | G08B 21/0211 455/404.2 |
| 2011/0238763 A1 | 9/2011 | Shin et al. | |
| 2012/0087212 A1 | 4/2012 | Vartanian et al. | |
| 2012/0229624 A1* | 9/2012 | Calman | G06F 19/3456 348/135 |
| 2012/0310956 A1 | 12/2012 | Huhn | |
| 2012/0329420 A1 | 12/2012 | Zotti et al. | |
| 2013/0040600 A1* | 2/2013 | Reitnour | G01S 19/17 455/404.2 |
| 2013/0162852 A1 | 6/2013 | Boyle et al. | |
| 2013/0198394 A1 | 8/2013 | Dorso et al. | |
| 2013/0229528 A1 | 9/2013 | Taylor et al. | |
| 2013/0230293 A1 | 9/2013 | Boyle et al. | |
| 2013/0242105 A1 | 9/2013 | Boyle et al. | |
| 2013/0303105 A1* | 11/2013 | Jo | H04N 7/183 455/404.1 |
| 2014/0120860 A1 | 5/2014 | Amis | |
| 2014/0120863 A1 | 5/2014 | Ferguson et al. | |
| 2014/0143729 A1 | 5/2014 | Myers et al. | |
| 2014/0148117 A1 | 5/2014 | Basore et al. | |
| 2014/0148135 A1 | 5/2014 | Haney | |
| 2014/0155017 A1 | 6/2014 | Fan et al. | |
| 2014/0155018 A1 | 6/2014 | Fan et al. | |
| 2014/0162590 A1 | 6/2014 | DiPerna et al. | |
| 2014/0171013 A1 | 6/2014 | Varoglu et al. | |
| 2014/0247154 A1 | 9/2014 | Proud | |
| 2014/0266700 A1 | 9/2014 | Reske | |
| 2014/0266810 A1 | 9/2014 | Hatton | |
| 2014/0273913 A1 | 9/2014 | Michel et al. | |
| 2014/0273915 A1 | 9/2014 | Corley et al. | |
| 2014/0273919 A1 | 9/2014 | Li | |
| 2014/0282934 A1 | 9/2014 | Miasnik et al. | |
| 2014/0285337 A1 | 9/2014 | Gebhardt | |
| 2014/0308914 A1 | 10/2014 | Lee et al. | |
| 2014/0308915 A1 | 10/2014 | Reitnour et al. | |

OTHER PUBLICATIONS

Challenge Post, A Mobile App, Sep. 2, 2014. Available Online at: https://web.archive.org/web/201440902153540/http://challengepost.comm/software/onwatch/, Accessed Sep. 2, 2014, 5 pages.

Circle of 6, Circle of 6 App, Mar. 29, 2013, Available Online at: https://web.archive.org/web/20130329032708/http://www.circleof6app.com/, Accessed Sep. 2, 2014, 1 page.

Emergensee, Personal Safety App—Features—Personal Security App—EmergenSee, Jun. 25, 2014, Available Online at: https://web.archive.org/web/20140625095216/http://emergensee.com/features-description/, Accessed Sep. 2, 2014, 3 pages.

Eye Got You Covered, Keeping Families Safe. Wherever You Go, eyeGoes, May 17, 2014, Available Online at: http://www.eyegotyoucovered.com/?pi=1, Accessed Aug. 26, 2014, 2 pages.

Federal Bureau of Investigation, FBI-Child ID App, Sep. 24, 2011, Available Online at: https://web.archive.org/web/20110924074304/http://www.fbi.gov/news/stories/2011/august/child_080511, Accessed Sep. 2, 2014, 2 pages.

Friend Finder, Find My Friends, Aug. 12, 2014, Available Online at: https://play.google.com/store/apps/details?id=com.fsp.android.friendlocator, Accessed Aug. 26, 2014, 3 pages.

Google Mobile, Google Latitude, Mar. 26, 2010, Available Online at: https://web.archive.org/web/20100326151416/http://www.google.com/mobile/latitude/, Accessed Sep. 3, 2014, 2 pages.

Guard My Angel, Guard My Angel Android App Review-Daily/AppShow, Jan. 17, 2012, Available at: http://www.youtube.com/watch?v=TFFW2mp36kl, Accessed Aug. 25, 2014, 2 pages.

Guardly, Enterprise Safety Solutions, Jul. 7, 2014, Available Online at: https://web.archive.org/web/20140701201421/https://www.guardly.com/solution/industry/enterprise/, Accessed Sep. 2, 2014, 5 pages.

Guardly, Indoor Positioning System (IPS) for Indoor Location Safety, Jul. 2, 2014, Available Online at: https://web.archive.org/web/201407020224926/http://www.guardly.com/technology/indoor-position-system, Accessed Sep. 2, 2014, 4 pages.

Guardly, Safety Apps for Emergency Reporting & Alerting, Sep. 6, 2013, Available Online at: https://www.guardly.com/technology/mobile-safety-apps/, Accessed Aug. 26, 2014, 6 pages.

Guardly, Situational Awareness & Incident Management—Guardly Command, Jul. 1, 2014, Available Online at: https://web.archive.org/web/20140101190637/https://www.guardly.com/technology/guardly/com, Accessed Sep. 2, 2014, 4 pages.

Hongkiat.com, Top 5 Mobile Apps to Keep Your Kids Safe, Apr. 9, 2013, Available Online at: https://web.archive.org/web/20130419110733/http://www.hongkait.com/blog/kid-safety-mobile-apps/, Accessed Sep. 2, 2014, 7 pages.

Ice Black Box, It's not just an app. It's a movement, Aug. 11, 2014, Available Online at: https://www.iceblackbox.com/, Accessed Sep. 2, 2014, 4 pages.

IHound, New Apps for Your Mobile Phone: September Edition—new "geofencing" feature, Sep. 6, 2010, Available Online at:—http://readwrite.com/2010/09/06/new_apps_for_your_mobile_phone_september_edition, Accessed Sep. 3, 2014, 10 pages.

International Search Report and Written Opinion for International Application No. PCT/US2014/036871, Blaine R. Copenheaver, Authorized Officer, ISA/US, completed Oct. 28, 2014, dated Nov. 13, 2014, 10 pages.

IWitness, How it Works, Sep. 2, 2014, Available Online at: https://web.archive.org/web/20140902154354/https:www.iwitness.com/content-how-it-works/, Accessed Sep. 2, 2014, 11 pages.

Kik, Kik Texting reimagined for smartphones, Feb. 4, 2012, Available Online at: http://web.archive.org/web/20120204224647/http:www.kik.com/, Accessed Aug. 26, 2014, 5 pages.

(56) References Cited

OTHER PUBLICATIONS

Life Line Response, next Generation Personal Safety, Jan. 6, 2014, Available Online at: https://web.archive.org/web/20140106113644/http://llrespone.com, Accessed Sep. 2, 2014, 2 pages.

LIFE360, The New Family Circle, Oct. 12, 2013, Available Online at: https://www.archive.org/web/20131012121431/https://www.life360.com/free/, Accessed Aug. 25, 2014, 6 pages.

Livesafe, LiveSafe Mobile, Sep. 22, 2013, Available Online at: https://web.archive.org/web/20130922063023/http://www.livesafemobile.com/, Accessed Sep. 2, 2014, 2 pages.

Mamabear, Your All-In-One Worry-Free Parenting App, Mar. 2, 2013, Available Online at: https://web.archive.org/web/2013032224617/http://mamabearapp.com/, Accessed Sep. 2, 2014, 2 pages.

Mobilekids, Make Traffic education exciting and interactive!, Sep. 29, 2012, Available Online at: https://web.archive.org/web/20120929004645/http://ww.mobilekids.net/de-EN/actions/iphone-app, Accessed on Sep. 2, 2014, 2 pages.

My Force, Get Powerful Personal Safety—24/7, Nationwide, Jun. 29, 2012, Available Online at: http://info.myforce.com/the-service/service-description/, Accessed on Aug. 26, 2013, 2 pages.

Norton, Parental Monitoring Software, Mar. 29, 2014, Available Online at: https://web.archive.org/web/20140329093237/https://onlinefamily.norton.com/familysafety/features.fs, Accessed Sep. 2, 2014, 2 pages.

React Mobile, Features, Sep. 2, 2014, Available Online at: https://web.archive.org/web/201409/02155648/http://reactmobile.com/features/, Accessed Sep. 2, 2014, 5 pages.

Red Panic Button App, Press when in trouble—for Android and IPhone, May 13, 2013, Available Online at: https://web.archive.org/web/20130513141944/http://redpanicbutton.com/, Accessed Sep. 2, 2014, 1 page.

Safetrek, Proactive Mobile Protection for Citizens, Aug. 7, 2013, Available Online at: https://web.archive.org/web/20130807092542/http://watchovermeapp.com/, Accessed Sep. 2, 2014, 3 pages.

Sheknows, Tracking your children—smart or invasive?, May 30, 2012, Available Online at: https://web.archive.org/web/20120630053956/http://www.sheknows.com/parenting/articles961071/should-you-track-your-child, Accessed Sep. 2, 2014, 4 pages.

Spot Satellite GPS Messenger-Off-the-grid messaging, emergency alerts and GPS tracking all done via satellite, Aug. 11, 2013, Available Online at: https://web.archive.org/web/20130811002945/http://www.findmespot.com/en/?cid=102, Accessed Sep. 2, 2014, 2 pages.

Staysafe, Smart Personal Safety, May 3, 2013. Available Online at: https://web.archive.org/web/121427/http://www.staysafeapp.com/staysafe-personal/, Accessed Sep. 2, 2014, 5 pages.

Sygic, Family GPS Tracker, Nov. 17, 2013, Available Online at: https://web.archive.org/web/20131117164131/http://www.sygic,com/en/family, Accessed Sep. 2, 2014, 2 pages.

Tango, Free calls and messages everywhere, Aug. 22, 2014, Available Online at: http://www.tango.me/, Accessed Aug. 26, 2014, 5 pages.

Voxer, Push-to-Talk Walkie Talkie App for Company Communication, Jul. 14, 2014, Available Online at: http://voxer.com/?utm_medium=Voxer-Brand-Exact&utm_source=Google&utm_term=Voxer&gclid=CKe0ntqrscACFUVo7AodqSkAkg, Accessed Aug. 26, 2014, 5 pages.

Watch Over Me, The App That Helps Save Girls in Danger, Aug. 12, 2013, Available Online at: https://web.archive.org/2013081213946/http://watchovermeapp.com/, Accessed Sep. 2, 2014, 3 pages.

Whatsapp, Take WhatsApp with you, Jul. 7, 2014, Available Online at: http://www.whatsapp.com/download/, Accessed Aug. 26, 2014, 1 page.

European Patent Office, Supplementary Partial European Search Report, EP Application No. 14794088.6, dated Nov. 17, 2016, 7 pages.

Maqbool, Ata, Australian Patent Office, Australian Examination Report No. 1 for standard patent application; AU Application No. 2014262897, dated Jun. 7, 2017, 4 pages.

Manthey, Axel, European Patent Office, The Hague, Supplementary European Search Report and Opinion, Feb. 21, 2017, 13 pages.

\* cited by examiner

READY MODE

CALLER MODE
(Screen seen by Caller)

Initiate Two-Way Audio/Video Communication

Caller Presses Button, Sending Push Notification, Call Request, or Connecting Friend or Responder RESPONDER MODE
(Screen seen by Responder)

RESPONDER MODE
(High Resolution)

RESPONDER MODE
(Map / Menu)

Initiate Two-Way Instant Messaging

MOBILE SECURITY TECHNOLOGY

CROSS-REFERENCE TO RELATED APPLICATIONS

This application is a continuation of U.S. application Ser. No. 14/476,629, which is entitled "Mobile Security Technology" and was filed Sep. 3, 2014, which is a continuation-in-part of International Application No. PCT/US2014/036871, which is entitled "Mobile Security Technology" and was filed on May 5, 2014; and also claims the benefit of U.S. Provisional Application Ser. No. 61/924,901, which is entitled "Mobile Security Technology" and was filed on Jan. 8, 2014. The International Application No. PCT/US2014/036871 to which priority is claimed, itself claims the benefit of the aforementioned provisional application as well as U.S. Provisional Application Ser. No. 61/872,690, which is entitled "Mobile Security Technology" and was filed on Aug. 31, 2013; and U.S. Provisional Application Ser. No. 61/819,575, which is entitled "Mobile Security Technology" and was filed on May 4, 2013. The entire contents of each of these applications to which priority is claimed, either directly or indirectly, is hereby incorporated by reference.

TECHNICAL FIELD

This document generally describes computer-based technologies related to security. For example, this document describes, among other things, mobile computing devices that provide security features through the use of a variety of computer-based technologies, such as one-way, two-way, or multi-party video chat and/or video conferencing technology.

BACKGROUND

Computer-based technologies have been used for security and video surveillance. For example, computer-based technology has been developed allow for users to stream live video feeds from security cameras over the internet and on remote computing devices, such as laptop computers, desktop computers, and mobile computing devices.

SUMMARY

This document generally describes computer-based technologies to provide security and assistance to users whenever they are in need of such services, such as when users are in dangerous or uncertain physical situations in which their safety or the safety of others may be in jeopardy. For example, the disclosed technologies can allow for users to quickly obtain access to and to involve appropriate remote parties in their current physical situation in an effort to avoid any harm from befalling the users, while at the same time storing information (e.g., video recording) regarding the incident at a secure and remote storage facility. Such access and involvement of remote parties can be provided through the use of any of a variety of appropriate techniques, such as two-way remote monitoring, remote imaging, audio and video conferencing and remote control technology on mobile computing devices, such as cell phones, smartphones, personal digital assistants (PDAs), tablets, wearable computing devices (e.g., GOOGLE GLASS, Looxcie, GoPro), and/or other devices that can provide connection between users and increase users security. For example, a user may initiate two-way video conferencing with a friend, police, or emergency responder as a means of allowing the responder to help facilitate a secure outcome for the user.

Implementations of the disclosed technology can be methods that include one or more of the following features: two-way audiovisual teleconferencing between two computing devices over a network connection (A); transmitting and receiving, by an application running on a mobile computing device, real-time audio and video with another computing device over a network connection (B); communicating, by a mobile computing device, with another computing device as part of a two-way video chat session over a network connection; and displaying, as part of the two-way video chat session, real-time video from the other computing device while transmitting real-time video from the mobile computing device to the other computing device (C); the network connection can be a peer-to-peer connection (D); identifying a plurality of candidate responders, and selecting a particular candidate responder based, at least in part, on one or more factors (E); the factors can include one or more of: a user location, a responder location, responder ratings, responder skills and/or training, type of situation, and a predefined list of responders (F); determining a location of a mobile computing device using one or more of a plurality of data sources (G); the data sources can include one or more of: GPS, WiFi, beacon signals, other data transmitted by radiofrequency that is useable to electronically locate a device (H); determining or receiving a geographic location for a user, and identifying, using a database of locations and corresponding responders, one or more appropriate responders based, at least in part, on said geographic location (I); the database of locations can be a PSAP database (J); receiving a geographic location for a user, and determining, using a database of locations and corresponding licensure status, whether said user is located within one or more licensed jurisdictions (L); the licensed jurisdiction can include an area where an entity has been granted a right to perform a service (M); receiving a request to connect a mobile computing device with a responder service, identifying an appropriate responder service based on the location of the mobile computing device, and initiating contact with the appropriate responder service on behalf of the mobile computing device (N); the request can be one or more of: a text message, a verbal request, selection of call 911 feature, and can be received over peer-to-peer network connection (O); the location can be one or more of a geolocation and real-time location updates (P); initiating contact can include one or more of: establish communication session between mobile device and emergency service, and communication on behalf of the mobile computing device (Q); the responder service can be an emergency dispatch system (R); receiving a message and the location of the mobile computing device of a user, determining an appropriate emergency responder service based on the location, initiating a telephone call to appropriate the emergency responder service on behalf of the user, and transmitting the message to the emergency responder service (S); the message can be sent with one or more of the user's profile and the user's contact information, and can be included with initiating three-way communication with the user (T); receiving a text message requesting emergency responder services for a user of a mobile computing device, the text message identifying a location of the mobile computing device, determining an appropriate emergency responder service based on the location, and initiating a telephone call to appropriate the emergency responder service on behalf of the user (U); receiving a message and the location of the mobile computing device of a user, determining an appropriate responder service based on the location, initiating electronic communication with the appropriate the responder service for the user, and transmitting the message to the responder service (V); the electronic communication can include one or more of: communication between the mobile computing device and the emergency responder service, communication between the central system and the emergency responder service, and the electronic communication can include information about the user (W); the responder service can be an emergency dispatch system (X); providing the user's profile, providing the user's contact information, and/or initiating three-way communication with the user (Y); recording video using one or more cameras that are accessible to a computing device, modifying the video by adding one or more features, and transmitting the modified video with the features to a remote storage system for persistent storage (Z); the one or more cameras can include cameras connected to the computing device and wirelessly connected to the computing device (AA); the features can include one or more of: identifying features, security features, and verification features (AB); the identifying features can include user identification (AC); the security features can include encryption (AD); the verification features can include one or more of: a timestamp, a digital watermark, and location information (AE); recording a video using one or more cameras mounted to a user's body that are accessible to a computing device (AF); receiving data recorded by a computing device during an incident, identifying one or more features from the data, and determining an identity of an assailant involved in the incident based on comparison of the one or more features with information stored in one or more data sources (AG); the data can include one or more of: video data, image data, audio data, and other data detected from wireless devices (AH); the features can include one or more of: face, voice, gate, proportions, and device identity (AI); the data sources can include one or more of: criminal databases, law enforcement data sources, social network data sources, and user data (AJ); the user data can include one or more of contacts, friend lists, and a user's images (AK); recording video using one or more security cameras that are accessible to a mobile computing device, and transmitting the video to a remote storage system for persistent storage (AL); the security cameras can include one or more of remote camera and camera acting in security camera mode (AM); receiving, at a computing device, input to send a push notification to another device, determining a current location of the computing device, and transmitting a push notification to the other device that includes the current location (AN); the other device can be specified by user input or determined based on multifactor input (AO); receiving, at a computing device, input to send a push notification to another device, determining a current location of the other device, determining whether the other device's current location is within a specified distance from a specified location, and if the other device's current location is within a specified distance from a specified location, transmitting a push notification to the other device that includes the current location (AP); receiving, at a computing device, a location of a responder through a network connection, and displaying the location of the responder on the computing device (AQ); the network connection can be received while concurrent video chat going on (AR); displaying the location can include one or more of: the location being displayed on map, icon depicting responder displayed on map, image of responder displayed on map, map presented with video feed, and location presented with regard to location of user device (AS); receiving information determining whether responders are currently available for a user of a computing device, and if no responders are currently available, taking an appropriate action (AT); the appropriate action can include one or more of: presenting a message on the computing device that no responders are available, providing information to user relating to alternate actions, and routing user's request(s) to a backup solution (AU); presenting can include one or more of: visual display, audio output, and haptic feedback (AV); receiving information determining whether responders are currently available for a user of a computing device, and if no responders are currently available, presenting a warning message on the computing device that no responders are available (AW); establishing, before initiating a communication session at a computing device, peer-to-peer network connections with a plurality of other devices associated with candidate responders, and obtaining and displaying, using the network connections, current status information for a plurality of candidate responders (AX); establishing, before initiating a two-way audiovisual communication session at a computing device, peer-to-peer network connections with a plurality of other devices associated with candidate responders, and obtaining and displaying, using the network connections, one-way video depicting a plurality of candidate responders (AY); receiving, at a computing device and from a responder computing device, instructions to perform one or more operations, determining whether the responder computing device is permitted to remotely control operation of the computing device, and performing, based on the determining, the one or more operation (AZ); operations can include one or more of: initiating a communication session with another computing device, initiating an audio communication session with another computing device, initiating a two-way audiovisual communication session with another computing device, initiating a one-way audiovisual communication session with another computing device, activating/deactivating one or more devices (camera, microphone, audio volume, light), recording video, taking a picture, playing an alarm, playing a pre-recorded message, and outputting image/audio/video (BA); displaying a map that depicts geographically associated crime information (BB); displaying a map that depicts geographically associated crime information, receiving new crime information in substantially real time, and updating the map to additionally depict the new crime information (BC); outputting, when the location associated with the new crime information is within a threshold distance from the user's current location, information to the user (BD); transmitting a request to a computer system for a network address of another computing device, receiving, from the computer system, the network address, and establishing, using the network address, a peer-to-peer network connection with the other computing device (BE); receiving input to connect to each member of a group of users, obtaining network addresses for devices associated with the members of the group of users, and sending messages requesting network connections with the devices using the network addresses (BF); the group of users can include one or more of: friends, responders, emergency personnel, and user from designated lists (BG); providing, on a mobile computing device, an interface through which the mobile computing device acts as a user device in personal emergency response system, determining that an input received through the interface is one of a plurality of designated inputs to initiate communication with an emergency response system, and initiating, based on the determining, communication with the emergency response system (BH); recording, by a mobile computing device mounted within a user's home, video by using a camera of the mobile computing device, and transmitting the video to a computer system with additional data obtained by the mobile computing device (BI); the additional data can include location information and user information (BJ); obtaining status information for a one or more users that are associated with one or more computing devices, and outputting the status information (BK); the status information can include an image of the user, a video of the user, whether the user is available, whether the user is on a call, whether the user is away, and whether the user is actively using the device (BL); receiving location information for a user associated with a computing device, determining, using the location information, whether the user has crossed over a boundary of a defined geographic area, and outputting an alert in response to the determining (BM); providing, by a computer system, communication operating across a plurality of different computing platforms and operating systems (BN); the computing platforms and operating systems can include one or more of: iOS, Android, Windows, Windows-Mobile, Blackberry, and MacOS (BO); receiving, at a computing device associated with a user and from a responder device, instructions to contact a friend of the user, identifying an appropriate friend to contact, and initiating a communication session with a computing device associated with the identified friend (BP); encrypting, by a computing device, real-time data with associated metadata that identifies when, where, or by whom the real-time data was collected, and transmitting the real-time data (BQ); a central computer system can be a professional emergency response system (BR); gating access to one or more security features based on subscription levels for users (BS); obtaining network addresses for computing devices associated with a user's friends, and automatically initiating network connections with the computing devices (BT); sending and receiving, by a computing device, text messages with other computing devices, and displaying the text messages on the computing device (BU); detecting wireless signals from other nearby devices, and recording and transmitting information regarding the detected wireless signals and the other devices (BV); displaying on a map the locations of users #2 who have begun using an application based on a recommendation from the user in color #1, and displaying on a map the locations of users who have begun using a mobile application based on a recommendation from the users #2 in color #2 (BW); displaying on a map the locations of users who have begun using a mobile application based on a recommendation from the users #3 in color #3 (BX); displaying on a map the locations of users who have begun using a mobile application based on a recommendation from the users #4 in color #4 (BY); the application can include one or more of: a security application, a social networking application, and an application that was either directly or indirectly provided to the users (BZ); receiving a current location for a user, determining a current safety level for the user at the current location based on one or more factors (CA); the factors can include one or more of: location, crime information, current time, user's profile, user's age, user's gender, available responders, and proximity of responders to the user (CB); a communication protocol that is used can be webRTC (CC); selecting, from among a plurality of responders, one or more responders based, at least in part, on user-generated ratings for the plurality of responders (CD); outputting a graphical user interface element can include a slider through which a user can browse a group of users through linear swiping inputs (CE); receiving a request to transmit a location to another computing device, determining the location of the computing device, and transmitting the location to another computing device (CF); a data source from which user contact information and location information is obtained can be social media (CG); information can be transmitted through a social media platform (CH); receiving input describing an incident, collecting additional details detected or sensed by the mobile computing device regarding the incident, and reporting the incident using the input and the additional details (CI); the additional details can include one or more of: geographic location, images, and video (CJ); information regarding a user can be stored as a user profile (CK); and displaying a video instructing a user how to operate a mobile security application (CL).

The features A-CL can combined in any of a variety of appropriate ways. For example, the features A-CL, including all possible subsets thereof, can be used in every possible combination and in every possible permutation.

Implementations of the disclosed technology can be computing devices and/or computer systems that include one or more of the following features: means to engage in two-way audiovisual teleconferencing with another computing device through a network (CM); means to capture an audio and video datastream #1 (CN); means to transfer said audio and video datastream #1 to another computing device (CO); means to receive audio and video datastream #2 from another computing device (CP); means to display video from said audio and video datastream #2 (CQ); means to present audio from said audio and video datastream #2 (CR); means to receive audio and video from another computing device (CS); a camera, a network interface that is programmed to transmit real-time video recorded by camera to another computing device over a network connection, and to receive real-time video recorded by the other computing device, and a display that is programmed to display, concurrently with transmitting the real-time video, the real-time from the other computing device (CT); a camera, a network interface that is programmed to communicate with another computing device as part of a two-way video chat session over a network connection, and a display that is programmed to display, as part of the two-way video chat session, real-time video from the other computing device while transmitting real-time video from the mobile computing device to the other computing device (CU); a mobile security application that is programmed to identify a plurality of candidate responders; and select a particular candidate responder based, at least in part, on one or more factors (CV); a geographic location unit that is programmed to determine a location of a mobile computing device using one or more of a plurality of data sources (CW); a network interface that is programmed to receive a geographic location for a user, a database of locations and corresponding responders, and a routing system programmed to identify one or more appropriate responders based, at least in part, on the geographic location for said user and said database (CX); a jurisdiction module that is programmed to determine, for an assistance request for a user, whether the user is located within one or more licensing jurisdictions, and a responder identification module that is programmed to identify a responder to provide assistance to the user based on the determination of whether the user is located within the licensing jurisdictions (CY); a network interface that is programmed to receive a request to connect a mobile computing device with an responder service, an emergency routing system that is programmed to identify an appropriate emergency responder service based on the location of the mobile computing device, and connection manager that is programmed to initiate contact with the appropriate emergency responder service on behalf of the mobile computing device (CZ); a network interface that is programmed to receive a message from a mobile computing device, the message including a location of the mobile computing device, a routing system that is programmed to determine an appropriate responder service based on the location, and connection manager that is programmed to initiate a telephone call to appropriate the emergency responder service on behalf of the user (DA); a network interface that is programmed to receive a message from a mobile computing device, the message including a location of the mobile computing device, a routing system that is programmed to determine an appropriate responder service based on the location, and connection manager that is programmed to initiate electronic communication with the appropriate the responder service for the user and transmit the message (DB); one or more cameras that are programmed to record video, a security layer that is configured to modify the video to add one or more features, and a network interface that is configured to transmit the modified video with the features to a remote storage system for persistent storage (DC); one or more cameras mounted to a user's body that are accessible to a computing device (DD); a network interface that is programmed to receive data recorded by a computing device during an incident, a feature identification module that is programmed to identify one or more features from the data, and an assailant identifier that is programmed to determine an identity of an assailant involved in the incident based on comparison of the one or more features with information stored in one or more data sources (DE); one or more security cameras that are configured to record video on a mobile computing device, and a network interface that is programmed to transmit the video to a remote storage system for persistent storage (DF); a user interface that is programmed to receive input to send a push notification to another device, a location unit that is programmed to determine a current location of the computing device, and a network interface that is programmed to transmit a push notification to the other device that includes the current location (DG); a user interface that is programmed to receive input to send a push notification to another device, a location unit that is programmed to determine a current location of the computing device, and a network interface that is programmed to transmit a push notification to the other device that includes the current location (DH); a network interface that is programmed to receive a location of a responder through a network connection, and a display that is configured to display the location of the responder on the computing device (DI); a network interface that is configured to receive information indicating that no responders are currently available for a user of a computing device, and an output subsystem that is configured to output a warning message on the computing device that no responders are available (DJ); a network interface that is configured to establish, before initiating a communication session and at a computing device, peer-to-peer network connections with a plurality of other devices associated with candidate responders, a status module that is programmed to obtain using the network connections, current status information for a plurality of candidate responders, and a display that is configured to display the current status information for a plurality of candidate responders (DK); a network interface that is configured to establish, before initiating two-way audiovisual communication session and at a computing device, peer-to-peer network connections with a plurality of other devices associated with candidate responders, a status module that is programmed to obtain using the network connections, current status information for the candidate responders, and a display that is configured to display the current status information for the candidate responders (DL); a network interface that is configured to receive, from a responder computing device, instructions to perform one or more operations, a permissions module that is configured to determine whether the responder computing device is permitted to remotely control operation of the computing device, and a processor that is configured to perform, based on the determining, the one or more operation (DM); a display that is programmed to display a map that depicts geographically associated crime information (DN); a display that is programmed to display a map that depicts geographically associated crime information, a network interface that is programmed to receive, in real-time and while displaying the map, new crime information, wherein the map is updated to additionally depict the new crime information, and an output subsystem that is programmed to output, when the new crime information is within a threshold distance, a notification (DO); a network interface that is programmed to: transmit a request to a computer system for a network address of another computing device, receive the network address, and establish, using the network address, a peer-to-peer network connection with the other computing device (DP); a user interface that is configured to receive input to connect to each member of a group of users, and a network interface that is programmed to obtain network addresses for devices associated with the members of the group of users, and sending messages requesting initiating network connections with the devices using the network addresses (DQ); an interface through which the mobile computing device acts as a user device in personal emergency response system, an input interpreter that is programmed to determine that an input received through the interface is one of a plurality of designated inputs to initiate communication with an emergency response system, and a network interface that is programmed to initiate, based on the determining, communication with the emergency response system (DR); an in-home mount, a mobile computing device that is sized to fit within the in-home mount, the mobile computing device including: a camera, a video recording module that is programmed to record video using the, and a network interface that is programmed to transmit the video to a computer system with additional data obtained by the mobile computing device (DS); a network interface that is programmed to obtain status information for a one or more users that are associated with one or more computing devices, and an output subsystem that is programmed to output the status information (DT); a network interface that is programmed to receive location information for a user associated with a computing device, a location tracking module that is programmed to determine, using the location information, whether the user has crossed over a boundary of a defined geographic area, and an alert module that is programmed to output an alert in response to the determining (DU); a network interface that is configured to provide security features to computing devices operating across a plurality of different computing platforms and operating systems (DV); a network interface that is programmed to receive, from a responder device, instructions to contact a friend of a user, a contact identification module that is programmed to identify an appropriate friend to contact, and wherein the network interface is further programmed to initiate a communication session with a computing device associated with the identified friend (DW); a security module that is programmed to encrypt real-time data with associated metadata that identifies when, where, or by whom the real-time data was collected, and a network interface that is programmed to transmit the real-time data (DX); a central computer system comprises a professional emergency response system (DY); a subscription module that is programmed to gate access to one or more security features based on subscription levels for users (DZ); a text messaging module that is programmed to send and receive text messages with other computing devices, and a user interface that is programmed to display the text messages on the computing device (EA); a wireless transceiver that is configured to detect nearby wireless signals from other devices, and a network interface that is programmed to transmit information regarding the detected wireless signals and the other devices (EB); a display that is programmed to display a map that depicts color coded regions that correspond to users who have begun using a mobile security application based on a recommendation from the user that was either directly or indirectly provided to the users (EC); a network interface that is programmed to receive a current location for a user, and a safety module that is programmed to determine a current safety level for the user at the current location based on one or more factors (ED); wherein a communication protocol that is used comprises webRTC (EE); a responder selection module that is programmed to select, from among a plurality of responders, one or more responders based, at least in part, on user-generated ratings for the plurality of responders (EF); a user interface that includes a graphical element comprising a slider through which a user can browse a group of users through linear swiping inputs (EG); a user interface that is programmed to receive a request to transmit a location to another computing device, a location unit that is programmed to determine the location of the computing device, and a network interface that is programmed to transmit the location to another computing device (EH); a data source from which user contact information and location information is obtained comprises social media (EI); a user interface that is programmed to receive input describing an incident, an input subsystem that is configured to collect additional details detected or sensed by the mobile computing device regarding the incident, and a network interface that is programmed to report the incident using the input and the additional details (EJ); information regarding a user is stored as a user profile (EK); and a display that is configured to display a video instructing a user how to operate a mobile security application (EL).

The features CM-EL can be combined in any of a variety of appropriate ways, including with the features A-CL. For example, the features A-EL, including all possible subsets thereof, can be used in every possible combination and in every possible permutation.

In one implementation, a computer-implemented method includes determining a location of a mobile computing device using one or more of a plurality of data sources; identifying a plurality of candidate responders; selecting a particular candidate responder based, at least in part, on one or more factors; and initiating two-way audiovisual teleconferencing between the mobile computing device and the particular candidate responder over a network connection. The method can include one or more of the following features, which can be used in any possible combinations. The network connection can be a peer-to-peer connection. The factors can include one or more of the following: user location, responder location, responder ratings, responder skills/training, type of situation, and a predefined list of responders. The data sources include one or more of the following: GPS, WiFi, beacon signals, other data transmitted by radiofrequency that is useable to electronically locate a device. Receiving a geographic location for a user, and determining, using a database of locations and corresponding licensure status, whether said user is located within one or more licensed jurisdiction. Determining or receiving a geographic location for a user, and identifying, using a database of locations and corresponding responders, one or more appropriate responders based, at least in part, on said geographic location. Receiving a request to connect a mobile computing device with a responder service, identifying an appropriate responder service based on the location of the mobile computing device, and initiating contact with the appropriate responder service on behalf of the mobile computing device. Receiving, at a computing device, a location of a responder through a network connection; and displaying the location of the responder on the computing device. Receiving information determining whether responders are currently available for a user of a computing device; and if no responders are currently available, taking an appropriate action. Establishing, before initiating a communication session at a computing device, peer-to-peer network connections with a plurality of other devices associated with candidate responders; and obtaining and displaying, using the network connections, current status information for a plurality of candidate responders. Recording video using one or more cameras that are accessible to a computing device; modifying the video by adding one or more features; and transmitting the modified video with the features to a remote storage system for persistent storage. Receiving a current location for a user; and determining a current safety level for the user at the current location based on one or more factors.

In another implementation, a computing device includes a geographic location unit that is programmed to determine a location of a mobile computing device using one or more of a plurality of data sources; a mobile security application that is programmed to identify a plurality of candidate responders and to select a particular candidate responder based, at least in part, on one or more factors; a camera; a network interface that is programmed to transmit real-time video recorded by camera to another computing device associated with the particular candidate responder over a network connection, and to receive real-time video recorded by the other computing device; and a display that is programmed to display, concurrently with transmitting the real-time video, the real-time from the other computing device.

In another implementation, a computer-implemented method includes communicating, by a mobile computing device, with another computing device as part of a two-way video chat session over a network connection; displaying, as part of the two-way video chat session, real-time video from the other computing device while transmitting real-time video from the mobile computing device to the other computing device; receiving a request to connect a mobile computing device with a responder service; Identifying an appropriate responder service based on the location of the mobile computing device; initiating contact with the appropriate responder service on behalf of the mobile computing device; recording video using one or more cameras that are accessible to a computing device; modifying the video by adding one or more features; and transmitting the modified video with the features to a remote storage system for persistent storage. The method can include one or more of the following features, which can be used in any possible combinations. Receiving, at a computing device, a location of a responder through a network connection; and displaying the location of the responder on the computing device. Receiving information determining whether responders are currently available for a user of a computing device; and if no responders are currently available, taking an appropriate action. Establishing, before initiating a communication session at a computing device, peer-to-peer network connections with a plurality of other devices associated with candidate responders; and obtaining and displaying, using the network connections, current status information for a plurality of candidate responders. Receiving a current location for a user; determining a current safety level for the user at the current location based on one or more factors. A communication protocol that is used comprises webRTC. Encrypting, by a computing device, real-time data with associated metadata that identifies when, where, or by whom the real-time data was collected; and transmitting the real-time data.

In another implementation, a computer-implemented method includes determining a location of a mobile computing device using one or more of a plurality of data sources; communicating, by the mobile computing device, with another computing device as part of a two-way video chat session over a first network connection, the communicating including transmitting the location of the mobile computing device; displaying, as part of the two-way video chat session, real-time video from the other computing device; recording video using one or more cameras that are accessible to the mobile computing device; and transmitting, over a second network connection, the video to a remote storage system for persistent storage.

The method can optionally include one or more of the following features. The method can further include identifying from a data source a plurality of potential responder computing devices associated with candidate responders; and automatically selecting a particular potential responder computing device to communicate with that is associated with a particular potential candidate responder based, at least in part, on one or more factors including the availability of the responder for communication. The method can also include receiving, at the mobile computing device, a location of a responder through a network connection; and displaying the location of the responder on the mobile computing device. The method can additionally include receiving information that indicates whether responders are currently available for a user of the mobile computing device; and if it is detected that no responders are currently available, taking an appropriate alternate action. The method can further include establishing, before initiating the communication session at the other computing device, network connections with a plurality of other devices associated with candidate responders; and obtaining and displaying, using the network connections, current status information for a plurality of candidate responders. The method can also include receiving, at the mobile computing device and from a responder computing device, instructions to perform one or more operations; determining whether the responder computing device is permitted to remotely control operation of the mobile computing device; and if the responder computing device is permitted to remotely control operation of the mobile computing device based on the determining, performing, the one or more operations. The method can additionally include encrypting, by the mobile computing device, real-time data with associated metadata that identifies when, where, or by whom the real-time data was collected; and transmitting the real-time data. The method can also include receiving a current location for a user; and determining a current safety level for the user at the current location based on one or more factors including the location. A communication protocol that is used comprises webRTC.

In another implementation, a computing device includes one or more cameras that are programmed to record video; a geographic location unit that is programmed to determine a location of a computing device using one or more of a plurality of data sources; a network interface that is programmed to communicate with another computing device as part of a two-way video chat session over a first network connection and to cause the video to be transmitted, over a second network connection, to a remote storage system for persistent storage, the location of the computing device being sent over the first and second network connections; and a display that is programmed to display, as part of the two-way video chat session, real-time video from the other computing device.

The computing device can optionally include one or more of the following features. The computing device can further include a security application that is programmed to identify a plurality of candidate responders and to select a particular candidate responder based, at least in part, on one or more factors, wherein the particular candidate responder is associated with the other computing device. The network interface can is further be programmed to establish, before initiating the communication with the other computing device, network connections with a plurality of other computing devices associated with candidate responders; the device can further include a status module that is programmed to obtain, using the network connections, current status information for a plurality of candidate responders; and the display can further be programmed to display the current status information for a plurality of candidate responders. The network interface can further be programmed to receive, from a responder computing device, instructions to perform one or more operations; the computing device can further include a permissions module that is programmed to determine whether the responder computing device is permitted to remotely control operation of the computing device; and a processor that is configured to perform, based on the determining, the one or more operations.

In another implementation, a computer-implemented method can include determining a location of a mobile computing device using one or more of a plurality of data sources; identifying a plurality of candidate responders; automatically selecting a particular candidate responder based, at least in part, on one or more factors including the availability of the candidate responders; and initiating two-way audiovisual teleconferencing between the mobile computing device and the selected particular candidate responder over a network connection.

The method can optionally include one or more of the following features. The method of can further include determining or receiving a geographic location for a user; identifying, using a database of locations and corresponding responders, one or more appropriate responders based, at least in part, on the geographic location; receiving a request to connect the mobile computing device with a responder service; identifying an appropriate responder service based on the location of the mobile computing device; and initiating contact with the appropriate responder service on behalf of the mobile computing device. The method can further include receiving a geographic location for a user; and determining, using a database of locations and corresponding licensure status, whether the user is located within one or more licensed jurisdictions. The method can also include receiving, at the mobile computing device, a location of a responder through a network connection; and displaying the location of the responder on the mobile computing device. The method can additionally include establishing, before initiating a communication session at a computing device, a plurality of network connections relating to a plurality of other devices associated with candidate responders; and obtaining and displaying, using the network connections, current status information for said plurality of other devices associated with candidate responders. The method can also include receiving information identifying whether responders are currently available for communication with a user of a computing device; and in response to detecting that no responders are currently available, taking an appropriate alternate action. The method can additionally include receiving a current location for a user; and determining a current safety level for the user at the current location based on one or more factors including said location for a user.

The details of one or more implementations are depicted in the associated drawings and description thereof below. Certain implementations may provide one or more advantages. For example, the disclosed technologies can increase security, particularly personal safety, by connecting a person or group of people at risk to responders who can help. For instance, in a crime scenario the disclosed technology can be effective at stopping or averting a crime, dissuading an attacker, and/or capturing information about the attacker, situation, and/or location that will enhance emergency personnel's ability to stop, apprehend, and/or prosecute a criminal. In a medical emergency scenario, the disclosed technology can be effective at providing real time medical information, 2-way or multi-way video, and/or capturing information about the victim, situation, and/or location that will enhance emergency personnel's ability to administer emergency care. In an accident (e.g., auto accident) or lost person scenario, the disclosed technology can aid in capturing information about the location of the person and/or other information helpful in bringing about their rescue.

In another example, before initiating a security session with a responder or other user, a user can be provided with assurances that someone is readily available to help him/her by preemptively initiating connections between the user's mobile computing device and the computing devices of other user(s) before the user has requested assistance/help. The state of such preemptive connections can be part of a Ready Mode and can allow for a user to quickly engage an available responder for assistance. Users can be notified of which other users and responders are available through user interface features, such as status indicators for a group of other users and responders, which can provide assurances of a user's available and readily deployable options for assistance.

In a further example, remote control of another user's mobile computing device can help and provide assistance to the other user in a variety of contexts. For instance, in a crime scenario such another user may not be able to activate his/her mobile computing device to obtain help from a remote user/responder. Remote activation can allow for such assistance and help to be provided. In emergency scenarios, remote activation can allow for a variety of details regarding a user's location and state to be obtained, including capturing live audio and video from the user's device and including the ability to initiate or control all of the same functions that the user himself could control on his device, which may be crucial for deploying medical personnel to an appropriate location to provide assistance.

In another example, a user needing assistance can automatically be routed to a responder who is best able to assist the user with minimal input from the user. For example, multiple factors can be considered when pairing a user in need of assistance with an appropriate responder, such as proximity of responders to the user, ratings of the responders by previous users, a type of situation (e.g., emergency, crime), user profile information and preferences, current availability of responders, responder skills and training, the group of the responder (e.g. responder is member of local police, responder is responsible for a particular jurisdiction, responder is member of private security for a particular organization), and/or other factors. Based on such factors, a user can be automatically paired with a responder who is able to best assist the user, which can improve the likelihood of a positive outcome for the user.

In a further example, by automatically sending out confirmation messages to other users/responders once a user has arrived at a destination location (for example the user's home, work, or another safe location), a user's safe arrival can be confirmed to other users (for example to the user's friends or family). Additionally, the absence of such messages after a period of time when arrival by the user at a destination was expected can allow for actions to be taken to assist the user, for example to send out notification messages to responders or friends/family, which can reduce the response time of someone helping the user and increase the likelihood of a positive result for the user.

In another example, by providing users with updated safety scores for their surroundings based on a variety of factors, many of which would not be readily apparent to users from their physical surroundings, users can be better alerted of potentially dangerous situations and can take preventative steps to avoid any harm or danger from befalling them. For example, when a user enters a geographic area that has high crime rates and within which a recent incident report was received from another user, a safety score for that user can be provided to the user or to other users (including the user's friends, family, or responders) indicating that he/she is in an unsafe location and can suggest a route to a safer location.

In a further example, the disclosed technology can aid users in sending detailed and informative text messages to appropriate emergency responder systems (e.g., a private security company, public security company, 911/PSAP systems), which can allow for users to quickly and silently request assistance. For example, in some instances a user may not want to initiate a video chat session or phone call with an emergency responder, such as when the user is hiding from an assailant or when there is a large amount of background noise that would render video/audio interaction useless. The disclosed technology can allow users in such situations to still obtain assistance when needed.

Other features, objects, and advantages of the technology described in this document will be apparent from the description and the drawings, and from the claims.

BRIEF DESCRIPTION OF THE DRAWINGS

FIGS. 18A-B are a screenshot of a user interface through which a user can enter their profile information and register to use the security features discussed above.

DEFINITIONS

Substantially Immediate/Substantially Immediately, as used herein, refers to a short period of time between process steps. For example, if one process follows another preceding processes substantially immediately, the following occurs within a time period of less than X seconds, such as within a period of time less than X=300, 60, 30, 10, 5, 4, 2, 1, 0.5, 0.2, 0.1, 0.01, 0.001, 0.0001, 0.00001, 0.000001 seconds or less. Live connection or live video may mean video that is seen by the remote peer substantially immediately relative to the time that it is captured (e.g., when a single frame is capture by a caller, it is seen within 300, 60, 30, 10, 5, 4, 2, 1, 0.5, 0.2, 0.1, 0.01, 0.001, 0.0001, 0.00001, 0.000001 seconds or less by the responder). In Ready Mode, available instantly may mean that a live connection may be established substantially immediately.

Substantially real time, as used herein, refers to a short period of time between process steps. For example, something occurs in substantially real time if it occurs within a time period of less than X seconds, such as within a time period of less than X=300, 60, 30, 10, 5, 4, 2, 1, 0.5, 0.2, 0.1, 0.01, 0.001, 0.0001, 0.00001, 0.000001 seconds or less.

DETAILED DESCRIPTION

This document generally describes computer-based technology for providing security features that are readily accessible to users of computing devices, such as mobile computing devices. A variety of different security features are described below with regard to the figures.

Figure 1:
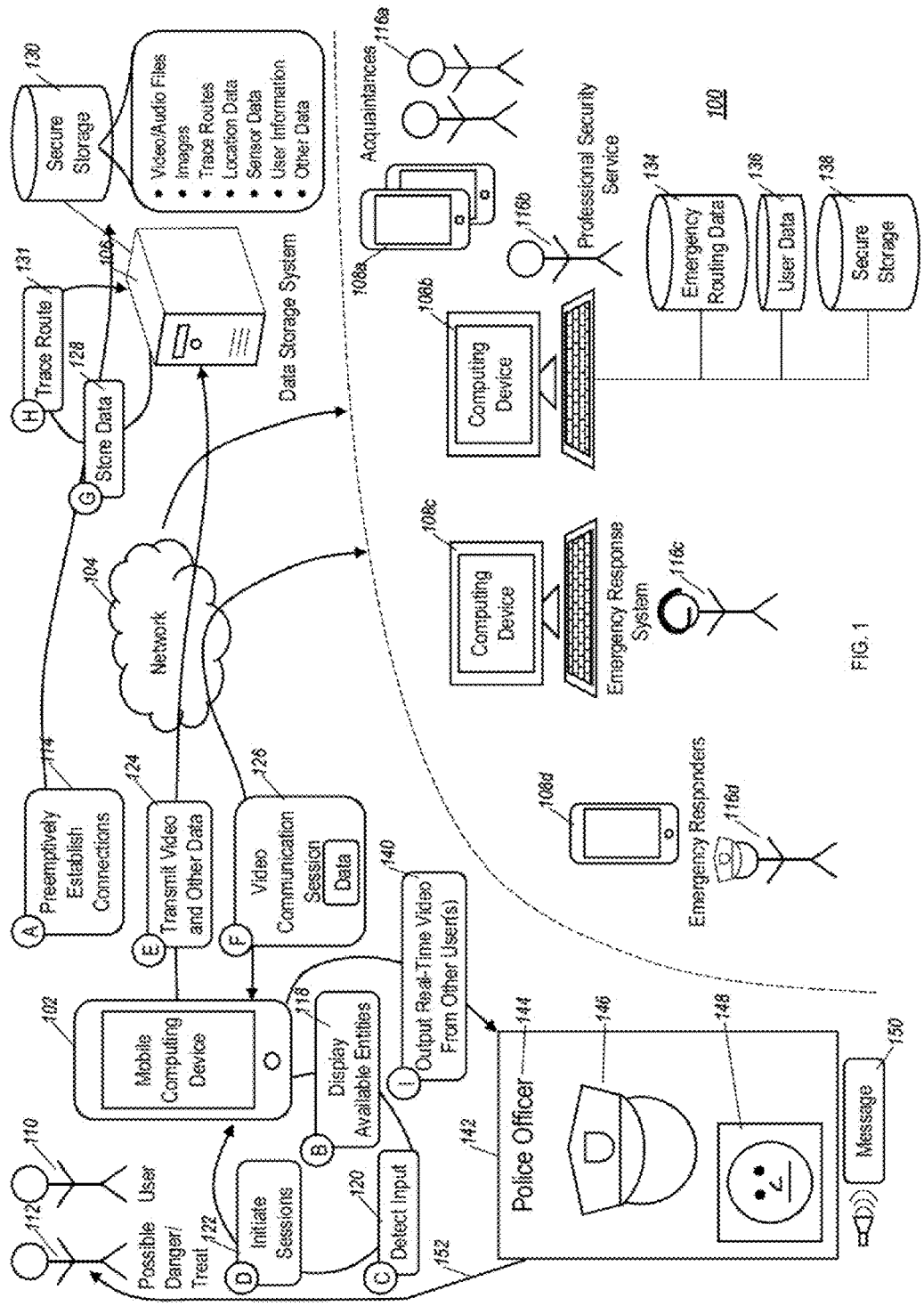
FIG. 1 is a conceptual diagram of an example computer system for providing security features on an example mobile computing device.

FIG. 1 is a conceptual diagram of an example computer system 100 for providing security features on an example mobile computing device 102. In particular, in the depicted example the mobile computing device 102 enters Ready Mode through preemptive communication with one or more other computing devices 108a-d and initiates a video communication session with one or more of the other computing devices while simultaneously transmitting video and other data to a remote data storage system 106 for secure storage 130.

The depicted computer system 100 includes the mobile computing device 102 that communicates over a network 104 with a data storage computer system 106 and a plurality of other computing devices 108a-d. The mobile computing device 102 can be any of a variety of appropriate mobile computing device, such as a smartphone, a PDA, a tablet computing device, a laptop, a wearable computing device (e.g., GOOGLE GLASS, smartwatches), a computing device embedded within a vehicle (e.g., embedded automobile computer system, truck, car, airplane, bus, helicopter, boat), and/or other appropriate mobile computing device. In some implementations, the mobile computing device 102 can be a non-mobile computing device, such as a desktop computer.

The network 104 can be any of a variety of appropriate networks over which the mobile computing device 102 can communicate with the data storage computer system 106 and/or the other computing devices 108a-d, such as the internet, local area networks (LANs), wide area networks (WANs), virtual private networks (VPNs), mobile data networks (e.g., 4G wireless networks), wireless networks (e.g., Wi-Fi networks, BLUETOOTH networks), peer-to-peer connections, TCPIP, UDP, secure networks such as HTTPS, or any combination thereof.

The data storage computer system 106 can by any of a variety of appropriate computer system with associated storage devices, such as cloud-based computer systems with associated data storage subsystems. The other computing devices 108a-d can be any of a variety of appropriate computing device and/or computer system, such as mobile computing devices, desktop computers, and/or computer servers.

As depicted in FIG. 1, the mobile computing device 102 is associated with a user 110 who is faced with a possible dangerous situation or person 112, which can include any of a variety of dangers or emergencies such as another person (e.g., aggressor, criminal), a medical emergency, an accident (e.g., automobile accident), and/or other dangerous physical situations.

Even before the user 110 is faced with the possible danger 112, the mobile computing device 102 can preemptively establish connections with the data storage system 106 and/or some or all of the other computing devices 108a-d over the network 104, as indicated by step A (114). These preemptive connections can be part of Ready Mode, which the user 110 may toggle on/off through one or more settings on the mobile computing device 102. As part of Ready Mode, the mobile computing device 102 periodically (e.g., every second, every 5 seconds, every 10 seconds) provides to and receives status information (e.g., active, inactive, user presently interacting with the mobile computing device 102) from to the other devices 106 and 108*a-d*. This status information can indicate whether a user/service associated with a corresponding device is presently available to participate in a security session. For example, status information for the data storage system 106 can indicate whether recording of information obtained by the mobile computing device 102 (e.g., video, audio, location information, sensor data) can be instantly initiated (e.g., initiated with less than a threshold delay) by the data storage system 106.

Each of the other computing devices 108*a-d* can be associated with one or more different entities, such as the example entities depicted in FIG. 1. For example, the computing device 108*a* is depicted as being associated with acquaintances 116*a* (e.g., friends, colleagues, family members) of the user 110, the computing device 108*b* is depicted as being associated with a professional security service 116*b* (e.g., non-government groups/companies that provide security services), the computing device 108*c* as being associated with an emergency response system 116*c* (e.g., 911/PSAP system), and the computing device 108*d* is depicted as being associated with emergency responders 116*d* (e.g., police officers, fire fighters, emergency medical service providers, military).

Through the preemptively established connections with these devices 108*a-d*, status information for users associated with the entities 116*a-d* can be obtained. The status information can indicate any of a variety of details regarding the availability of the computing devices 108*a-d* and/or associated entity users 116*a-d* to participate in a security session with the user 110 and the mobile computing device 102. For example, the status information can indicate whether users are currently at or away from the computing device 108*a-d*, which can be determined by the computing devices 108*a-d* based on any of a variety of information, such as whether the users are currently providing input to the computing devices 108*a-d* (e.g., typing, clicking on screen elements, having an app in the foreground of the device, moving a pointer device) and/or whether the users are visible through a camera of the computing devices 108*a-d*. In another example, the status information may include a current video feed from the computing devices 108*a-d* so that the user 110 can verify whether the users for entities 116*a-d* are currently available to provide assistance. Such a video feed may be provided at a lower level of quality (e.g., lower frame rate, lower resolution) than typically provided during video chat sessions, so as to minimize the bandwidth consumed from the transmission. In another example, the status information may include the person's location or distance from the user.

The mobile computing device 102, during Ready Mode, can display information that identifies the available entities and status information for them, as indicated by step B (118). For example, the mobile computing device 102 can display a map that includes icons identifying the location of the computing devices 108*a-d* and their associated users 116*a-d* relative to a location of the mobile computing device 102, as well as their current status information. These icons may include photos of the associated users, when they were last connected, when they last changed position, or their computed safety level or other information. In another example, the mobile computing device 102 can display a list of the computing devices 108*a-d*, their corresponding users 116*a-d*, and their corresponding status information. In another example, the mobile computing device 102 can present a preview of a video that would be provided to the data storage system 106 for recordation along with an indicator (e.g., blinking light/icon) as to whether the data storage system 106 is available to instantaneously begin recordation of such data, and whether such recording has started or is ongoing. In some implementations, when no entities are available for the user 110, the mobile computing device can provide a notification that no responders are available to help and can additionally provide one or more alternative channels of assistance, such as dialing emergency response services (e.g., 911 service, campus police).

The information regarding the computing devices 108*a-d* and their corresponding entities 116*a-d* can be presented in a selectable manner on the mobile computing device 102 such that the user 110 can select one or more of the entities 116*a-d* for a security session (e.g., video communication and data recordation at the data storage system 106) or other communication session (e.g., messaging communication system).

The mobile computing device 102 can monitor for and detect input that indicates an intention of the user 110 to initiate a security session, as indicated by step C (120). Such input can take any of a variety of forms. For example, a user can select a graphical user interface feature (e.g., icon, virtual button) or physical button on the mobile computing device 102, or on another device connected to the mobile computing device 102 by wired or wireless connection (e.g., wearing watch or piece of jewelry with an embedded button to activate the app), provide audible input (e.g., utter a particular phrase), and/or provide motion based input (e.g., shaking the device) that is associated with initiating a security session. In another example, the absence of input for a period of time may indicate such an intention (e.g., holding the device in a particular orientation and/or pose for at least a threshold period of time, pressing a button down for at least a threshold period of time before releasing it). In another example, detected motion that is indicative of the user 110 losing control of the device 102 (e.g., dropping the device 102) and/or being involved in a physical altercation (e.g., automobile accident, physical scuffle) can be identified by the mobile computing device 102 as input to initiate a security session. In another example, detected motion such as a change in velocity (for example when a car abruptly stops, potentially indicating an accident) can be identified by the mobile computing device 102 as input to initiate a security session.

In response to detecting the input, the mobile computing device 102 can automatically initiate a security session with one or more of the computing devices 108*a-d* and the data storage system 106, as indicated by step D (122). In instances where the user 110 has not selected one of the computing devices 108*a-d* to communicate with, the mobile computing device 102 itself can automatically select one or more of the computing devices 108*a-d* with which to initiate the security session based on a variety of factors, such as proximity to the mobile computing device 102, ratings associated with the corresponding entities 116*a-d*, expertise and skills for the corresponding entities 116*a-d*, an indication of the type of possible danger 112, predefined preferences for the user 110, one or more lists/rankings of entities 116*a-d* as designated by the user 102, presence within one or more emergency response jurisdictions, sensor data, or any combination thereof. Other appropriate factors can also be used. In other words, if the user is associated with a whole group of potential connection recipients, for example a whole group of potential responders, the device 102 can automatically select an appropriate potential connection recipient based on a number of factors such as proximity to the user, and initiate a connection.

As part of the security session, the mobile computing device 102 can concurrently transmit audio, video and other data to the data storage system 106, as indicated by step E (124), and can participate in a video communication session with one or more of the computing devices 108a-d, as indicated by step F (126), potentially simultaneously. The data storage system 106 can receive a stream of real-time audio, video and other data (e.g., location information, sensor data, identity of other computing devices located nearby the mobile computing device 102), and can store the data, as indicated by step G (128). The data can be stored in one or more secure storage devices 130 to which access is restricted. For example, the data can be encrypted and stored in the secure storage devices 130, and read/write/delete privileges can be restricted such that, other than administrators of the data storage system 106, no users are able to modify the data written to the secure storage devices 130. For instance, the user 110 is not able to delete data that is uploaded to the data storage system 106 and stored in the secure storage devices 130.

The data stored in the secure storage devices 130 can be stored in a manner that will permit for the data to be used as evidence, sufficient for admission before a judicial or administrative body, of events that took place between the user 110 and the possible danger 112. As such, the data storage system 106 may trace and record information regarding a communication route over the network 104 between the mobile computing device 102 and the data storage system 106, as indicated by step H (131). Additionally, the data storage system 106 may also obtain and store raw data from the mobile computing device 102, such as raw GPS data and/or raw sensor data (e.g., motion sensor data), in addition to synthesized information from the mobile computing device 102 (e.g., geographic location determined by the mobile computing device 102). The secure storage devices 130 can store a variety of pertinent data from the mobile computing device 102, such as video/audio files, images, trace routes, location data, sensor data, and/or other appropriate data. The data being transmitted may also allow secure communication and encryption of data, as well as verification of the user transmitting the data, and the time and location from where it was transmitted. For example, the data being transmitted can be encrypted along with a username, password, time, location, biometrics, public or private cryptographic key, other security identifiers, or other information. This information may also be encrypted and or stored for verification using a blockchain-based methodology or other approaches derived from cryptography and cryptocurrencies (e.g. bitcoin, etherium). The information being transmitted can be encrypted or stored to be only accessible or readable to the user himself, or to someone with appropriate security information. The privacy of the user, or the user's identity, can also be secured and maintained cryptographically. These encryption steps may be performed locally on the mobile device of the user. These encryption steps may be performed on the responder device. These encryption steps may be performed on a remote server.

During the established video communication session, the mobile computing device 102 can transmit, to one or more of the devices 108a-d, real-time video, audio, text or message information, and/or image data, as well as location updates, information identifying the mobile computing device 102 and/or the user 110, information that may identify another user who may be causing the possible dangerous situation (e.g., images, audio, video of the other user; detected other computing devices that are located near mobile computing device 102), and/or other appropriate information. Each of the computing devices 108a-d can additionally provide similar information to the mobile computing device 102. The information may be transmitted between the mobile computing device 102 and multiple devices from the computing devices 108a-d in substantially real time and/or using peer to peer or server-based connections. Video communication sessions can be between the mobile computing device 102 and multiple devices from the computing devices 108a-d. For example, the mobile computing device 102 can establish a first video communication session with one of the computing devices 108a associated with the user's acquaintances 116a and a second video communication session with the computing device 108b that is associated with the profession security service 116b.

In addition to transmitting real-time video feeds to the mobile computing device 102, each of the computing devices 108a-d may additionally initiate remote control over the mobile computing device 102 (e.g., turn on/off various subsystems of the mobile computing device 102, such as lights, speakers, camera, microphone, display), initiate a communication session with one or more other computing devices (e.g., the acquaintance 116a can use the mobile computing device 108a to cause the mobile computing device 102 to communicate with the computing device 108c corresponding to the emergency response system 116c), and/or broadcast information from the video communication session to other users/devices (e.g., transmit current location and real-time video/audio feed to a nearby emergency responder 116d). Some of the entities 116a-d may have additional subsystems to further facilitate such assistance to the user, such as the professional security service 116b which can have access to emergency routing data 134 (e.g., information identifying an appropriate emergency response system (e.g., 911 or PSAP system or jurisdiction) to handle the user's 110 situation), user data 136 (e.g., information about the user 110, such as height, weight, name, age, appearance, address, automobile, medical conditions, preferences), and a secure data storage system 138 (e.g., storage system to log information regarding the interaction between the mobile computing device 102 and the computing devices 108a-d). Although not depicted, others of the computing devices 108a and 108c-d may either have data repositories similar to 134-138, or may have access to such information.

While the transmitting data to the data storage system 106 (step E) and participating in the video communication session (step F), the mobile computing device 102 can concurrently output the real-time audio and video received through the video communication session from the one or more of the computing devices 108a-d, as indicated by step I (140). Such outputting of the video can allow for a remote user (e.g., entities 116a-d) to virtually participate in the physical situation that is before the user 110 in an attempt to stop or mitigate the possible danger 112. For example, a person who is possibly dangerous 112 can see the video and/or hear the audio that is output on the user device 102, as indicated by video output 142, so as to provide verification that someone outside of the physical situation is monitoring and involved in the situation, as indicated by line 152 indicating that the video output 142 and the audio output 150 are presented to the possible danger 112. An example video output 142 on the display of the mobile computing device 102 is depicted as including textual information 144 identifying the remote user ("Police Officer"), a live video feed 146 that shows the remote user (police officer), additional information 148 that the remote user has directed (e.g., through remote control) the mobile computing device to display 102. In the example, one of the other computing devices 108a-d that is participating in the video chat (video chat can be a multi-way (e.g., two-way, three-way, four-way) videoconference) can provide an image of the possible aggressor 112, which was obtained by the other computing device through the video communication session 126. The image of the possible aggressor 112 can serve as proof to the possible aggressor 112 that his image has been recorded, so as to imply that he/she is likely to get caught and should cease all aggression toward the user. Additionally, an audible message 150 can be output by the speakers of the mobile computing device 102.

For example, the user 110 can hold the mobile computing device 102 to be facing the possible aggressor 112 so that the possible aggressor 112 can see and hear the police officer (remote user) addressing him/her (for example the possible aggressor 112 can see the display 142). The police officer (remote user) can cause the mobile computing device 102, through remote device control, to present information to the possible aggressor 112, such as the textual information 144 identifying the police officer and the image 148 that provides verification that evidence of the possible aggressor 112 actions have been captured and are in the hands of the authorities. Such involvement by a remote user is likely to improve the chance of the possible dangerous situation 112 ending without anything having happened to the user 110. Examples of other actions that a remote user, like the police officer in the example, can cause the mobile computing device 102 to take include turning on/off a light source (e.g., flash) on the mobile computing device, activating an alarm on the mobile computing device (e.g., audible alarm or pre-recorded audio or voice message, for example 'Help!'), and/or displaying the location of an emergency responder who is en route to the user's location.

The disclosed operations that are described above as being performed by the mobile computing device 102, the data storage system 106, and the computing devices 108a-d, can be implemented in any of a variety of appropriate ways on the devices/systems, such as through software (e.g., mobile device applications, operating system features), hardware (e.g., application specific integrated circuits (ASICs)), firmware, or any combination thereof.

Figure 2:
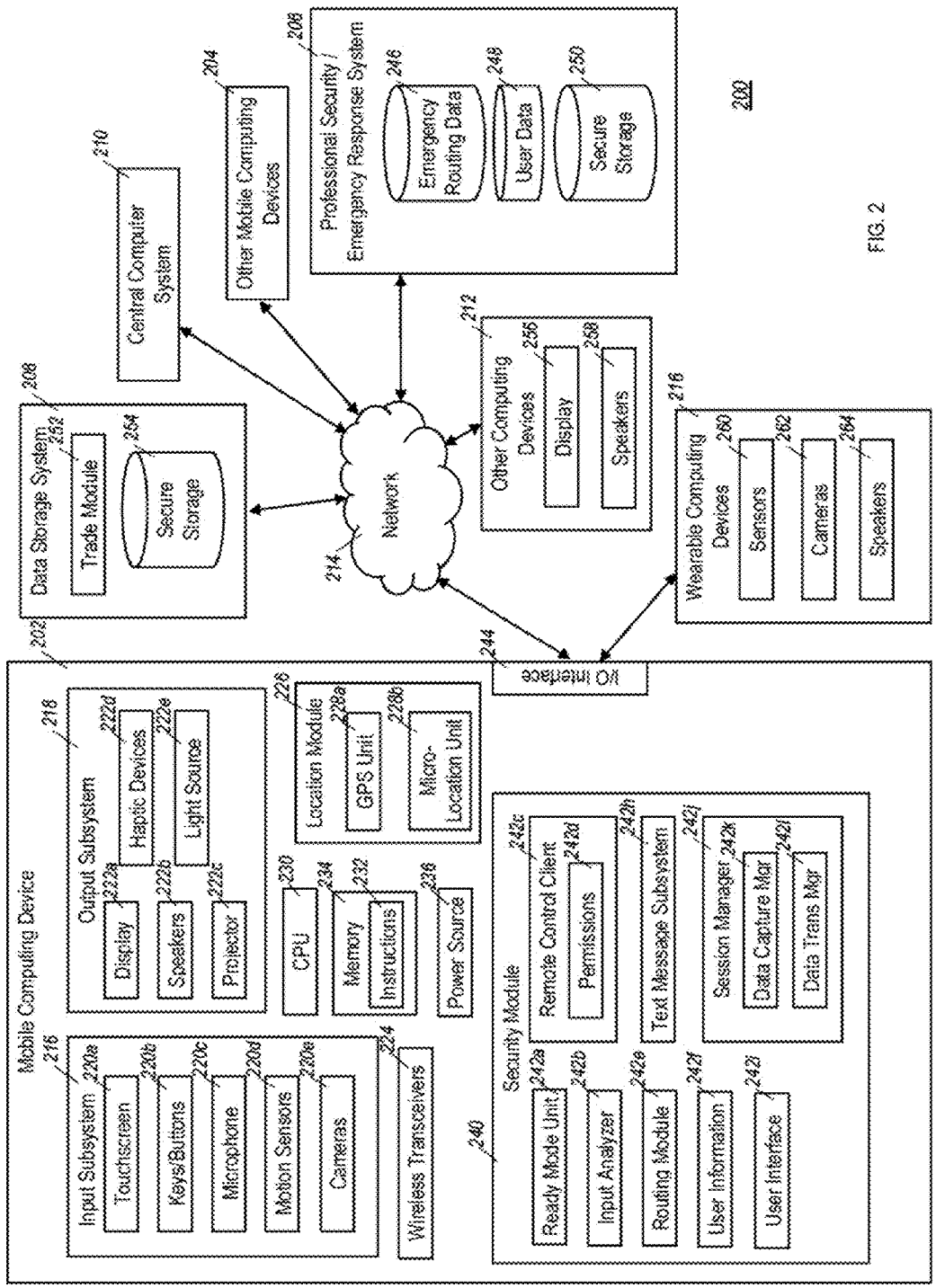
FIG. 2 is a diagram of an example system for providing security features on a mobile computing device.

FIG. 2 is a diagram of an example system 200 for providing security features on a mobile computing device 202. The example system 200 is depicted as including the mobile computing device 202, other mobile computing devices 204, computer systems 206 associated with professional security and/or emergency response systems, a data storage system 208, a central computer system 210, other computing devices 212 that are available to output audio or video information, a network 214, and wearable computing or monitoring devices 216. The mobile computing device 202 can be similar to the mobile computing device 102 described above with regard to FIG. 1. The other mobile computing devices 204 can be similar to the computing devices 108a and 108d described above. The computer system 206 can be similar to the computing devices 108b-c. The data storage system 208 can be similar to the data storage system 106. The network 214 can be similar to the network 104.

The mobile computing device 202 includes an input subsystem 216 and an output subsystem 218 through which input and output can be provided to users by the mobile computing device 202. The input subsystem 216 includes a touchscreen 220a (e.g., touch sensitive display, touch sensitive surface, touch sensitive housing, presence sensitive surface), keys and/or buttons 220b, microphone(s) 220c, motion sensors 220d (e.g., accelerometers, gyroscopes), cameras 220e (e.g., rear-facing camera, forward-facing camera, 3D cameras), and/or other appropriate technologies. In some implementations, the cameras 220e can additionally or alternatively detect portions of the electromagnetic spectrum that are outside of the range of visible light, such as infrared radiation. The output subsystem 218 includes a display 222a (e.g., LCD display, LED display), speakers 222b, a projector 222c, haptic devices 222d (e.g., vibration generating devices, tactile displays), light sources 222e (e.g., flash bulb, night vision or infrared energy), and/or other appropriate technologies. In some implementations, portions of the input and output subsystems 216 and 218 can be configured to provide additional inputs and outputs on the mobile computing device 202. For instance, the speakers 222b can be configured to output ultrasonic and/or subsonic sound waves, the reverberation of which can be detected by the microphone(s) 220c to provide sonar detection capabilities. Similarly, the device may use radar or night vision capabilities.

The mobile computing device 202 additionally includes wireless transceivers 224 for communicating over one or more wireless communication technologies. For example, the wireless transceivers 224 can include one or more appropriate wireless transceivers, such as wireless radio transceivers like Wi-Fi transceivers, short-range wireless transceivers (e.g., BLUETOOTH transceivers), cellular network transceivers, NFC, and/or mobile data network transceivers (e.g., 3G/4G transceivers). The mobile computing device 202 can additionally include a location module 226 that is programmed to determine a location of the mobile computing device 202 either in terms of absolute positioning (e.g., GPS position data, latitude and longitude) or relative positioning (e.g., positioning relative to particular fixed objects or inside buildings including cellular toward, WiFi hotspots or networks, other radio networks, satellites). The location module 226 may include a GPS unit 228a that is programmed to detect GPS satellite signals and, based on the detected signals, to determine a geographic location of the mobile computing device 202. The location module 226 may also include a micro-location unit 228b that is programmed to determine the location of the mobile computing device 202 with a greater level of granularity than the GPS unit 228a and/or in situations where the GPS unit 228a is unreliable (e.g., interior locations). The micro-location unit 228a can use signals received through the wireless transceivers 224, such as signals from Wi-Fi networks and/or beacon signals, to determine either absolute or relative positioning of the mobile computing device 202.

The mobile computing device 202 additionally includes a CPU 230 (e.g., single core, dual core, quad core) that is programmed to execute instructions 232 (e.g., binaries, object code, scripts) that are stored/loaded into memory 234 (e.g., RAM, ROM). The CPU 230 can execute instructions of any of a variety of types to provide security features on the mobile computing device 202, such as executing instructions to cause the mobile computing device 202, through its component parts, to initiate a session with one or more of the other computing devices 204 and/or professional security/emergency response systems 206, while concurrently transmitting data for secure storage to the data storage system 208. The mobile computing device 202 can additionally include one or more portable power source 236 (e.g., a battery) or backup power sources, or power connections (e.g. to an outlet), or solar or other power inputs.

Although not depicted, the mobile computing device 202 can be provided with an appropriately sized holster/case/sleeve that is designed to receive and hold the mobile computing device 202. This case may hold the device in such a manner that the input and output subsystems 216 and 218, respectively, will be able to obtain information about the user's surroundings and convey information from remote users to other people located near the user while at the same time being worn by the user, so as to provide the user with hands free operation of the mobile computing device 202. For example, the holster/case/sleeve can be a lanyard type apparatus that is worn about around a user's neck and that holds the device in a steady position near a center of the user's chest. In another example, the holster/case/sleeve can include a clip or strap that allows for the device to easily be secured to clothing, bags, appendages, or other objects. In another example, the holster/case/sleeve can include a clip or strap that allows for the device to easily be secured to a surface such as the surface of a helmet worn by the user, a vehicle or vehicle windshield, bicycle, or other piece of equipment. The holster/case/sleeve can additionally include a reserve power source (e.g., additional batteries) that can extend the duration during which the mobile computing device 202 can be used before losing power.

The mobile computing device 202 can additionally include a security module 240 that is programmed to provide security features to a user of the mobile computing device 202, including both from the perspective of a user in need of assistance, such as the user 110 described above with regard to FIG. 1, as well as a user who is providing assistance, such as the acquaintances 116a. The security module 240 can provide security features similar to those described above with regard to FIG. 1, as well as additional/alternative security features. The security module 240, and its component parts, can be implemented in any of a variety of appropriate ways, such as through software that is executed by the CPU 230 (e.g., mobile device application, operating system features), hardware (e.g., ASICs), firmware, or any combination thereof.

The security module 240 can include a ready mode unit 242a that is programmed to establish and maintain network connections with other computing devices before an intent to initiate a security session has been detected as part of Ready Mode (e.g., step A (114) described above with regard to FIG. 1). The network connections with the other computing devices can be peer-to-peer connections. Such an intent to initiate a security session can be detected by the input analyzer 242b, which is configured to determine whether the user has, through an action (voluntary or involuntary) or omission (voluntary or involuntary), indicated an intent to initiate a security session (e.g., step B (120) described above with regard to FIG. 1).

The security module 240 additionally can include a remote control client 242c that is programmed to receive and process instructions from other computing devices (e.g., other mobile computing devices 204) to remotely control the mobile computing device 202. Before providing such remote access and control to information and components of the mobile computing device 202, such as control over the input and output subsystems 216, 218, the remote control client 242c can determine whether the requesting device and/or associated user have been given permission to have such access and control by checking against a set of permissions 242d. For example, a user may want to restrict users included on the permissions 242d to only close and trusted family members (e.g., spouse, parents, child) and friends (e.g., best friend).

The security module 240 can additionally include a routing module 242e that is programmed to determine an appropriate remote user and corresponding computing device to which to route a security session for the mobile computing device 202. The routing module 242e can select an appropriate remote user/corresponding computing device based on one or more of a variety factors, such as proximity to the mobile computing device 202, user preferences (e.g., designation list of preferred responders), a type of situation (e.g., crime, medical emergency, natural disaster), and/or other appropriate factors. In some implementations, the routing module may alternatively be implemented at a remote computing device, such as the central computer system or server 210, which can receive a request to initiate a security session from the mobile computing device 202 and can select an appropriate other computing device for the session.

The security module 240 can store user information 242f, such as a user id, name, age, height, appearance, image, and/or preferences, which can be provided to other computing devices during security sessions. This information, for example a user profile, may also be stored on the central computer system or server 210. An identification module 242g of the security module 240 can additionally identify other users who are located around the mobile computing device through any of a variety of appropriate techniques, such as voice recognition, facial recognition, biometric identification (e.g., gate, proportions of body parts), and/or identification through nearby computing devices transmitting wireless signals (e.g., passive monitoring of wireless signals from nearby devices, active communication with such devices). The identification module 242g may use one or more data sources for such identifications, such as a user's photos, videos, social network information (e.g., friend lists, friend photos/videos, friend location, check-ins), and/or lists of contacts (e.g., telephone contact list, email contact list). The identification module 242g may alternatively and/or additionally be implemented on one or more other computing devices that are in communication with the mobile computing device 202, such as the central computer system 210 and/or the professional security/emergency response systems 206.

A text message subsystem 242h of the security module 240 can be programmed to automatically populate and/or route a text message to an appropriate emergency responder with minimal input from a user. For example, the text message subsystem 242h can add detailed information regarding the location of the mobile computing device 202, the surrounding environment, a type of emergency, and user identity information into a text message and can ensure that the text message is directed to an appropriate responder without direction from a user.

The security module 240 can include a user interface 242i through which users can access and use the security features provided by the security module 240. The user interface 242i can present information and receive input from a user in any of a variety of appropriate ways, such as through any and all components of the input and output subsystems 216 and 218, respectively.

The security module 240 additionally includes a security session manager 242j that is programmed to manage interactions between the mobile computing device 202 and other computing devices during sessions. In particular, the security session manager 242j includes a data capture manager 242k that is programmed to capture relevant data from the components of the input subsystem 216, the wireless transceivers 224, and/or the location module 226. The security session manager 242*j* additionally includes a data transmission manager 242*l* that is programmed to transmit a stream of, as least a portion of, the data captured by the data capture manager 242*k* to one or more of other computing devices (e.g., the other mobile computing devices 204, security/emergency response systems 206) and to the data storage system 208.

The mobile computing device 202 includes an input/output (I/O) interface 244 that is configured to communicate over the network 214 and with the wearable computing devices 216. The I/O interface 244 can be any of a variety of appropriate interface, such as a wired interface (e.g., Ethernet card) and/or wireless interface (e.g., wireless transceivers 224, wireless chips, and antennae).

The other mobile computing devices 204 can have any of the same features as the mobile computing device 202, but may be associated with other users (e.g., acquaintances, emergency responders).

The professional security/emergency response system 206 can include some or all of the components 216-244 of the mobile computing device 202, where appropriate, and may or may not be a mobile device. The professional security/emergency response system 206 can include additional components that may not be available on the mobile computing device 202 and/or the other mobile computing devices 204, such as emergency routing data 246 and/or user data 248. The emergency routing data 246 can correlate appropriate emergency response systems with the location of the mobile computing device 202. For example, the professional security/emergency response system 206 can perform a 'PSAP dip' to determine the correct 911 dispatch center for the location of a user who may be having an emergency. This function may be performed by using a database that allows every location to be converted into the corresponding PSAP/dispatch center, and to provide contact information for that dispatch center including phone number, email number, network id, and electronic communication identification. This function may be performed by a remote server, and may be performed using a remote API. One examples of a PSAP (Public Safety Answering Point) system is the PSAP PRO system provided by PitneyBowes.

The user data 248 can be a repository of relevant information for a user of the mobile computing device 202, such as the user information 242*f* (or a portion thereof).

The professional security/emergency response system 206 can additionally include a secure storage device(s) 250 to securely log data received from the mobile computing device 202 and/or transmitted to the mobile computing device 202 during a security session. Although not depicted, the mobile computing device 202 and/or the other mobile computing devices can also include secure storage device(s) to redundantly log such information as well.

The data storage system 208 can include a trace module 252 that is configured to encrypt and/or verify and/or trace communication paths between the data storage system 208 and the mobile computing device 202, so as to provide a proper foundation for admissibility of logged data as evidence during judicial and/or administrative proceedings. The data storage system 208 additionally include secure storage devices 254. These encryption steps may be performed locally on the mobile device of the user. These encryption steps may be performed on the responder device. These encryption steps may be performed on a remote server.

The central computer system 210 can be used to connect the mobile computing device 202 with other appropriate devices and systems, such as the data storage system 208, the other mobile computing devices 204, and the system 206. For example, the central computer system 210 can provide IP address information for the other mobile computing devices 204 to the mobile computing device 202, which the ready mode unit 242*a* can use to establish peer-to-peer connections with the other computing devices 204.

The other computing or monitoring or display devices 212 can be devices that are located near the mobile computing device 202 and that have open and accessible input or output devices (e.g., display 256 and speakers 258, camera, microphone) over which the mobile computing device 202 can stream and output information. For example, the other computing devices 212 can be televisions that have open Wi-Fi Direct access through which the mobile computing device 202 can broadcast audio and/or visual information. In another example, the other computing devices 212 can be specially designed and/or located security devices that allow for a user in distress to activate an alarm over an a wireless connection (e.g., BLUETOOTH connection). Such streaming of audio and visual information to the other computing devices 212 can help alert others in the area to the dangerous situation and can solicit their help. Streaming to such devices may be remotely controlled by a remote user, such as the users of the other mobile computing devices 204 and/or the system 206. Such other computing or monitoring or display devices 212 may also be used to record audio or video and transmit it to the network 214, the central computer system 210, or to professional security/emergency response system 206, or mobile computing device 202.

The wearable computing devices 216 can include any of a variety of appropriate wearable computing device, such as eyewear (e.g., GOOGLE GLASS), smart watches, wearable cameras (e.g. GoPro, Looxcie) and/or wearable motion sensors or biosensors (e.g. heart monitor, breathing monitor, pulsox, EEG monitor, blood composition monitor including glucose monitor). The wearable computing devices 216 can provide information to the mobile computing device 202 regarding the surrounding physical environment and/or a stat of the user, and can additionally output information. Such inputting and outputting of information can be accomplished through sensors 260 (e.g., motion sensors), camera(s) 262, speakers 264, and/or other appropriate components.

Figure 3:
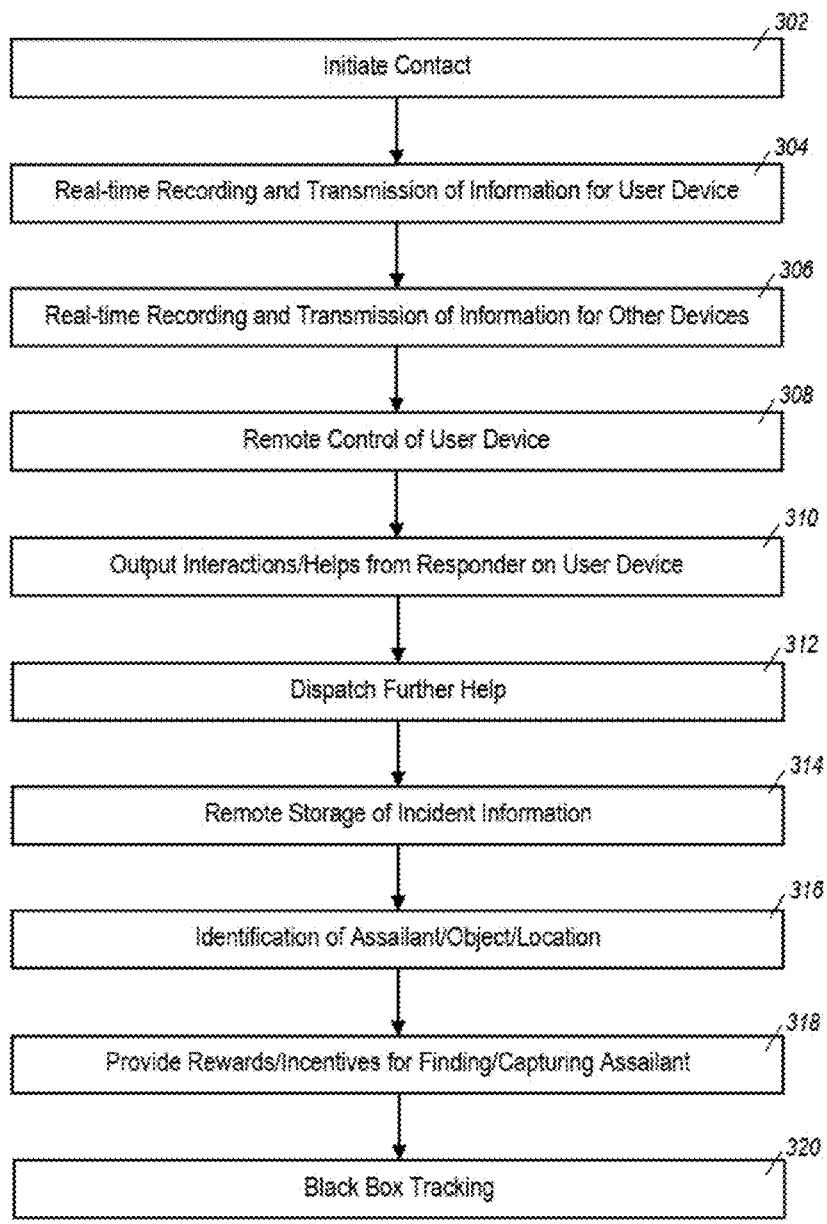
FIG. 3 is a flowchart depicting an example technique for assisting a user of a computing device.

FIG. 3 is a flowchart depicting an example technique 300 for assisting a user of a computing device. Portions of the technique 300 can be performed, in whole or in part, by any of a variety of appropriate computing devices and/or systems, such as the mobile computing device 102, the other computing devices 108*a*-*d*, the data storage computer system 106, the mobile computing device 202, the other mobile computing devices 204, the professional/emergency response system 206, and/or the data storage system 208.

As an overview, the technique 300 can include one or more of the following steps, which can be performed, in whole or in part, in any of a variety of appropriate orders:

Initiate Contact (302).

Initiate audio, video, two-way or multi-way contact between the mobile computing device of a user (or plurality of users) and a plurality of responders. Such contact can be over peer-to-peer connections.

Continuous Real Time Recording and Transmission of Information from User (304).

Information from the user or their situation may be transmitted in substantially real time by the mobile computing device of the user to computing devices/systems associated with the responder(s). This information may include audio/video from the user's device, photos, text messages, GPS or other localization information. All of this information may be stored locally on the user and/or responders' devices, and/or on a remote server system (e.g., data storage system 106).

Continuous Real Time Recording and Transmission of Information from Responder(s) (306).

Information from the responder(s) may be transmitted in substantially real time by computing devices associated with the responders to a computing device associated with the user(s). This information may include audio/video from the responder's device, photos, text messages, GPS or other localization information. All of this information may be stored locally on the user and/or responders' devices, and/or on a server system (e.g., data storage system 106).

Remote Control of User's Device (308).

The Responder(s), through their computing devices/systems, may remotely control the features of the user's device, for example to take high resolution photos using the user's device and have them sent, zoom, capture audio, adjust volume, turn on/off speaker or speakerphone, turn on/off lights, turn on/off alarms, initiate contact with other users, responders, and/or emergency services (e.g., 911 or other emergency services call) from the user's device. The remote control can allow the remote user any of the functions available locally to the user who is physically present with the device.

Help User (310).

The Responder(s), through their computing devices/systems, may help the user, for example by communicating with the user or with a potential assailant through a display and/or speakers on the user's computing device. For example, the Responder may indicate, through the output subsystem of the user's computing device, to an assailant that they are being videotaped, that they should stop, or even that they are under arrest/being detained.

Dispatch Further Help (312).

The Responder(s) may, through their computing devices/systems, dispatch additional support, such as emergency personnel or others to the location of the user as determined by their location information, which may be transmitted as coordinates or a map.

Store Incident Information (314).

The information from the incident that is captured/obtained by the computing device of the user, such as all video, audio, locations, times, photos or other information may be stored, for example to apprehend or convict an assailant, determine fault, or aid in emergency medical diagnosis. Such information can be transmitted to one or more appropriate remote computer systems that can provide secure storage of the information (e.g., the data storage system 106).

Identification (316).

In the case of an assailant, criminal, or other person, location or item involved in the incident, information captured/obtained by the user's computing device may be used to identify that person, location or item. For example, an image of the assailant may be compared with photo or other databases to identify who the assailant is to aid in the later capture of the assailant.

Rewards/Incentives for Finding, Capturing (318).

This system, which may be publicly accessible or otherwise accessible to a people who may be interested in/able to provide assistance (e.g., friends of the user, law enforcement), may be used to provide information or incentives to support others in supporting the user (including finding the user), or in capturing an assailant or other criminal involved in the incident.

Black Box Tracking (320).

This system may be used to provide information about the user's situation at a later time that has been transmitted to a remote location, such as the user's locations, battery levels, photos, audio, video recorded from the device, calls, texts, other activities that may be helpful in determining if the user is safe or in danger, and their location. This allows the system to track things other than people as well, including vehicles, pieces of equipment, cargo, perishables, medical supplies, remotely or autonomously controlled vehicles including automobiles and flying drones.

Figure 4:
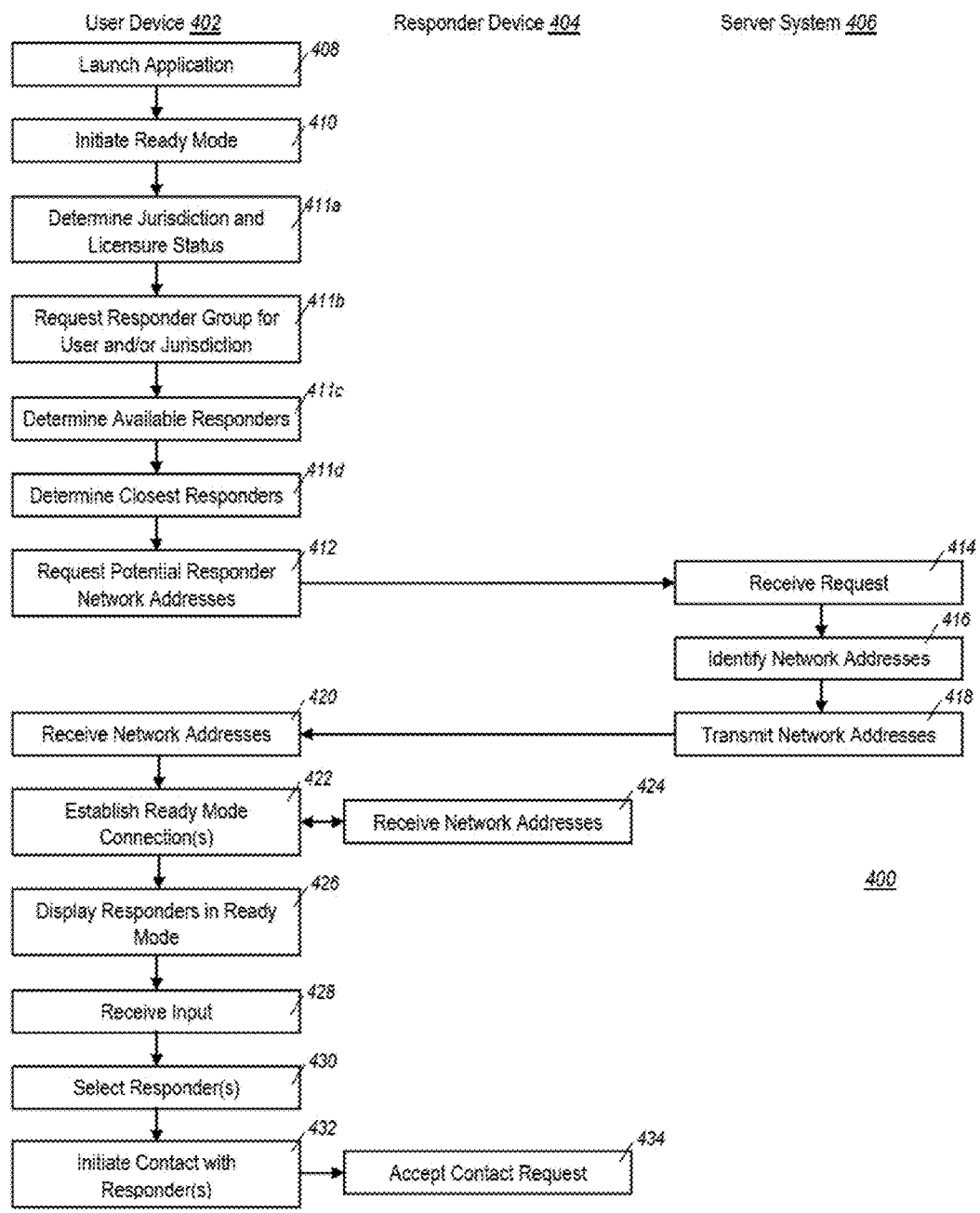
FIG. 4 is a flowchart of an example technique for initiating contact between a user's device and a responder.

FIG. 4 is a flowchart of an example technique 400 for initiating contact between a user's device and a responder. The example technique 400 is depicted as being performed in part by a user device 402, a responder device 404, and a computer server system 406. The example technique 400 can be performed as part of technique 300, for example, at step 302.

Initiating a Session and Finding a Responder to Connect to

One type of example use case of steps depicted in FIG. 4 is that the user of a device may launch a safety application on their mobile device, their location, subscription level, and responder groups may be determined, and based upon this an available responder may be selected that is most appropriate for them (for example the responder in their primary responder group who is physically closest to them, available online, and in the correct jurisdiction). Then, a connection may be established with that responder, either for 'Ready Mode' or for initiating a two-way communication session.

The user device 402 may be any of a variety of appropriate computing device, such as a mobile computing device (e.g., mobile computing device 102, mobile computing device 202). For example, the user device 402 can be a user's IPHONE running an IOS app that allows user to press a button to initiate contact via any of a variety of appropriate connection, such as WiFi, BLUETOOTH, 3G/4G, other mobile or VOIP signal to contact a responder. In another example, the user device 402 can be a user's ANDROID device running an ANDROID app that allows user to press a button to initiate contact via any of a variety of appropriate connection, such as WiFi, Bluetooth, 3G/4G, other mobile or VOIP signal to contact a responder. In a further example, the user device 402 can be a user's computer or tablet running an application that allows user to press a button to initiate contact via any of a variety of appropriate connection, such as WiFi, Bluetooth, 3G/4G, other mobile or VOIP signal to contact a responder.

The responder device 404 can be any of a variety of appropriate computing device (e.g., other computing devices 108a-d, other computing device 204), and can be similar to the user device 402. For example, the responder device 404 can be an IPHONE, an ANDROID device, a computer, or a tablet. Like the user device 402, the responder device 404 can also run an application, designed for an appropriate operating system of the responder device 404, to initiate contact over any of a variety of appropriate connections, such as WiFi, Bluetooth, 3G/4G, other mobile or VOIP signal to contact a responder.

The computer server system 406 can be any of a variety of appropriate computing device or devices that act in a server role providing information to clients in response to requests. For example, the computer server system 406 can be an application server that provides information for an application to client devices, such as the user device 402 and the responder device 404.

The user device 402 can launch the application (408) in response to any of a variety of appropriate inputs. For example, the application may be launched on the user device 402 by a dedicated or selectable/configurable button. The application may be launched on the user device 402 by pressing a virtual button on the device screen. The application may be launched on the user device 402 by dropping or shaking the device. The application may be launched on the user device 402 remotely by someone else, such as by a user of the responder device 404. The application may be launched on the user device 402 by voice command/voice recognition. The application may be launched on the user device 402 by automatic recognition of a surrounding event or situation (e.g., face recognition, location recognition, position recognition, proximity to another device or user, distance from another device or user, entering or leaving a defined area). The application may be launched on the user device 402, which may serve a role as a primary mobile device, by communication with another associated mobile device, such as a button on a watch, necklace, or other device. This other device may communicate with the primary mobile device by wired or radio communication, such as WiFi or BLUETOOTH.

In some implementations, after the application has been launched the application can enter Ready Mode (410). Ready Mode is a mode of operation during which connections with other computing devices, such as the responder device 404, are established and available in advance of initiating contact to communicate (e.g., video chat, call) with users of the other computing devices. The connections with the other devices can be peer-to-peer connections. Ready Mode may be entered automatically after the application has been launched or may be entered in response to user input (e.g., selection of a physical or virtual button, shaking the device) directing the application to enter Ready Mode.

Ready Mode can be initiated on the user device 402 through the following steps 411-422. Steps 411*a-d* can be performed to identify appropriate devices for the user device 402 to connect with as part of Ready Mode. For example, some responders may need to be licensed within the jurisdiction (e.g., city, county, state, country) where the user device 402 is located to provide assistance to the user. Accordingly, the user device 402 can determine one or more jurisdictions that is currently located within and can identify licensure requirements for such jurisdictions (411*a*). Such jurisdictional determination may be done through local data sources, such as jurisdictional and licensing information downloaded and maintained on the user device 402, and/or through remote data sources, such as jurisdictional and licensing information maintained and made available by the server system 406 and/or other computer systems. In another example, the user may have a predefined list of other users, such as friends, family, and/or specific emergency responders, that the user prefers to use as responders. The user device 402 can request a group of responders that are included on the user's predefined list(s) and/or responders who are licensed to assist within the user's current jurisdiction (411*b*). Such a request can be provided to one or more remote computer systems, such as the server system 406 and/or other computer systems.

Using the initial group of responders who satisfy one or more criteria (e.g., on the user's predefined list, able to assist within the jurisdiction) for the user device 402, the user device 402 can determine which of those responders are currently available to assist (411*c*). Such a determination can be made by polling the responder devices and/or by polling a remote computer system (e.g., server system 406) that maintains status information (e.g., current availability) for the responders. From the identified responders (e.g., available responders able to assist within the jurisdiction), the closest responders can be determined (411*d*). Such a determination can be made by obtaining location information for the responders, determining distances from their locations to the location of the user device 402, and identifying a portions of the responders who are closest to the user device 402 (e.g., closest n responders, responders within threshold distance). The location information for the responders can be obtained by polling the responders and/or by requesting such information from a remote computer system (e.g., the server system 406). The steps 411*a-d*, in whole or in part, may alternatively be performed by a remote computing device, such as the server system 406, and/or may be performed in association with different steps in the technique 400, such as being performed at step 430.

To establish a peer-to-peer connection with the responder device 404 as part of Ready Mode, the user device 402 can transmit a request for the network addresses (e.g., IP addresses, local area network addresses) other computing devices associated with responders (412), such as the responder device 404. The request can be transmitted to the server system 406, which can maintain a list of the current network addresses (e.g., IP addresses) of computing devices that are using the application and services provided by the server system 406. The request can include information identifying the user device 402 and/or a user of the user device 402, such as a user id.

The server system 406 can receive the request (414) and can identify network addresses for other computing devices (416). The server system 406 may limit the network addresses that are identified to particular other computing devices, such as those that have been preselected by the user of the user device 402 as responder (e.g., family, friends), responders that are located near the user device's current location (e.g., police officers located near the user device 402, an appropriate 911 dispatch given the location of the user device 402, other users who are located with a threshold distance of the user device 402), and/or responder services (e.g., professional security services) that can manage response efforts and that can involve additional responders, such as police and other emergency responders, as needed. Once identified, the server system 406 can transmit the IP addresses to the user device 402 (418).

The user device 402 can receive the IP addresses (420) and can use them to establish Ready Mode connections with responder devices, such as the responder device 404 (422). The responder device 404 can connect with the user device 402 (424). The connection between the user device 402 and the responder device 404 can be peer-to-peer, which may be blocked by firewalls at either end of the connection. To avoid this a variety of techniques can be used, such as both sides attempting to connect to each other simultaneously (in case one side can't accept incoming connections but can make outbound connections), hole punching (e.g., UDP hole punching, TCP hole punching), and/or deploying relays (e.g., TURN servers).

Figure 10:
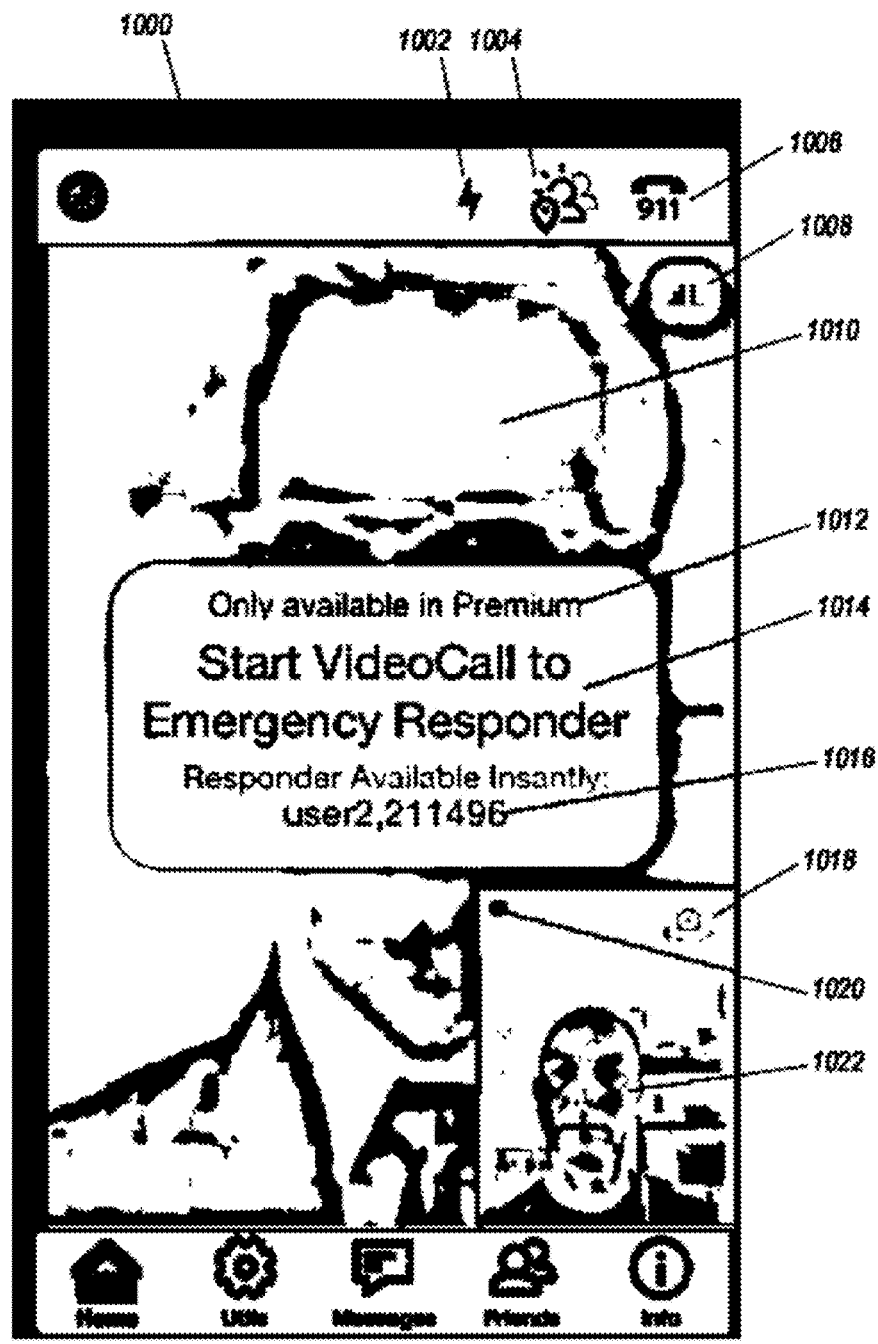
FIG. 10 is a screenshot of a user interface that can be presented on computing devices in Ready Mode.

The user device 402 can display (or otherwise present) the responders who are connected to the user device 402 in Ready Mode. Examples of such a display are depicted in FIGS. 10-11. In Ready Mode, a peer-to-peer connection is established between the user device 402 and the responder device 404, as indicated by steps 422 and 424. Thereafter, in Ready Mode the user device 402 can display the Responder continuously by live video, or may display an image of the available responder, with such video and images being transmitted from the responder device 404 to the user device 402 over the established peer-to-peer connection. This allows the user to see that the responder is available. The responder device 404 may not receive videos or images from the user device 402 and, thus, the responder may not see the user. The responder device 404 can be available to many users at once in this mode. In some implementations, the responder device 404 may receive and display the plurality of users connected to the responder in Ready Mode by live video. In some implementations, the responder device 404 can see the plurality of users connected to the responder in Ready Mode by live video while the user devices (e.g., user device 402) do not receive or display video or images of the responder.

Whether or not in Ready Mode (the user device 402 does not need to first enter Ready Mode), the user device 402 can monitor for user input to initiate contact with one or more responders. When the user device 402 receives input to initiate contact with a responder (430), who may or may not be specified through the input, the user device 402 can select one or more responders to which the contact should be initiated (430) and can proceed to initiate contact with the selected responders (432), which can be accepted, automatically or in response to user consent, by the responder device 404 (434). The contact can include communication with a responder, such as video conferencing, audio conferencing (e.g., telephone call), and/or text messaging.

Contact can be initiated in a number of ways, such as shaking and/or dropping the user device 402 (e.g., detected through measurements by accelerometer(s)) and/or releasing contact with a virtual and/or physical button to indicate an emergency or intent to initiate contact. For example, in Ready Mode, a user may press a button (or provide input in any other appropriate way) to initiate contact with the Responder. Since the connection, which may be a peer-to-peer connection, between the user device 402 and the responder device 404 is already made through Ready Mode, a live video or audio call may be started between the user device 402 and the responder device 404 substantially immediately, for example in a fraction of a second.

Responders can be selected for contact at step 430 in any of a variety of ways. For example, any available responders can be selected for contact with the user device 402. In another example, responders can be selected based on the location of the user device 402 and the responders. For instance, contact may be initiated with the nearest available responder based upon the localization information of the responder and user device 402, which can be provided for in any of a variety of ways, such as by GPS, WiFi, cellular, or pre-defined localization information (E.g. physical address). In another example, responders can additionally be selected based on preferred responder lists that have been designated by the user of the user device 402, such as lists identifying particular family members or friends. Such lists may provide cascading lists of preferences and/or may designate particular responders for particular situations (e.g., medical emergency, crime). Other responder lists may also be used, such as dedicated lists of emergency responders that service an area where the user is located. In a further example, responders can additionally be selected based on user ratings of responders. For instance, responders who have been rated as providing great service may be preferred and selected over other responders who have been rated as providing poor levels of service.

The contact can be made using any of a variety of appropriate protocols, such as peer-to-peer ad-hoc networks for audio or video or data communication, communication with or through a central server (e.g., the server system 406), and/or wireless communication using existing or future protocols, such as chat protocols (e.g., open system for communication in realtime protocol (OSCAR), talk to OSCAR protocol (TOC), iMessage protocol, Gadu-Gadu protocol, simple anonymous messaging protocol (SAM), ICQ protocol, internet relay chat protocol (IRC), QQ protocol, secure internet live conferencing protocol (SILC), Skype protocol, extensible messaging and presence protocol (XMPP), Microsoft notification protocol (MSNP), web real-time communication protocol (WebRTC)), voice over IP (VoIP) and video conferencing protocols (e.g., H.323, Media Gateway Control Protocol (MGCP), Session initiation Protocol (SIP), H.248 (also known as Media Gateway Control (Megaco)), Real-time Transport Protocol (RTP), Real-time Transport Control Protocol (RTCP), Secure Real-time Transport Protocol (SRTP), Session Description Protocol (SDP), Inter-Asterisk eXchange (IAX), Jingle XMPP VoIP extensions, Skype protocol, Teamspeak), messaging protocols (e.g., short messaging service (SMS), multimedia messaging service (MMS), enhanced messaging service (EMS)), and/or other appropriate communication protocols.

Contact and other functionality described here may use existing or future one-to-many, many-to-one and many-to-many connection systems, including social networks, such as FACEBOOK, TWITTER, SNAPCHAT, INSTAGRAM, WHATSAPP, VINE, email, and/or other appropriate systems.

The state of the user, friend or responder may be viewable by their peers/friends/opponent, including but not limited to whether the person is in the app (e.g., has launched the application, is currently using the application, whether the application currently has focus on the user's device), whether they are already on the phone or on a video call or participating in text messaging, when the last time that they communicated was, what their last location was, whether they are at a designated location, and/or whether they are currently located in a safe or dangerous or other zone (e.g., using pre-defined 'geofenced' areas defined geographically or by proximity to a given location).

As part of the contact and communication between the user device 402 and the responder device 404, the user may record video of themselves or their surroundings using a plurality of cameras on their mobile device (user device 402), as depicted in FIG. 10-11. Some of the features that may be included in this mode are shown in these figures. This video may be saved locally on the user's device, may be saved to the responder's device, or may be saved to the web/internet/cloud on a fileserver.

FIGS. 5A-F are flowcharts of an example technique 500 for communicating between a user device and a responder device as part of a security session. The example technique 500 can be performed in part by the example user device 402, the example responder device 404, an example data storage system 403, an example restricted computer system 405, example other responder devices 407, an example emergency responder device 409, and example other devices 411. The example data storage system 403 is a computer system that remotely stores data transmitted by user and responder devices, and can be similar to the data storage system 106 and/or the data storage system 208. The example restricted computer system 405 can be a computer system that restricts data access to particular authorized users, such as computer systems associated with law enforcement (e.g., local police, FBI, CIA), the military (e.g., DOD, army, navy, airforce, marines), social networks (e.g., FACEBOOK, TWITTER), and/or other private companies (e.g., security companies, data aggregators). The example other responder devices 407 can be devices that are associated with additional responders who are different from the responder device 404. The example emergency responder device 409 can be associated with one or more emergency responders (e.g., police, fire fighters, EMTs) and can be a handled computing device (e.g., smartphone) or an embedded system within a mobile unit (e.g., car, ambulance). The example other devices 411 can be other computing devices that are available for receiving and outputting audio/visual information.

Figure 5A:
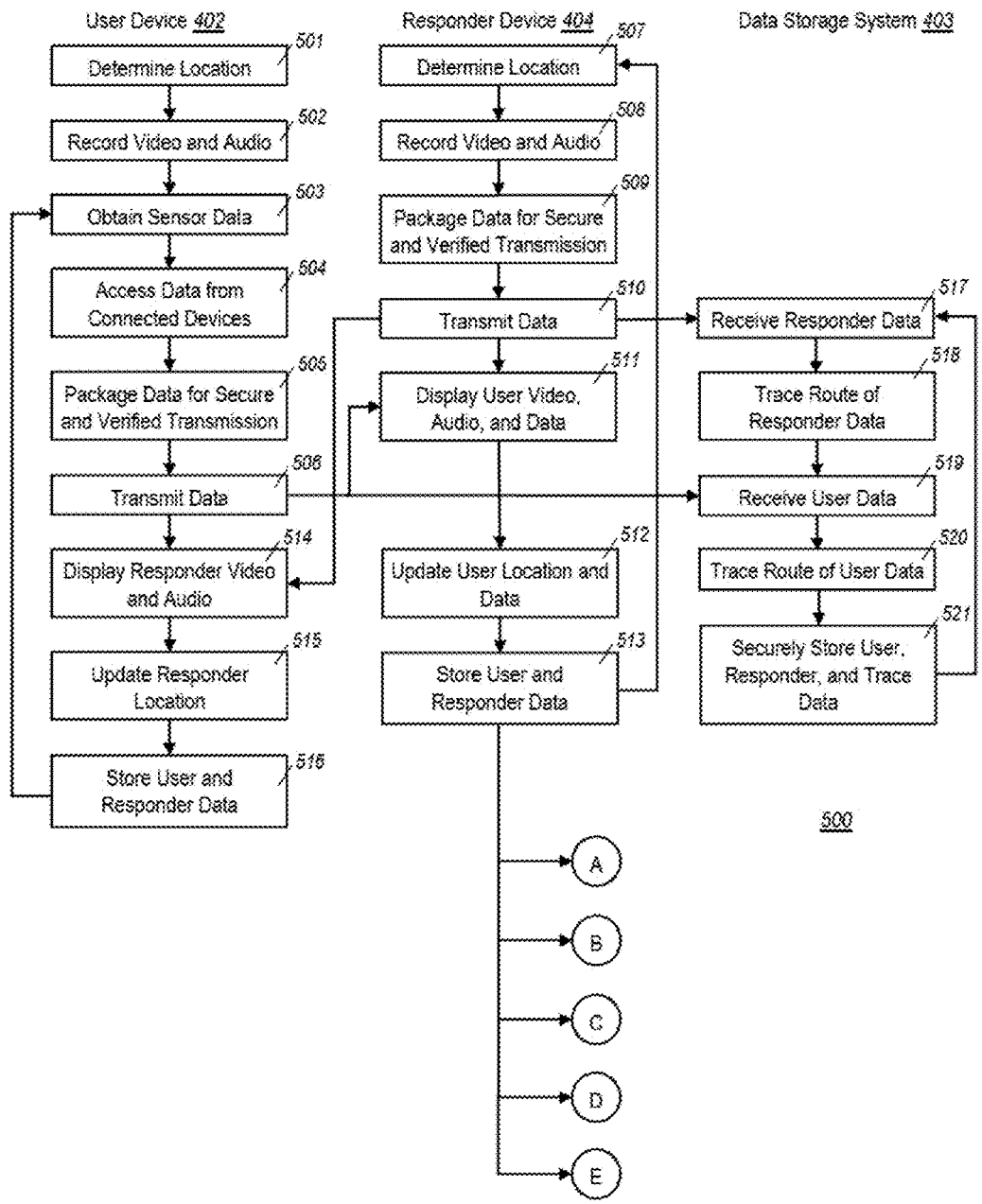
FIGS. 5A-F are flowcharts of an example technique for communicating between a user device and a responder device as part of a security session.

FIG. 5A depicts two-way communication between the user device 402 and the responder device 404, while concurrently securely transmitting and storing data associated with the communication at the data storage system 403. For example, FIG. 5A depicts steps for continuous real time recording and transmission of information from the user device 402, continuous real time recording and transmission of information from the responder 404, and helping the user of the user device 402, as described above with regard to steps 304, 306, and 312, respectively.

Connection, Location, Secure Two-Way Communication, Transmission and Storage of Data Information from the user device 402 or their situation may be transmitted in substantially real time to the responder 404 (or multiple responders). This information from may include audio/video from the user's device, photos, GPS or other localization information. All of this information may be transmitted synchronously or asynchronously (with a delay). The intent may be to ensure that as much information is transmitted as possible, especially in the event that the time to transmit is limited. This information from may include audio/video from the user's device, photos, GPS or other localization information.

For example, the user device 402 determines its location (501) (e.g., determining GPS coordinates, determining micro-location), records audio and video using microphones and cameras that are part of or accessible to the user device 402 (502), obtains sensor data from one or more sensors that are part of or accessible to the user device 402 (503) (e.g., time sequenced motion sensor data), accesses data from one or more devices that are connected to the user device 402 (504) (e.g., obtain audio and/or video signals from wearable devices with cameras and/or microphones, obtain motion sensor data), and packages the obtained data (location, audio/video, sensor data, other data) for secured and verified transmission to the responder device 404 and, concurrently, to the data storage system 403 (505).

The video can be obtained by the user device 402 using equipment capable of detecting electromagnetic radiation outside of the visible spectrum, such as infrared signal and/or other night vision technologies. Additionally, the user device 402 may include technology that is capable of detecting the presence and location of nearby physical objects, such as through sonar devices and other appropriate technologies. Depending on the situation facing the user, it may be difficult for the user to maintain a steady camera shot. The user device 402 can use image stabilization technology, both hardware and software, to produce video that will be easier for the responder to view and understand. Additionally, the user device 402 can passively obtain information regarding other devices that are located nearby that are transmitting wireless signals which may provide a lead as to the identity of the assailant. All such data, and other data not explicitly described but available or accessible to the user device 402, can be obtained, packaged, and transmitted to the responder device 404 and the data storage system 403.

The packaging of the data may be provided using means that allows for verification of a secure and validated connection or transmission path from the user to the recipient, or to online storage. For example, information transmitted between the user and responder, or recorded by the user or responder, may be encrypted using digital encryption, and may also include a custom digital watermark or timestamp or location stamp that may also use encryption to verify the identity and time of transmission of the user, responder or both. This technology may provide a means of verification of information transmission, for example for the use in verifying from when and where and what user this information was transmitted. This may be used later to verify this information for use as evidence. These encryption steps may be performed locally on the mobile device of the user. These encryption steps may be performed on the responder device. These encryption steps may be performed on a remote server.

The user device 402 can transmit the packaged data to the responder device 404 and to the data storage system 403 (506). The responder device 404 can update the presentation of information about the user based on the received data, such as displaying the received user video, audio, and data (511) and updating a display of the current location of the user device 402 (512). Additionally, the responder device 404 can store the data received from the user device 402 as well as the data obtained on and transmitted by the responder device 404 (513).

The responder device 404 can obtain and transmit similar information to what the user device 402 obtained and transmitted, which may be transmitted in substantially real time to the user device 402. This information from may include audio/video from the responder's device, photos, GPS or other localization information. For example, the responder may be displayed on the user's device, as in videoconferencing, video chat, and/or video broadcast. Also, pre-recorded audio, images, or video may be transmitted by the responder device 404 and displayed on user device 402.

For example, the responder device 404 can determine its location (507), record video and audio of the responder using cameras and microphones that are part of or connected to the responder device 404 (508), and package the data for secure and verified transmission in the same way as the packaging of the user device data (509). The responder device 404 can transmit the packaged data to the user device 402 and the data storage system 403 (510).

The user device 402 can display the video and audio of the responder (514) and update a display of the responder location, such as on a map that is displayed in conjunction with the video of the responder (516). In addition to storage by the responder device 404, the user device 402 can store the data received from the responder 404 and the data obtained and transmitted by the user device 402 (516). The video and audio of the responder that is output by user device 403 can help the user, for example by communicating with the user and/or with a potential assailant. For example, the Responder may indicate to an assailant that they are being videotaped, or even that they are under arrest/being detained. In some implementations, the user device 402 the user and responder data can be stored on the user device 402 and/or the responder device 404, and uploaded to the data storage system 403 at a later time, such as when a reliable network connection with the data storage system 403 can be established.

Concurrently with the recording, transmission, and output of real-time information between the user device 402 and the responder device 404, the data storage device 403 can receive and store incident information pertaining to the communication between the user device 402 and the responder device 404. The information from the incident, such as all video, audio, locations, times, photos or other information may be stored, for example to apprehend or convict an assailant, determine fault, or aid in emergency medical diagnosis. As indicated by step 516, this information may be stored on the user's device 402. As indicated by step 513, the information may be stored on the responder(s)' device 404. The information may be stored to a central database on a central server, such as the data storage system 403.

For example, the data storage system 403 can receive the responder data (517) and the user data (519), and can trace the routes over which the responder data and user data are received so as to provide evidence of the chain of transmission (518, 520). The received data and any verification information that is determined or obtained, such as trace routes and timestamps, can be securely stored by the data storage system 403 (521). Such secure storage can include encryption, such as encryption performed by the user device 402 and/or the responder device 404, and/or encryption performed on the data by the data storage system 403.

The information that is stored by the data storage system 403 may be made available later to the user, their supporters/contacts, to emergency personnel, to the general public, or to others. Real time reports of the nature and location of incidents, and any other information provided by this system may be provided to those who need it. In some implementations, emergency responders or police officers carrying mobile devices running the software provided for here may receive real time alerts when an event has taken place near them, including mapped information of its location, photo, video, audio or other information collected about the event. The responders contacted may include those closest to the site of the incident. In some implementations, users of this system may receive real time alerts of nearby incidents, or a map of incidents in their vicinity, which may be sorted or filtered by the time when the event occurred, proximity, types of event, or other factors.

The described storage, transmission and other functions may be performed with or without encryption of the information. All of the information may be owned, controller, or password protected by the user, emergency responder, provider of this technology or others. All of the information collected by this technology may be provided in substantially real time via the web, for example provided to the user, a friend of the user, the responder, or a court. All of the information collected by this technology may be saved, and provided later via the web, for example provided to the user, a friend of the user, the responder, or a court. The control over the dissemination of this information may be given to the user.

As indicated by the arrows looping back to step 501 from step 516, to step 507 from step 513, and to 517 from step 521, the transmission, display, and storage of information across the user device 402, the responder device 404, and the data storage system 403 can be continuous during the 2-way communication between the user and the responder. Although described as being performed in association with the two-way communication, the storage of data from the user device 402 and/or the responder device 404 at the data storage system 403 may be performed independent of the communication. For example, the user device 402 may begin transmitting data (e.g., location, video, audio, sensor data, peripheral device data) to the data storage system 403 for storage without being involved in a communication session with a responder device.

Screenshots are shown in FIGS. 11A-E, and described in greater detail below, show example screens that can be displayed to the caller (user device 402) and a responder (responder device 404) during 2-way communication sessions.

The responder device 404 can additionally perform a variety of actions in association with and during the 2-way communication with the user device 402. Such action, which are linked to by the circles A-E, can be performed alone or in any variety of combination with each other and are described with regard to FIGS. 5B-F.

For example, the responder or user may use pinch-to-zoom video on their own video or the opponent's (peer's) video. The responder or user may see a pinch-to-zoom or other map of the opponent's location, or may receive their address. The Responder may have an automatic or one-click way, through the responder device 404, of connecting with emergency responders responsible for the user, such as connecting with the closest or most appropriate 911 or emergency dispatch center to the user device 402 (e.g., using a PSAP dip procedure). This feature may also allow transmission of information to the 911 or emergency dispatch center, including all aspects of the information/communication between the responder device 404 and user device 402, including but not limited to the user's name, id, photo, video, audio, geolocation, situation, etc. The user's mapped location may be updated on the responder's device 404 in substantially real time, and may be presented to the responder using coordinates (including lat/long/elevation or others), an address or other place location identifier, the location of a previously-identified location such as home, school or a business name, or by depicting the user's name, userid or image on a map, which may be a pinch-to-zoom map.

Figure 5B:
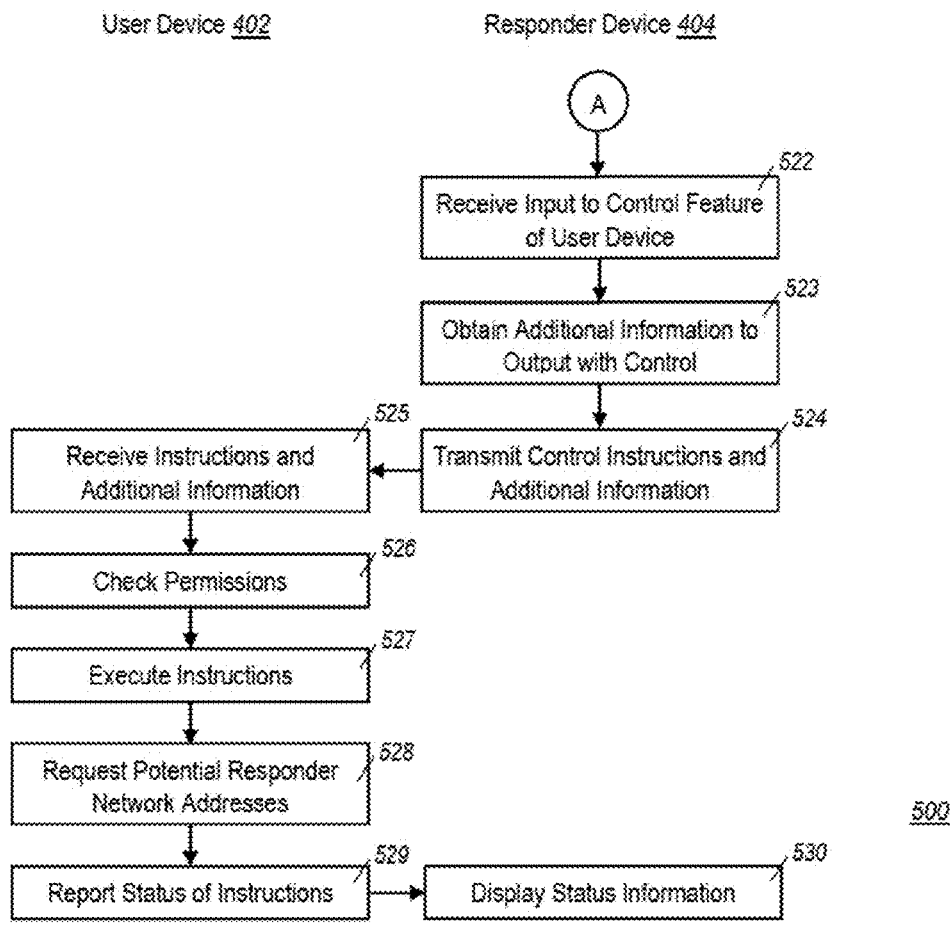

FIG. 5B is a flowchart that depicts steps 522-530 for remote control of one or more features of the user device 402 by the responder device 404. For example, the responder, through the responder device 404, may remotely control the features of the users device 402, for example to take high resolution photos and have them sent, pan, focus, zoom, crop video/camera, capture audio, adjust volume, turn on/off speaker or speakerphone, turn on/off lights, turn on/off alarms, initiate contact with other users, responders, or emergency services (e.g. 911 or other emergency services call) from the user's device 402.

Remote Control

An example use case is that a user may want to start audiovisual two-way communication with the mobile device of their friend (if their friend has given them permission to do so), without the friend having to interact with the friend's device. This may be useful in situations where the friend may not be able to interact with their device, for example if they are not in possession of it, or if they are restrained or incapacitated in some way. Another example use can is that a user may want to start audiovisual two-way communication with their own mobile device, for example if their device is lost, so that they can see what is near their device to try to recognize its location, or communicate with anyone nearby, or send a pre-recorded message, such as explaining the owner of the device or giving instructions to anyone who can hear.

The responder device 404 can receive input to control one or more features of the user device 402 (522). Based on the received input, the responder device 404 can obtain additional information to be output with the controlled feature on the responder device 402 (523). For example, the responder can select an audio recording to play on the user device 402 (e.g., siren, message warning assailant to leave the user alone). In another example, the responder can select an image to present on a display of the user device 402, such as zoomed in and enhanced image of the assailant's face so as to demonstrate to the assailant that their identity has been recorded by a third party monitoring the situation. The responder device 404 can transmit the control instructions and additional information to the user device 402 (524).

The user device 402 can receive the instructions and additional information (525) and can check permissions to determine whether to perform the operations instructed by the responder device 404 (526). The permissions may be predefined and/or rule based, and may be explicitly identified (e.g., preapproved list of responders with permission) or implicit (e.g., any responder that was contacted by the user device 402 can be provided with implicit permission). If the responder device 404 is determined to have permission, the user device 402 can proceed to execute the instructions (527). For example, executing the instructions may toggle various feature on/off, such as cameras, speakers, microphones, displays, and/or lights (flashlights), and/or allow various adjustments to be made to currently enabled features, such as allowing for pin and zoom of the camera on the user's device 402 by the responder device 404. If additional information is provided by the responder device 404, it can be output by the user device 402 (528) (e.g., display image and/or play an audio file provided by the responder device 404). The user device 402 can report the status of the instructions (e.g., status of the feature that was changed) to the responder device 404 (529), which can in turn display the status information to the responder (530).

Figure 5C:
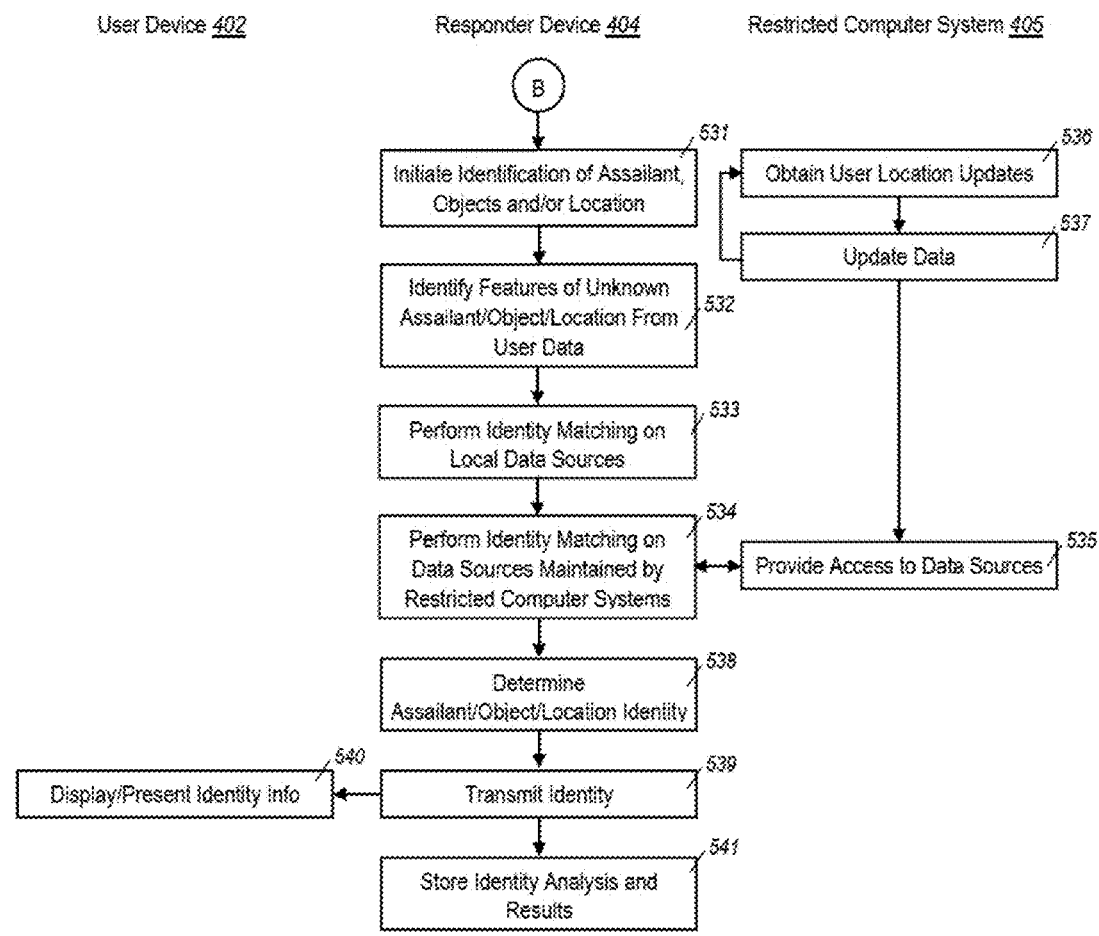

FIG. 5C is a flowchart that depicts example steps 531-541 for identifying an assailant based on information received from the user device 402. In the case of an assailant, criminal, or other person, location or item involved in the incident, information obtained by the user device 402 may be used to identify that person, location or item.

Identifying a Person or Assailant

In an example use case, photos or video of an assailant, user, or other person, landmark or object may be compared with photo or other databases to identify who/what they are. In the case of an assailant, this may be used for later capture, or this identity information or other information about the identified person may be transmitted to the user in substantially real time.

For example, information collected from the user device 402 about an assailant or other criminal suspect may be compared manually or using automatic image-recognition software against databases of images of people, including past-criminal databases, to identify the likely identity of suspects. This approach may be used with other types of information, including audio recordings (voice pattern matching), gate and movement information, other biometric information. This information may be used in combination other information to improve accuracy. Such other information may include locations, affiliations, types of prior crimes, or other information to narrow down searches.

The responder device 404 can initiate identification of an assailant, objects, and/or a location where the user device 402 is located either automatically upon receiving data from the user device 402 or in response to input from the responder to begin such a process (531). The responder device 404 can identify features (e.g., face, proportions, size, shapes) of the unknown assailant, object/location from the data received from the user device 402, such as photos, videos, audio data, and/or nearby wireless devices (532). The responder device 402 can perform one or more identity matching operations for such features using local data sources, such as data sources that are maintained by the responder device 404 (e.g., repository of user identities) (533). The responder device 404 may additionally draw on data sources that are maintained by one or more restricted computer systems 405, such as computer system maintained by police, military, social networks, and/or private companies (534). Such other data sources can include a variety of identifying information on users, such as images, voice patterns, recent/current location information, and/or proportion information.

For example, in addition to having user profile information (e.g., name, address, telephone number, registered vehicles) the entity associated with the restricted computer system 405 may obtain consent from users to receive and use current location information for the users. For instance, car insurance companies offer the possibility of discounts to their customers in exchange for constantly tracking the location of their car. In another example, users frequently offer their location information to social networks as a way of notifying others of their location and/or receiving rewards. Government entities track the location of criminals through the use of monitoring bracelets, which can be offered and used as a way for released criminals to prove that they were not involved in a new crime for which they may be suspect based on their time sequenced location data. The restricted computer system 405 can obtain such user location updates (536) and can accordingly update its database (537), which the responder device 404 can be provided with access to (535) to perform its identity matching.

Based on the identity matching, the responder device 404 can determine one or more candidate identities for the assailant/object/location (538), which can be transmitted to the user device 402 (539) and stored locally on the responder device 404 (541). The user device 402 can receive the identity information and can present/display it to the user and/or assailant (540). For example, the user device 402 can receive the identity of the assailant and can announce the name of the identified assailant as well as the assailant's address and telephone number. Such information can be persuasive in convincing an assailant that they are not going to get away with a crime against the user if one is perpetrated, and can accordingly act as a deterrent from such action and provide security to the user.

Figure 5D:
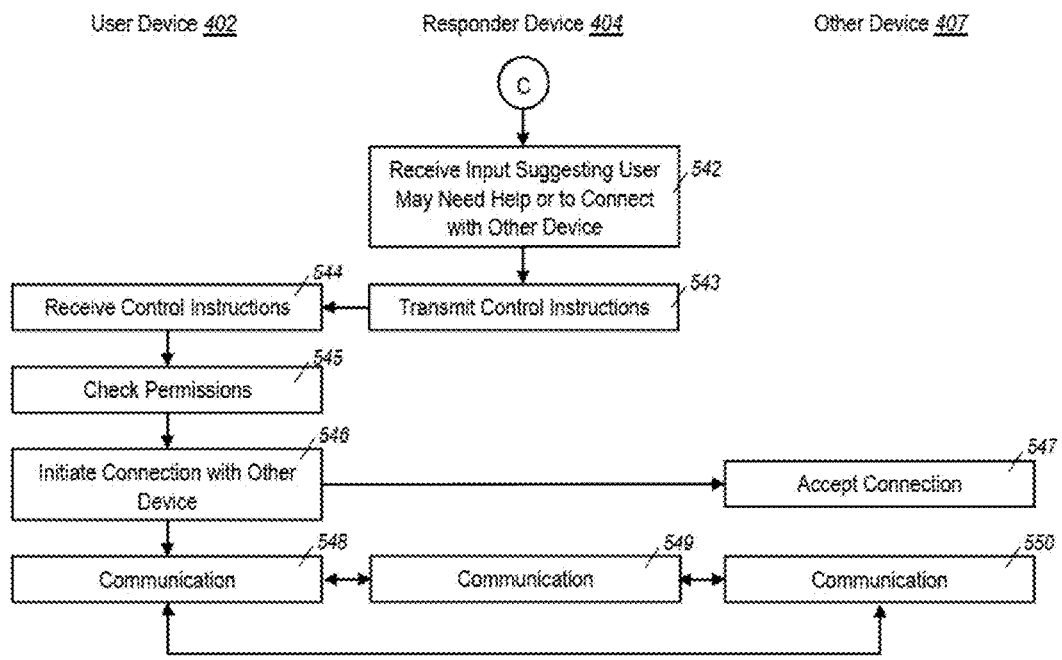

FIG. 5D is a flowchart that depicts example steps 542-550 for remotely helping the user device 402 initiate and establish a connection with another device 407.

Initiating Communication Between Other Parties

In an example use case, the responder device 404 can make a communication connection between the user device 402 and a safety responder's device (example other device 407), so that communication begins between the user and the safety responder. This communication connection may include an audio call, video call, instant messaging session. All of these may take place within a dedicated app, or may take place using standard infrastructure (e.g. third party phone lines, SMS connection, videoconferencing capability). For example, if person A receives an alert message that their friend person B may be in trouble, person A can directly initiate communication between person B and safety responder R, including without person B or responder R performing any additional action.

In another example, the responder device 404 can make a communication connection between the user device 402 and a device (other device 407) of one of the user's friends, so that communication begins between the user of user device 402 and the friend of that user. This may take place even though the responder may not have direct knowledge of who the friend of the user that they are forming the connection to is. For example, the responder may send out a message or connection request to all of the friends who the user of user device 402 has previously selected, even though the user of user device 402 may not have direct access or knowledge of this list. This communication connection may include an audio call, video call, instant messaging session. All of these may take place within a dedicated app, or may take place using standard infrastructure (e.g. third party phone lines, SMS connection, videoconferencing capability).

In another example, the responder 404 can perform any of the other functions provided here on the user device 402. Some of these include: reporting an incident, taking a photo, uploading text, a photo, audio or video to the cloud (including using encryption based on the user device 402's encryption information, the responder device 404's encryption information, or both), placing a text message from the responder device 404 to authorities (e.g. to a PSAP/911 dispatch center), connecting with one of the responder's hero (designated/preferred responders), even if the user of user device 402 does not know who this is.

The responder device 404 can receive input suggesting that the user may need help or requesting that the user device 402 connect with the other device 407, even though the identity of the other device 407 and/or a user of the other device 407 may not be known to the responder or the user of the user device 402 (542). The responder device 404 can transmit control instructions to initiate the connection to the user device 402 (543).

The user device 402 can receive the control instructions (544) and can check whether the responder device 404 is permitted to perform such an action (545). The permissions may be predefined and/or rule based, and may be explicitly identified (e.g., preapproved list of responders with permission) or implicit (e.g., any responder that was contacted by the user device 402 can be provided with implicit permission). If the responder device 404 is determined to have permission, the user device 402 can proceed to initiate the connection with the other device (546). If the identity of the other device is not specified in the instructions from the responder device 404, the user device 402 may proceed to select an appropriate responder, similar to the techniques described above with regard to step 430 in FIG. 4. If the IP address of the other device 407 is not known, the user device 402 can automatically identify it by contacting a central server system 406, as described with regard to steps 412-420.

The other device 407 can accept the connection with the user device 402 (547) and communication between the other device 407 and the user 402 can take place, which may additionally include communication with the responder device 404 (548-550).

Of the steps 542-550 that are described as being performed by the responder device 404 can also be performed in the reverse by the user device 402, and vice versa.

Figure 5E:
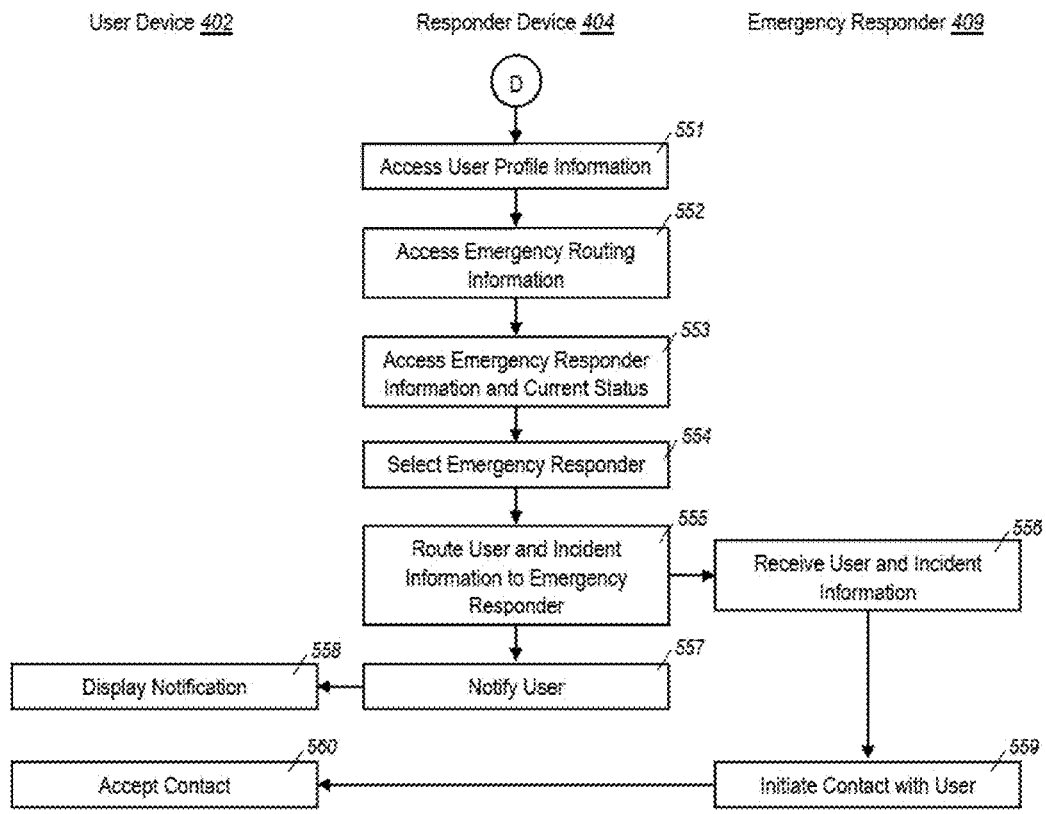

FIG. 5E is a flowchart that depicts example steps 551-560 for routing the user device 402 to an appropriate emergency responder 409.

Routing Connection to an Appropriate Responder

In an example use case, identifying an appropriate emergency responder to handle a particular type of incident at a particular geographic location can be a complex issue to solve, especially when the user requesting services is not automatically routed through a public system (PSTN) to an appropriate local responder. For instance, the jurisdictions for different types of emergency responders (police, fire fighters, EMS) may not correspond to each other and may change frequently, even depending on the current day and time.

To properly handle and route the user device 402 to the appropriate emergency responder 409, the responder device 404 can access user profile information for a user of the user device 402 (551). Such information may be stored locally by the responder device 404, which can be a part of a professional security service with which the user of the user device 402 has established an account. Accordingly, this may save the user from having to provide all of his/her pertinent details (e.g., name, age, address, medical conditions, appearance, contact information) and, instead, the user device 402 may simply provide his/her id (e.g., device id, user id) with the responder device 404 for retrieval of this information.

The responder device 404 can access emergency routing information, which may be maintained in an up-to-date state by the responder device 404 (552), or in a connected network or database. Such emergency routing information can include geographic boundaries for various emergency responders, rules for when these boundaries may change, and other nuanced information regarding coverage by emergency responders in various geographic locations. An example of such emergency routing information is a PSAP system. In this example, the responder may determine the correct 911 or emergency dispatch center (or PSAP) based on the physical location of the user.

The responder device 404 may additionally have access to information regarding emergency responders and their current status (e.g., working, on a call, available, offline). Such access may be limited to particular responders, such as professional security service providers which may have contracted with various emergency responders throughout a geographic region to have access to such information. The responder device 404 can access the emergency responder information (e.g., skills, training, experience, geographic locations served, previous results) and the current status information for the emergency responders (554). The emergency responders for whom this information is obtained may have been selected based on the appropriate emergency routing information.

A portion of the emergency responders that are identified and for whom status information has been obtained can be selected based on a variety of factors, such as current availability, proximity to the user of the user device 402, appropriate training, skills, and/or experience to handle the user's situation (555), and the user's membership in different responder groups, or the user's subscription status or level (for example free, paid, premium). With the appropriate emergency responder(s) selected, the responder device 404 can route information regarding the user and the incident to the emergency responder device 409 that is associated with the selected responder (555).

The emergency responder 409 can receive the information regarding the user and the incident, and can use that information to begin providing assistance to the user (556). Such assistance can include travelling to the user's location or dispatching someone to the user's location (as conveyed in the information from the responder device 404), monitoring the user's situation (can be linked to the responder's data feed from the user), and/or can initiate contact with the user device 402 (559). The user device 402 can accept such contact 560, for example, the user device 402 may auto-answer the contact request from the emergency responder 409 and/or permit access to control of features on the user's device 402 (560).

For instance, the responder device 404 may dispatch additional support, such as emergency personnel or others to the location of the user device 402 as determined by their location information, which may be transmitted as coordinates or a map. For example, the responder(s) or contacts of the user may receive a map with real time updates showing the user's location, and/or their location, and/or the location of other responder(s) or contacts involved or potentially involved in supporting the user in their situation. This may include either the pre-selected contacts of the user, or other people available for support, such as other members of a network of people using this technology who have offered to be of service.

The responder device 404 may also notify the user of the selected emergency responder 409 (557), which the user device 402 can display to the user or others nearby (558).

Figure 5F:
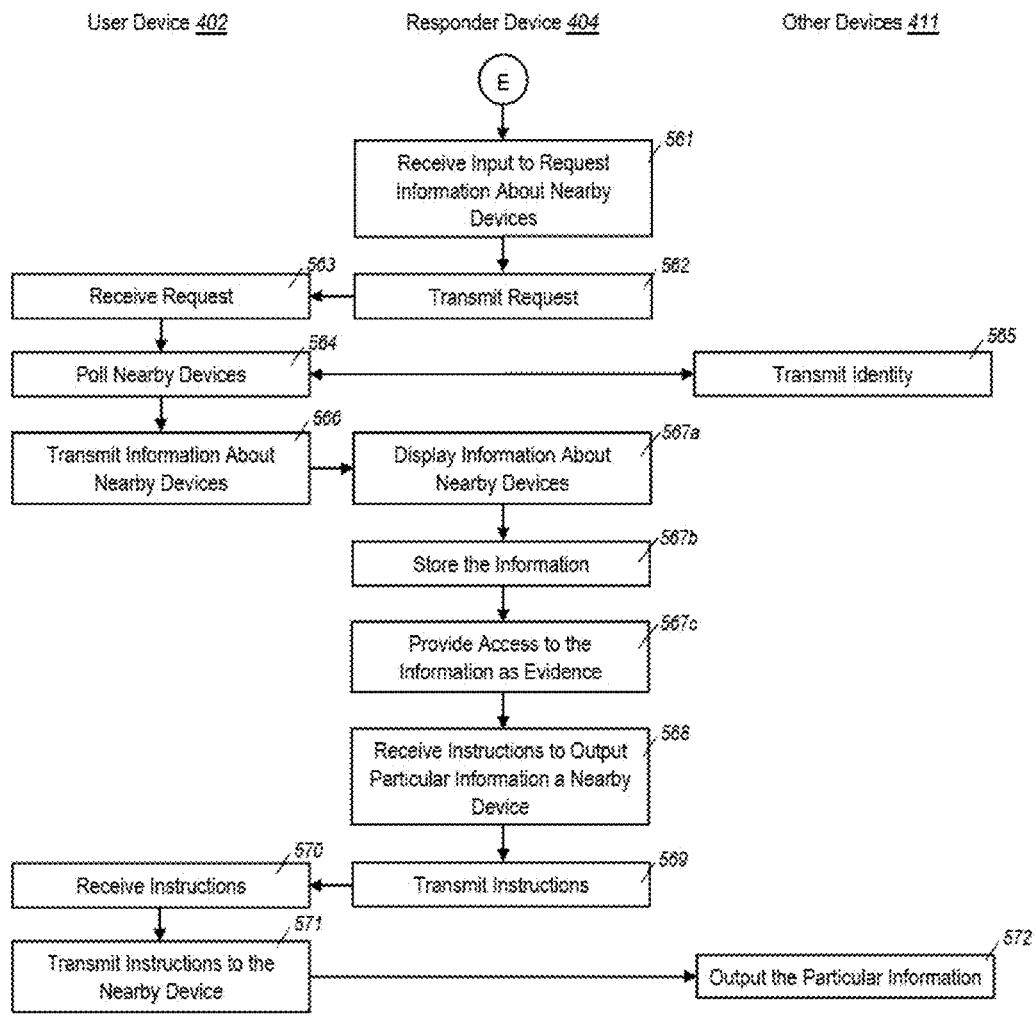

FIG. 5F is a flowchart that depicts example steps 561-571 for causing other devices 411 that are located near the user device 402 to audibly and/or visually output information or record or monitor information.

Engaging Nearby Devices

In an example use case, the responder device 404 can direct the other device 411 (e.g., devices with displays and speakers) to output alarms and other messages (e.g., audio and/or video recorded of the responder) to solicit help for the user of the user device 402 from people located nearby and/or to identify the assailant to others in the area. For example, if a user is in an emergency in a public or private facility with appropriate other devices 411, they can activate emergency alarm sounds or lights or recording on the other devices to enhance their safety, or the safety of others at the facility.

The responder device 404 can received input to request information regarding devices that are located nearby the user device 402 (561). The responder device 440 can transmit the request to the user device 402 (562), which can receive the request (563) and identify nearby devices through polling the devices (564). Polling of the devices can be performed on a periodic and/or continuous basis, and can be performed before the input to request information about nearby devices is received. The other devices 411 can transmit their identities (565), which can be detected by the user device 402. The user device 402 can transmit information (e.g., existence, identity, type of device) regarding the nearby device to the responder device 404 (566), which can display information regarding the nearby devices to the responder (567*a*). The information can additionally be stored (e.g., by the responder device 404 or other computer devices, such as the data storage system 403) (567*b*) and access can be provided to it as a form of evidence of what is/has happened to the user of the user device 402 (567*c*). The responder device 404 can receive instructions to output particular information on one or more of the nearby devices (568), which can be transmitted to the user device 402 (569).

The user device 402 can receive the instructions (570) and can transmit the instructions with the particular information to the nearby devices (571). The other devices 411 can receive and output the particular information (572).

The example technique 500 can be used in a variety of scenarios. For instance, in one example medical emergency scenario the user has a medical emergency, uses their mobile device (user device 402) to run an app provided for by the disclosed technology to connect a video session with a responder (responder device 404), and the responder may communicate with the user, view the user or their emergency situation, offer advice, dispatch medical care or other personnel, or contact others.

Assailant Scenario In an example assailant scenario, the user is attacked or threatened by an assailant. The user may deploy their mobile device (user device 402) to dissuade such an assailant. If the user holds up the device 402, the disclosed technology provides that the device 402 and software may take video recordings of the assailant, and may allow the assailant to see a police officer, security officer, emergency responder, or one of the user's contacts, who may communicate with the assailant. For example, the responder (using responder device 404) may say "I see you, I have recorded images and video of you, we can identify you, we know exactly where you are, and anything further that you do may be used against you in a court of law." If the responder is a police officer, they may even place the assailant under arrest or detain them until law enforcement arrives on the scene, and the responder may further indicate that running away would be resisting arrest. The app/device (user device 402, responder device 404) may also send out an emergency alert to emergency services (e.g. US 911), and may send out alerts to pre-selected contacts by any means, including SMS, email, push notification, call, satellite link, pager network, videochat or others.

Lost User Scenario In an example lost user scenario, if a user is lost, the device (user device 402) may be useful in finding them. For example, if the user has been running an app provided for by the disclosed technology on their mobile device (user device 402) that periodically measures their location using GPS, cell-tower-based localization, wifi-based localization, or other localization technology, this information may be stored on the users device 402, or it may be transmitted to a remote location where it is stored in a database (data storage system 403), allowing the user's last known location to be used to search for the user. In addition, if the user still has a connection, the user may use the app to initiate audio or video communication with one or more emergency responders, or with one or more of their contacts. Information may be transmitted about other aspects of the user's behavior that could indicate their status, such as their remaining battery, accelerometer data, when they last sent text messages or emails or made calls, or used their device (user device 402).

Suspicious Scenario

In an example suspicious or fearful scenario, if a user feels that they are in a suspicious or fearful scenario where they are concerned that they may be in danger, they may use this technology on their mobile device (user device 402) to record people or events in their vicinity, to signal to an emergency responder that they are concerned, to signal to their pre-selected contacts that they are concerned, and/or to provide information about their estimated location base on GPS, cell, WiFi, etc. as above. The device/software (user device 402) may also allow them to be in audio and/or video communication with a responder (responder device 404). The device/software (user device 402) may also allow them to automatically initiate contact after a pre-defined time if they have not cancelled. The device/software (user device 402) may also provide for them to hold down a button which, if released, initiates automatic contact or sends out an emergency signal to responders or contacts as provided for above.

Motor Vehicle Scenario

In an example motor vehicle recording scenario, this technology may be used in or around a moving vehicle to observe accidents or video record surroundings or other drivers, and this information may be logged in the device (user device 402) and/or transmitted to a remote network (data storage system 403). In the event of a user being in an accident, this information may be used in determining that an accident has occurred (accelerometer information may be particularly useful in measuring their velocity/acceleration to determine that there was an accident), determining the user's location, determining the user's situation, and determining fault in an accident (e.g. using video of the user's vehicle and other vehicles). The device (user device 402) may be mounted to the users' dashboard, windshield, mirror, bumpers, roof, or other location chosen to facilitate recording. This information may be used to call remote assistance for the user, either automatically or by a human responder. This may be used in connection with any type of vehicle, including automobile, truck, military vehicle, boat, airplane, spacecraft, bicycle, train, bus, public transit, automatous vehicle. The device may also interface wirelessly or by wired connection with other onboard computers and sensors of the vehicle, including cameras, pressure sensors, temperature sensors, vibration sensors, electrical sensors and others and may transmit any of this information to a remote server (where it may be recorded), or a responder in communication with the user. This may be useful in determining the situation of the user in an emergency, assisting the user, or for later use as evidence.

Figure 6:
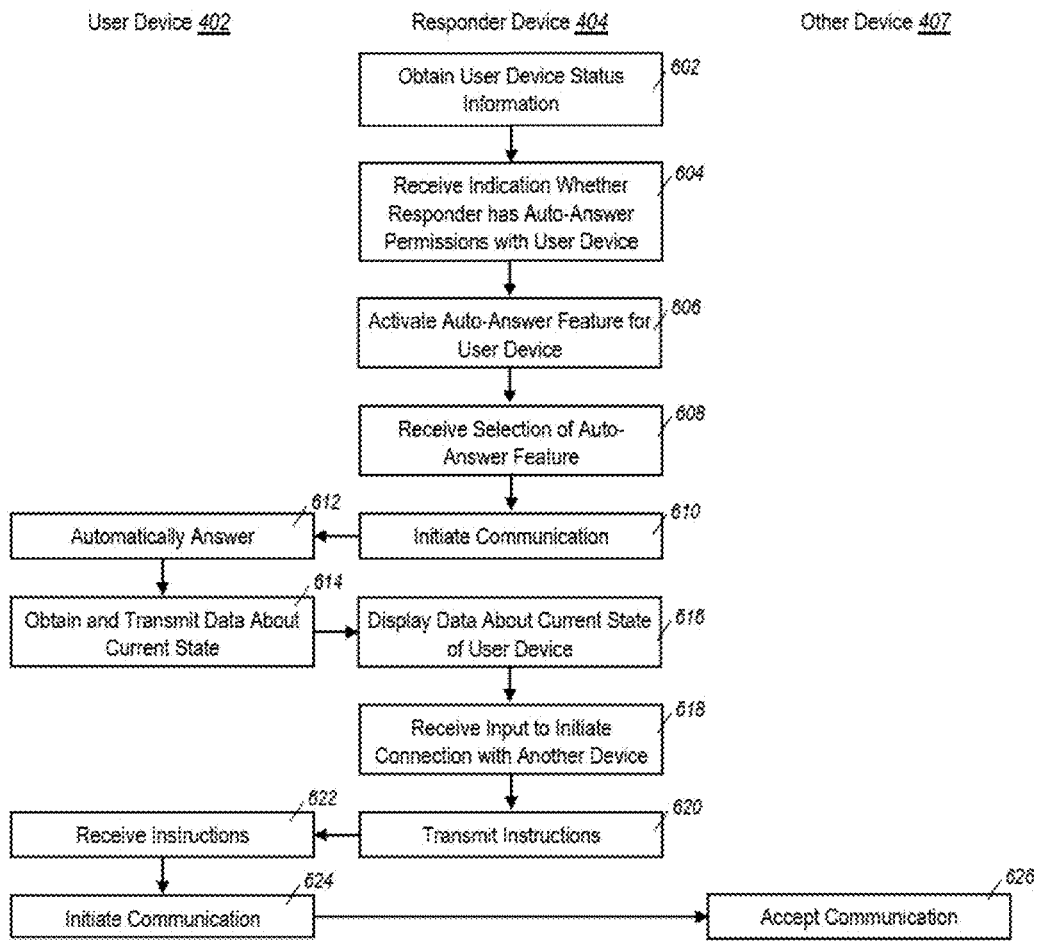
FIG. 6 is a flowchart of an example technique for facilitating auto-answer features between a user device and a responder device.

FIG. 6 is a flowchart of an example technique 600 for facilitating auto-answer features between a user device 402 and a responder device 404.

Auto Answer or Auto Connect

For example, the technique 600 allows the responder device 404 (which may be associated with a user, emergency responder, professional security service) to place a call to the user device 402 in such a way that the user device 402 automatically answers the call, even without the user's further action. For example, the responder device 404 may place a videocall from the responder device 404 (e.g., mobile phone) to user device 402 (e.g., mobile phone). Without the user of the user device 402 taking any further action, the software on the user device 402 (e.g., phone) automatically accepts the connection from the responder device 404. This may provide that the responder device 404 can then see video input and audio input from user device 402 (e.g., phone). The responder device 404 can also transmit their own audio (e.g. speech) and video to user device 402. All of this may be recorded. This provides a means that in an emergency situation, where the user of the user device 402 may not have access to their phone, may be incapacitated, or may be unable to press a button on their phone, the responder device 404 may still initiate communication without requiring action by the user of the user device 402. In addition, this provides a means for remote control of a device that is located someplace where it is desirable to be able to automatically initiate one-way or two-way audio, video, communication, or the other aspects of this technology. For example, a device may be mounted to a wall, or inside of a vehicle, or inside of a home or business and may act as a remotely-controllable security camera. In addition, the device may make it possible to communicate by audio and/or video to the remote location. For example, if the device is mounted to a wall as a security camera, in the event of an intrusion, the device can begin automatically recording (including using motion and sound detection), and can also automatically place a connection to a responder, and the responder can be displayed in substantially realtime on the screen of the device, control the device, and interact with any potential intruder through two-way audio and video. In this way, a security person at a remote location can remotely intervene to stop an intrusion or other crime or inappropriate action.

In workplace settings, this technology may allow for a responder to take control over a device and begin recording and two-way communication with anyone at the scene. Example use cases include the responder serving as a remote teacher or instructor, performing quality assurance or examining work, examining items at the scene such as to determine damage to items or to assess the quantity or quality of stock. This remote control technology may also be used for the responder to be involved in remote monitoring, assistance and training in a number of contexts, including repairs, medical procedures, conversations with patients, and conversations with people at the remote scene. All of this may be recorded securely to the remote server.

The responder device 404 obtains user device 402 status information, such as information indicating whether the user device is online, offline, currently being used, on a call, and/or has not been used for n minutes (602). Such status information may be obtained through communication with a central server system. The responder device 404 can additionally receive an indication as to whether the Responder has been provided auto-answer permissions for the user device 402—meaning that the Responder is able to initiate and automatically establish calls on the user device 402 (604). Based on the indication, an auto-answer calling feature can either be activated or deactivated on the responder device 404 (606). For example, the auto-answer calling feature can be a virtual button on the responder device 404 that, when enabled, is presented and is responsive to user contact. In contrast, if the auto-answer calling feature is inactive, such a virtual button may not be displayed or may be otherwise indicated as being inactive (e.g., presented in gray/colorless manner).

The responder device 404 can receive selection of the auto-answer feature (608) and, in response to receiving the selection, can initiate auto-answer communication with the user device 402 (610). The communication can be one or two-way audio and/or visual communication. Auto-answer communication may be different from regular communication by the virtue of metadata that is transmitted indicating that it is an auto-answer communication request.

In response to receiving the request, the user device 402 can accept the auto-answer request (612) and can, without prompting the user of the user device 402 for consent first, obtain and transmit data (e.g., audio and/or video data, location data, device state data) to the responder device 404 (614).

The responder device 404 can display data from the user device (616) and can receive input to initiate a connection for the user device 402 with another device (618). For example, the responder may determine that the user of the user device 402 has a medical emergency and he/she is unable to request help. The responder device 404 can initiate a connection between the user device 402 and another device 407, such as an emergency responder, a professional security service, and/or an emergency handling system (e.g., E911 system).

The responder device 404 can transmit instructions to the user device 402 (620), which the user device 402 can receive and use to initiate communication with the other device 407 (624, 626).

Figure 7:
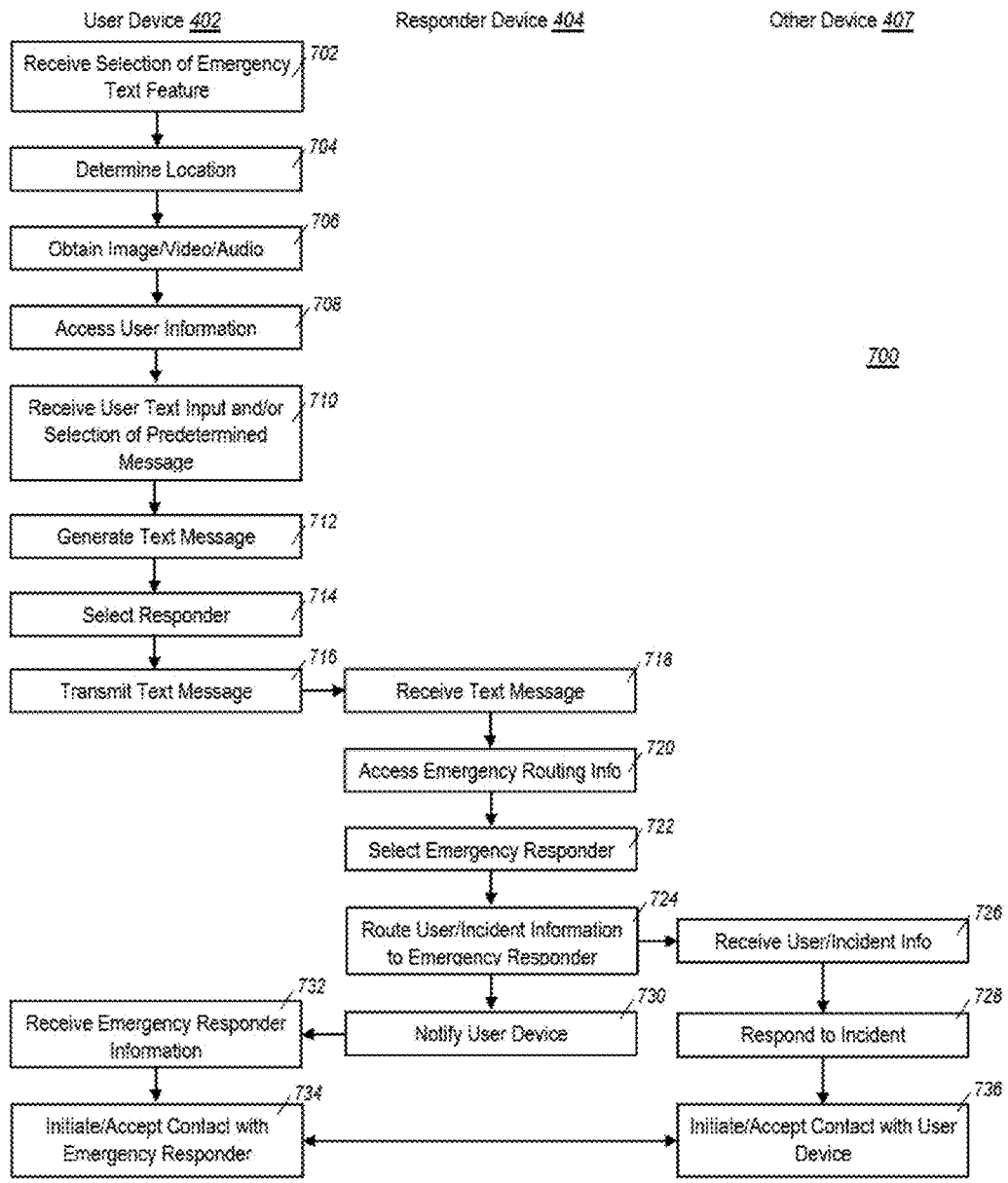
FIG. 7 is a flowchart of an example technique for providing emergency text messaging services on a user device.

FIG. 7 is a flowchart of an example technique 700 for providing emergency text messaging services on a user device. For example, the technique 700 can facilitate fast yet detailed emergency texts to be generated by the user device 402 and routed to an appropriate emergency responder 409 through use of the responder device 404, which may be a professional security service.

Text911

The user device 402 can receive selection of an emergency text feature (702) and, in response to receiving the selection, can begin to automatically collect pertinent information for inclusion in the text message. For instance, the user device 402 can determine its current location (704), obtain an image, video, and/or audio of the user, an assailant, and/or the user's current surroundings (706), and access stored information about the user (e.g., name, date of birth, height, weight, medical conditions, emergency contact, telephone number, preferred emergency responders) (708). The user device 402 can receive user input to identify the situation and the assistance that is needed, and/or the user device 402 can receive a selection of one or more predetermined messages (e.g., textual message, video message, audio message) (710). Such input can be textual input (e.g., typing) and/or selection of one or more fields from populated menus. Such fields can include prerecorded messages (textual, verbal, visual) that have been designated by the user and/or by other users. Using the automatically obtained information and the user input information, the user device 402 can generate a text message (712). The user device 402 can also select an appropriate responder to whom the text message should be transmitted (714), which can be similar to the selection described with regard to step 430. Selection of the responder (e.g., steps 430, 714) may additionally and/or alternatively be performed by another computing device that is different from the user device 402, such as by a computer server system. With the text message generated and the recipient selected, the text message can be transmitted to the responder device 404 (716).

The responder device 404 can receive the text (718), access emergency routing information (720), and can use the emergency routing information and the information contained in the text message (e.g., location information, type of emergency) to select an appropriate emergency responder to receive the text message (722). The steps 720 and 722 can be performed in a manner similar to steps 552-554. With the emergency responder selected, salient details from the text message regarding the emergency can be routed to the emergency responder 409 (724).

The emergency responder can receive the information (726) and can respond to the incident (728), such as transmitting a text response to the user device 402, travelling to the user's location, directing others to travel to the user's location, and/or initiating a phone or video conference with the user device 402.

The responder device 404 can additionally notify the user device 402 that the emergency responder 409 has been contacted (730), such as over a response text message. The user device 402 may receive the contact information for the emergency responder 409 (732) and can initiate contact with the emergency responder 409 (734), such as over a text message, phone call, video conference, and/or security session. The emergency responder 409 can accept the contact from the user device 402 (736). Alternatively and/or additionally, the emergency responder 409 can initiate contact that is accepted by the user device 402.

Figure 8:
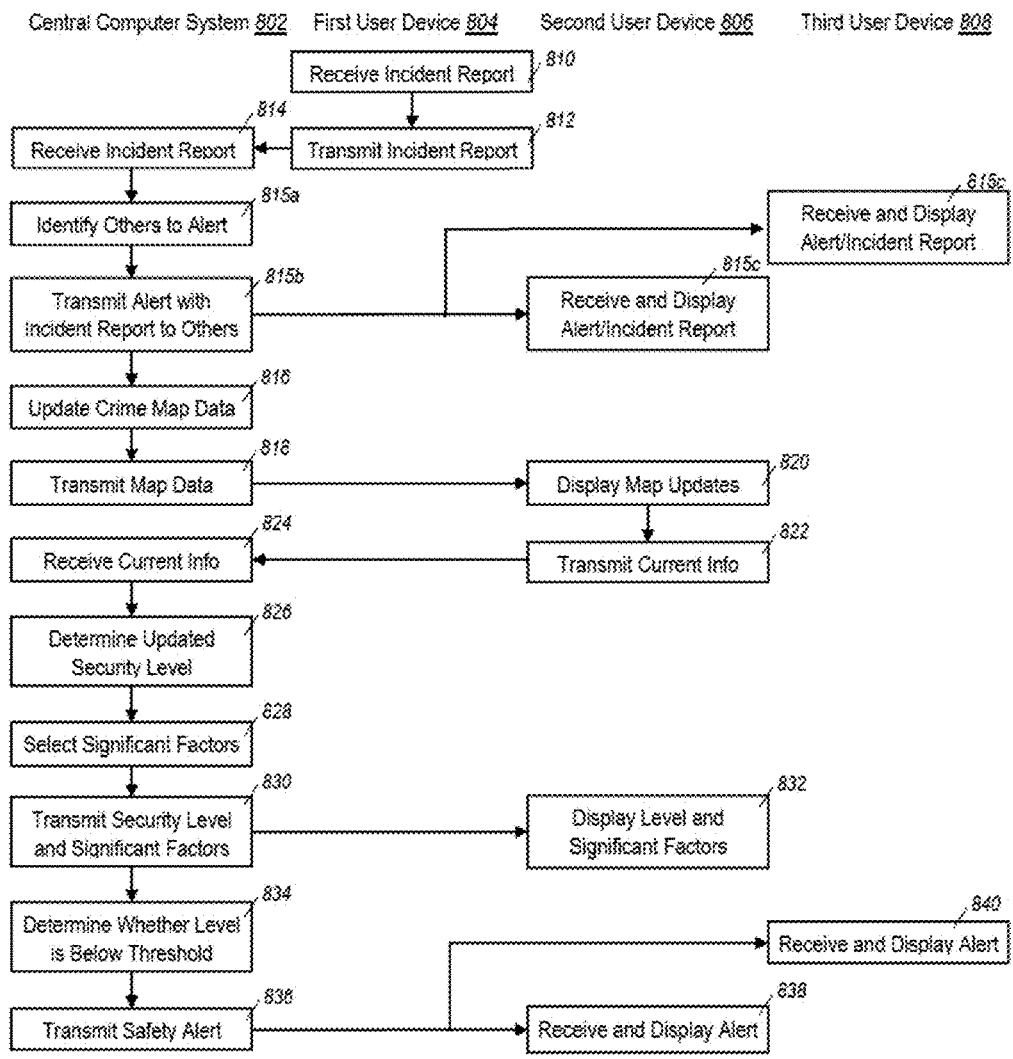
FIG. 8 is a flowchart of an example technique for providing real-time crime maps and safety levels to users.

FIG. 8 is a flowchart of an example technique 800 for providing real-time crime maps and safety levels to users. The example technique 800 can be performed in part by a central computer system 802 (e.g., central computer system 210, server system 406) and first, second, and third user computing devices 804-808 (e.g., mobile computing device 102, mobile computing device 202, user device 404).

Real Time Crime Reporting, Mapping, and Notification

As part of incident reporting and crime map generation, users may upload information regarding incidents that they are aware of. This information may be provided to authorities, or to other users. This information may include their location (which may be determined automatically from their device, including by GPS or WiFi-based location). This information may include the type of incident, their comments, and photos, video or audio or other types of information. This report may be registered or marked automatically on a map that is visible to other users. Reports may be sent automatically to other users, or to other users near to the site of the report. In the depicted example, the first user device 804 reports an incident which is then used to provide an update to the crime map displayed on the second user device 806 and to the safety score for the second user device 806. For instance, the first user device 804 receives an incident report entered by the user of the first user device 804 (810), which is then transmitted to the central computer system 802 (812).

The central computer system 802 receives the incident report (814). The central computer server system 802 can provide security alerts to other users based on the incident report, as indicated by steps 815a-c. For example, the computer server system 802 can identify other users to whom the incident may be relevant and/or important (815a), such as users who are currently or are likely in the future (e.g., within a threshold period of time) to be located near where the incident occurred and/or users who are part of a group of predefined users who are identified to receive such reports (e.g., emergency responders, friends of the first user). The central computer system 802 can transmit (e.g., push notification) the alert with the incident report to the identified other users (815b), which in this example includes users who are associated with the second user device 806 and the third user device 808. The second and third user devices 806, 808 can receive and display the alert/incident report, for example, as a push notification (815c).

The central computer system 802 can also use the incident report to update real-time crime map data that is maintained by the central computer system 802 and used to provide real-time crime maps and safety levels (816). The central computer system 802 uses the updated data to generate and transmit updated map data to the second user device 806, which may receive the updated data based on the second user device 806 being currently located within a threshold distance of where the incident occurred for the first user device 804 (818). The second user device 806 can receive and display the updated map (820) and can additionally provide updated information (e.g., location) regarding the second user device 806 to the central computer system 802 (822).

The central computer system 802 can receive the current information from the second user device 806 (824) and can determine an updated safety level for the second user device based, at least in part, on the updated crime map data and/or the current information from the second user device 806 (826). The safety level for a user can be determined based on a variety of factors, such as the current location of the user, the time of day, the day of the week, crime information for the surrounding area, recent incidents in the surrounding area, an age of the user, gender, and/or information about available responders (e.g., current availability, proximity to user, time since last active on their device). The central computer system 802 can select significant factors that contributed to the magnitude of the score (e.g., high score indicating that the user is safe, low score indicating that the user is in danger) (828). For instance, a user's score may drop suddenly indicating that he/she is suddenly less safe, and the significant factors that are selected can be those that most contributed to the decline in the score. For instance, if all of a user's responders go offline around the same time, the score for the user may drop and the selected significant factor can be the absence of available responders.

The safety level may be presented on the user's device in a number of ways. The safety level may be presented as a number. The safety level may be presented as an icon. The safety level may be presented as a color. The safety level may be presented by changing the background image or background color of the screen. The safety level may be presented through text information.

The score and significant factors can be transmitted to the second user device 806 (830).

The second user device 806 can display the score and significant factors to the user of the second user device 806 (832).

The central computer system 802 can proceed to determine whether the score has dropped below one or more threshold levels that can trigger varying levels of safety procedures (834). For example, a first level may result in simply a notice to the user and a second, more serious, level may result in a broadcast to the user's responders in addition to the user. Based on the determination, safety alerts can be transmitted (836) to the second user device 806 and, in some implementations, to a third user device 808 that may have been designated by the second user device 806 as a responder. The second user device 806 and the third user device 808 can display the alerts to their respective users (838, 840). In addition, an icon may be presented for a first user on a second user device 806 and the third user device 808 showing a coded or directly represented indication of the safety level of the first user, for example a number, or a color-coded or size-coded representation of the first user's safety level that is displayed on the second user device 806 and the third user device 808.

FIGS. 9A-F are screenshots of user interfaces that can be presented on computing devices as part of the devices, systems, and techniques described above. For example, the screenshots can be presented on any of a variety of appropriate computing device, such as the mobile computing device 102, the mobile computing device 202, the user device 402, the responder device 404, the other computing devices 108a-d, and/or the other computing devices 204.

Figure 9A:
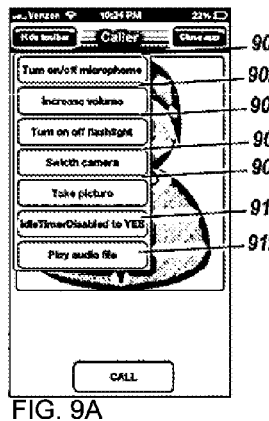
FIGS. 9A-G are screenshots of user interfaces that can be presented on computing devices.

FIG. 9A depicts a screen showing remote control features that can a user of the device can select to control the operation of another user's device. The example remote control features include turning a microphone on the other user's device on/off (900), increasing the volume of speakers on the other user's device (902), turning a flashlight on the other user's device on/off (904), switching the camera that is being used on the other user's device (906), taking a picture using a designated camera on the other user's device (908), enabling/disabling an idle timer on the other user's device (910), and playing an audio file on the other user's device (912).

Figure 9B:

FIG. 9B depicts a screen showing an example video chat session, which can be one way, two-way, or multi-way among a plurality of users. In the example screen, the recipient (e.g., the responder) is seeing a real time video (914) from the user's device.

Figure 9C:
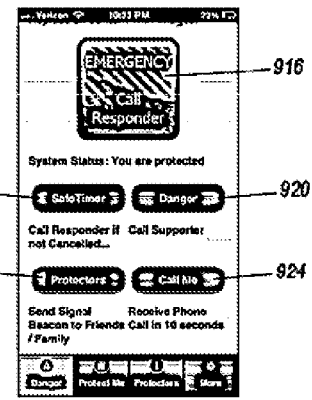

FIG. 9C depicts a mobile application screen showing example user interface elements. For instance, the depicted elements include, a button to call an emergency responder (916), a "Safe Timer" button that will issue a call to a responder if not cancelled within a specified period of time (918), a "Danger" button that will call a supporter (920), a "Protectors" button that will send a beacon signal to friends and family (922), and a "Call Me" button that will issue a request to receive a phone call within a period of time (e.g., 10 seconds, 30 seconds, 1 minute) (924).

Figure 9D:
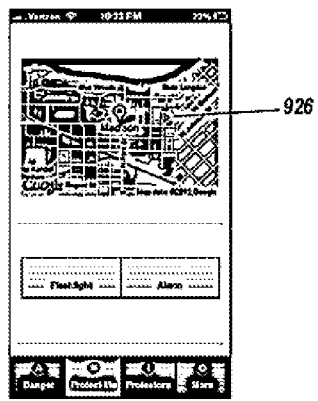

FIG. 9D depicts a mobile application screen showing user interface elements that include an example element 926 providing localization of a user in real time.

Figure 9E:
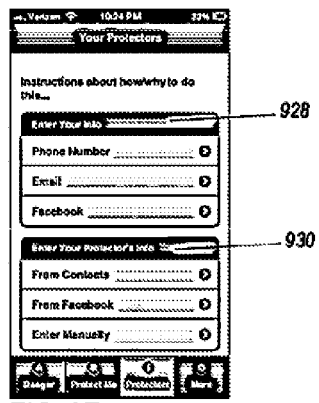

FIG. 9E depicts a mobile app screen showing user interface elements, such as elements 928 through which the user's information can be entered and elements 930 through which protectors/responders/friends/family/contacts can be identified either from existing data sources (e.g., contacts, FACEBOOK) or entered manually.

Figure 9F:
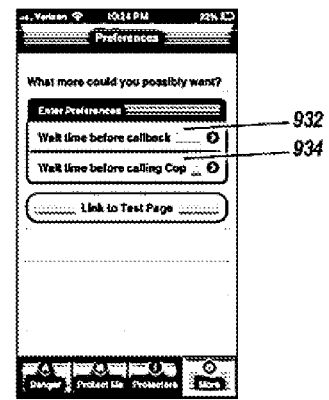

FIG. 9F depicts a mobile app screen showing user interface elements, such as elements through which a user can enter preferences for a period of time to wait before receiving a call back (932) and before calling a police officer (934).

Figure 9G:
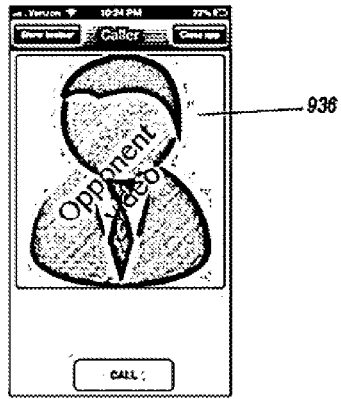

FIG. 9G depicts a mobile app screen showing user interface elements, such as a real-time video of another user (936).

FIG. 10 is a screenshot 1000 of a user interface that can be presented on computing devices in Ready Mode. For example, the screenshots can be presented on any of a variety of appropriate computing device, such as the mobile computing device 102, the mobile computing device 202, the user device 402, the responder device 404, the other computing devices 108a-d, and/or the other computing devices 204.

The screenshot 1000 depicts a variety of user interface features, including a flashlight toggle (1002), a button to send emergency messages with user locations to a predefined list of contacts/friends (1004), a button to call emergency response (e.g., 911) from either the user phone or a remote responder (1006), a feature to adjust the video quality/resolution/frame rate (1008), a live video and/or image of an available responder, who may be the nearest available responder or a nearest available responder from a predefined list (1010), information identifying the availability of a responder service at a premium/priced plan (1012), a button to start a call to the responder substantially immediately (1014), a responder name or ID (1016), a button to toggle the user camera (1018), a feature indicating whether the video is being recorded based on whether the light is flashing (red) or continuously (red) (1020), and a continuous vide from the user's mobile camera, which may be continuously recorded on the user's device, the responder's device, and/or a remote server system (1022).

FIGS. 11A-E are screenshots of a user interface that can be presented on computing devices when transitioning from Ready Mode to Caller Mode and Responder Mode. For example, the screenshots can be presented on any of a variety of appropriate computing device, such as the mobile computing device 102, the mobile computing device 202, the user device 402, the responder device 404, the other computing devices 108a-d, and/or the other computing devices 204.

Figure 11A:
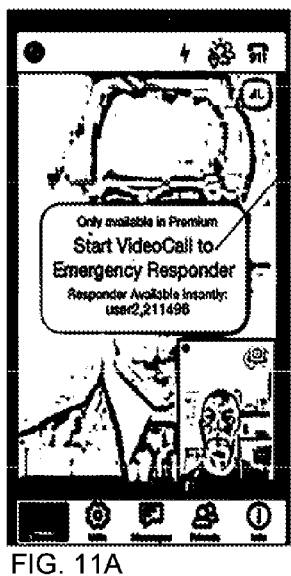
FIGS. 11A-E are screenshots of a user interface that can be presented on computing devices when transitioning from Ready Mode to Caller Mode and Responder Mode.

Referring to FIG. 11A, from Ready Mode, a user can select the button 1100 to initiate two-way audio/video communication to enter Caller Mode.

Figure 11B:

Referring to FIG. 11B, in Caller Mode (screen seen by the caller) the name/ID of the responder/friend who was called can be displayed (1102), the responder live video can be displayed (1104) (not displayed in audio-only mode, during which a static image may be presented), a terminate connection feature is presented (1106), and self (caller) live video or video looking out at world is presented (1108).

Figure 11C:
Figure 11D:

Referring to FIG. 11C, Responder Mode (screen seen by the responder) is presented, which is entered by the caller pressing the button 1100, sending a push notification, a call request, or connecting a friend/responder. Screen 1110 is initially presented with low quality vide of the caller. Using the quality feature 1112, a higher quality video of the caller is presented in screen 1114, as depicted in FIG. 11D. A video of the user's self (responder) is presented in window 1116. In the example depicted in FIGS. 11C-D, the screenshots show the same person as the user of the mobile computing device and the responder for mere illustrative purposes and, in general, the user and the responder will be different people using different devices.

Figure 11E:
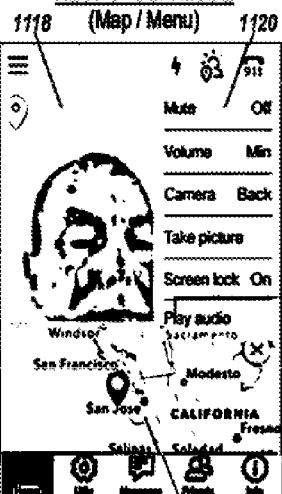

Referring to FIG. 11E, in Responder Mode with display of a map and menu, a live video of the caller is presented 1118, a menu of remote controls of the caller's device are presented (1120) (e.g., mute, change volume, take a picture which is received by the responder, play audio on the user's device, such as an alarm, verbal commands), and a map of the caller's location, through which the responder can pinch-to-zoom, view the caller's address, and a connection to local 911/emergency center can be provided (1122).

FIGS. 12A-D are screenshots of a user interface that can be presented on computing devices to initiate and participate in two-way instant messaging. For example, the screenshots can be presented on any of a variety of appropriate computing device, such as the mobile computing device 102, the mobile computing device 202, the user device 402, the responder device 404, the other computing devices 108*a-d*, and/or the other computing devices 204.

Figure 12A:
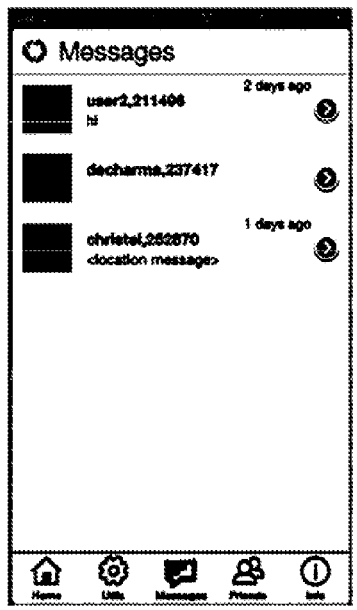
FIGS. 12A-D are screenshots of a user interface that can be presented on computing devices to initiate and participate in two-way instant messaging.

Referring to FIG. 12A, a list of users are presented and a two-way instant messaging session can be initiated by selecting (tapping) a user entry.

Figure 12B:
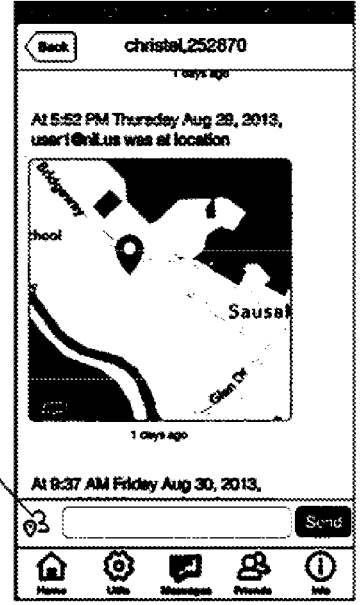

Referring to FIG. 12B, a text message session is depicted with a feature 1200 through which a user can send messages with a variety of information, including userid, user name, geolocation, map, time, date, and/or text message to a peer.

Figure 12C:
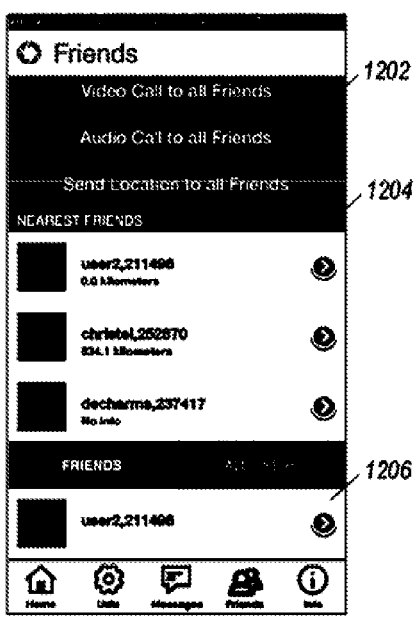

Referring to FIG. 12C, features are presented through which a request for a video call can be sent, a request for an audio call can be sent, a request for a user's exact location can be sent, or a text message to the entire list of users friends/contacts can be sent (1202), a feature for sorting friends by proximity (1204), a feature through which a friend/user can be selected for participation in instant messaging session, audio call, video call, or other form of communication (1206).

Figure 12D:
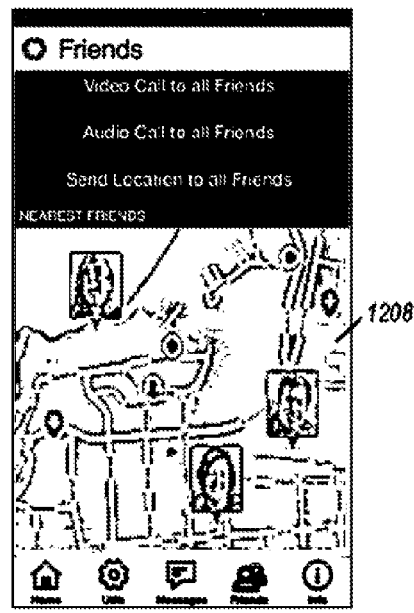

Referring to FIG. 12D, a map is depicted showing the location of friends, with pictures and name/id, based on their most recent check-in or real-time geolocation from their device (1208). Location services can be requested for a friend and people may turn on/off the ability of other users to view their location and the toggle the level of accuracy of the location being provided to other users.

Figure 13:
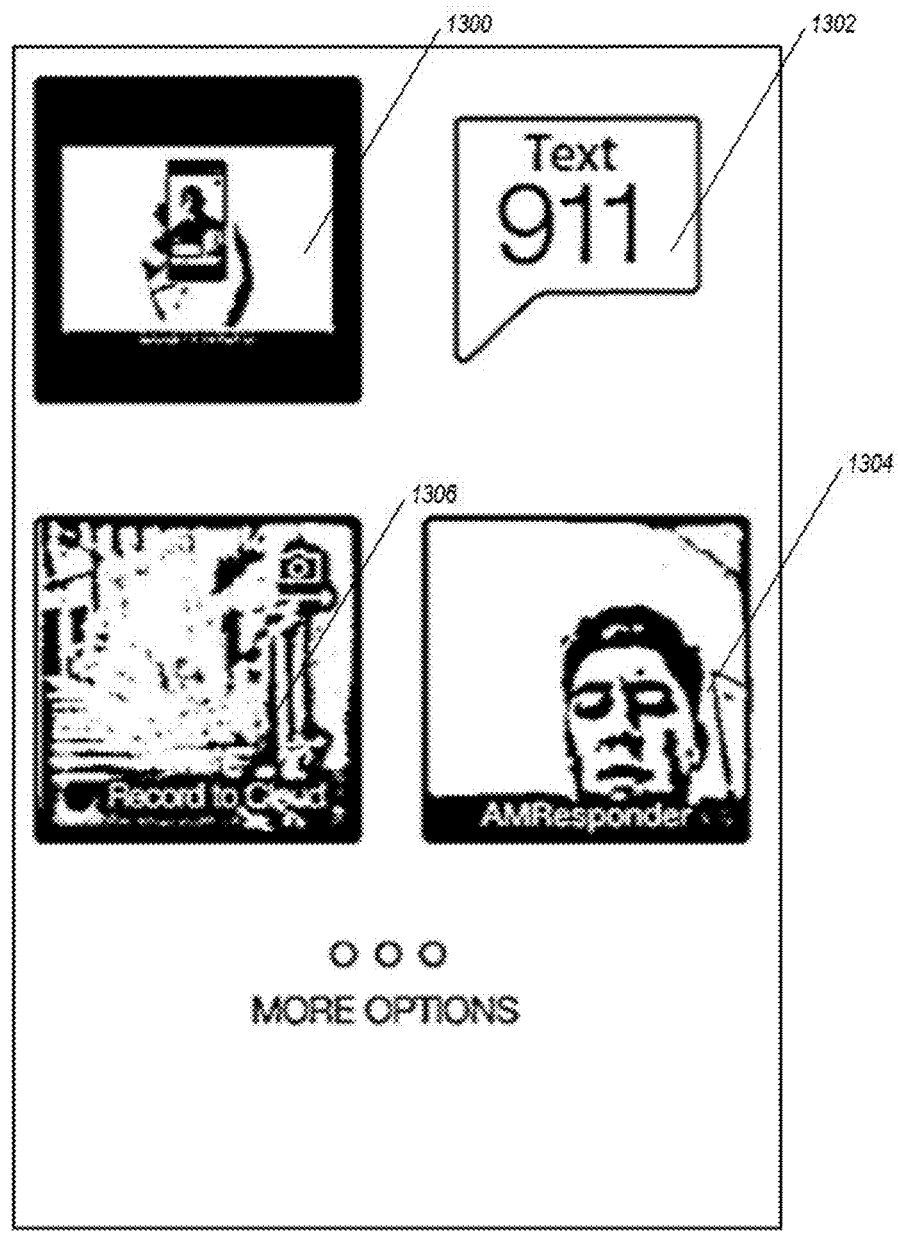
FIG. 13 is a screenshot of a user interface that can be presented on computing devices to access several security-related features.

FIG. 13 is a screenshot of a user interface that can be presented on computing devices to access several security-related features. For example, the screenshots can be presented on any of a variety of appropriate computing device, such as the mobile computing device 102, the mobile computing device 202, the user device 402, the responder device 404, the other computing devices 108*a-d*, and/or the other computing devices 204.

Button 1300 accesses a "Personal Bodyguard" screen in which a real police officer, available 24/7, will be presented to address a potential attacker by live, two-way video conferencing that he (the police officer) has already permanently recorded the attacker's face and location, and has stored that information in a secure web location with the assurance that, if any crime is committed, this evidence will be used to convict the attacker.

Button 1302 accesses a "Text 911" feature through which a user of the device can send a text message to emergency responders. Button 1304 accesses a "Contact Your Hero" screen in which you can contact another user (e.g., friend, loved one, family member) by voice, videocall, and/or text, along with providing your location to that person, allowing that person to converse with people located nearby, and to record the communication feed. Button 1306 accesses a "Personal Security Camera" feature through which video from the device will be permanently recorded on the device as well as at a remote location so that if someone were to approach a user, the user would be able to have a permanent record of what happened, even if their phone was stolen or destroyed.

Figure 14:
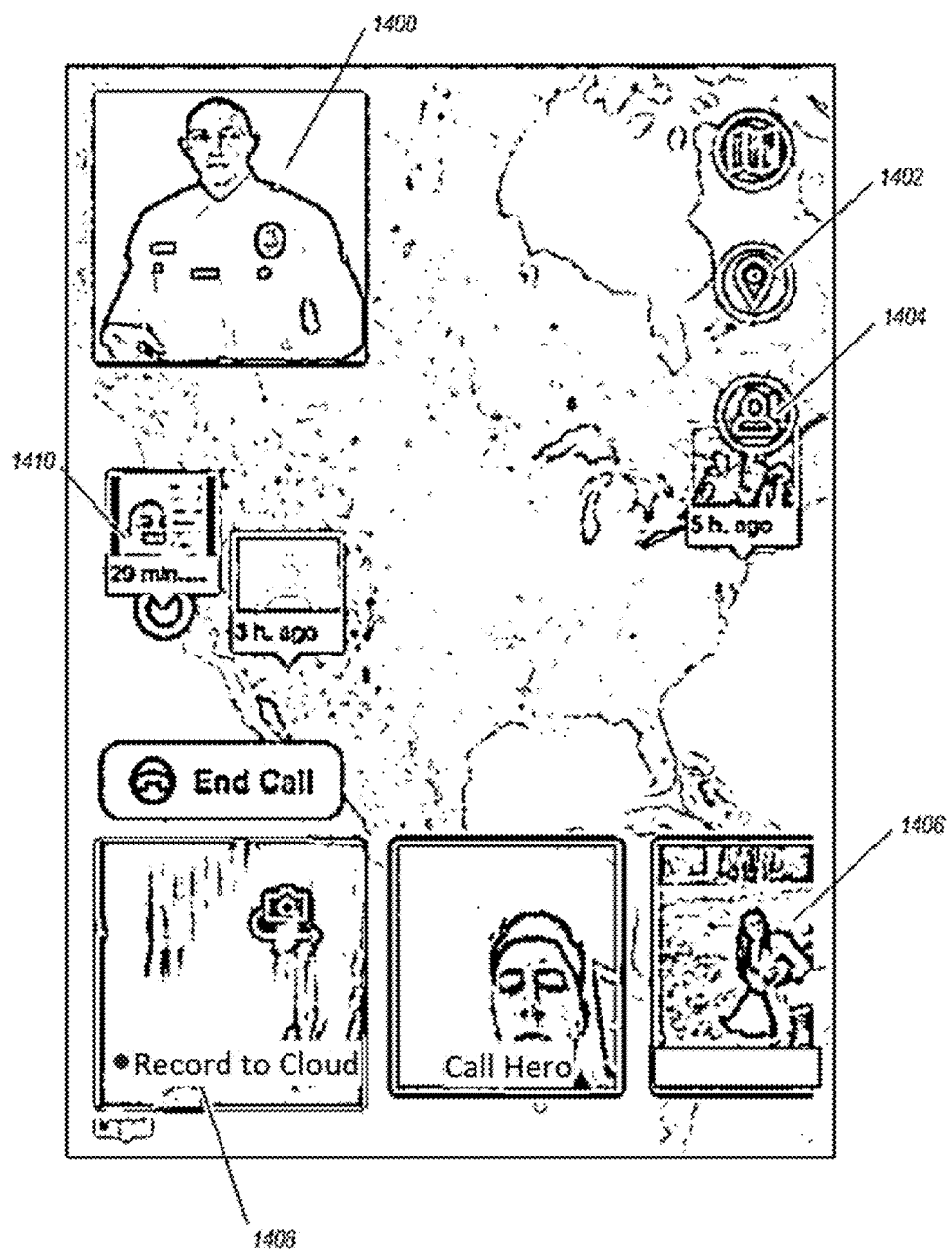
FIG. 14 is a screenshot of a user interface that can be presented on computing devices to display and access several security-related features.

FIG. 14 is a screenshot of a user interface that can be presented on computing devices to display and access several security-related features. For example, the screenshots can be presented on any of a variety of appropriate computing device, such as the mobile computing device 102, the mobile computing device 202, the user device 402, the responder device 404, the other computing devices 108*a-d*, and/or the other computing devices 204.

Button 1400 access a "Personal Bodyguard" screen, similar to button 1300. The "Incident Reporting" feature 1402 allows a user to report an unsafe location, crime, accident, or other emergency through the system. Incidents are reported to the appropriate authorities and other users are alerted of the incident to provide notice so as to keep them safe. The "Message All Friends" feature allows for a text message, an audio call request, or a video call request to be sent to all of a user's friends simultaneously, with the first of your friends answering the message/request being available to the user. The "Friends List" feature is a slider that shows all of a user's friend who can be contacted and the user's "hero," who is a designated person who will serve as your first responder. Button 1408 is a "Personal Security Camera" feature similar to the button 1306. Friends Map 1410 is a map that displays real-time locations and status information relating to a user's friends. The view of the map can be changed in a variety of different ways, such as through scrolling, panning, and pinch-to-zoom interactions.

Figure 15:
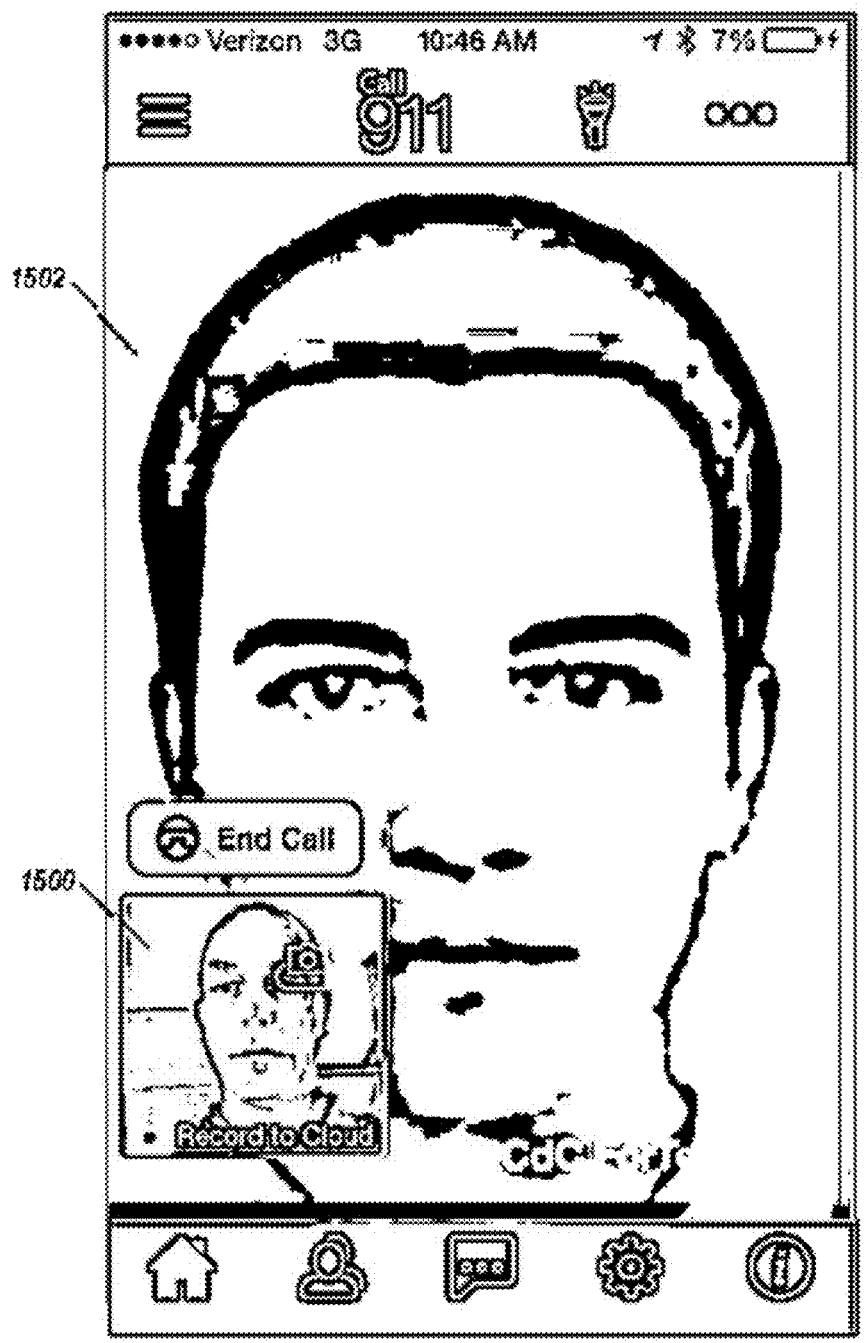
FIG. 15 is a screenshot of a user interface that can be presented on computing devices during a 2-way video chat.

FIG. 15 is a screenshot of a user interface that can be presented on computing devices during a 2-way video chat. For example, the screenshots can be presented on any of a variety of appropriate computing device, such as the mobile computing device 102, the mobile computing device 202, the user device 402, the responder device 404, the other computing devices 108*a-d*, and/or the other computing devices 204.

The "Record to Cloud" feature allows for videos taken by a user's computing device, such as during a call, to be recorded directly to a remote storage location (e.g., the cloud) in a secure manner (e.g., calls and data are secure and encrypted). The "Opponent Video/Audio" feature 1502 is a real-time video display over which a user can see and hear his/her friend/hero/trained responder by two-way video conferencing using any of a variety of data connections, such as WiFi and/or cellular networks.

Figure 16:
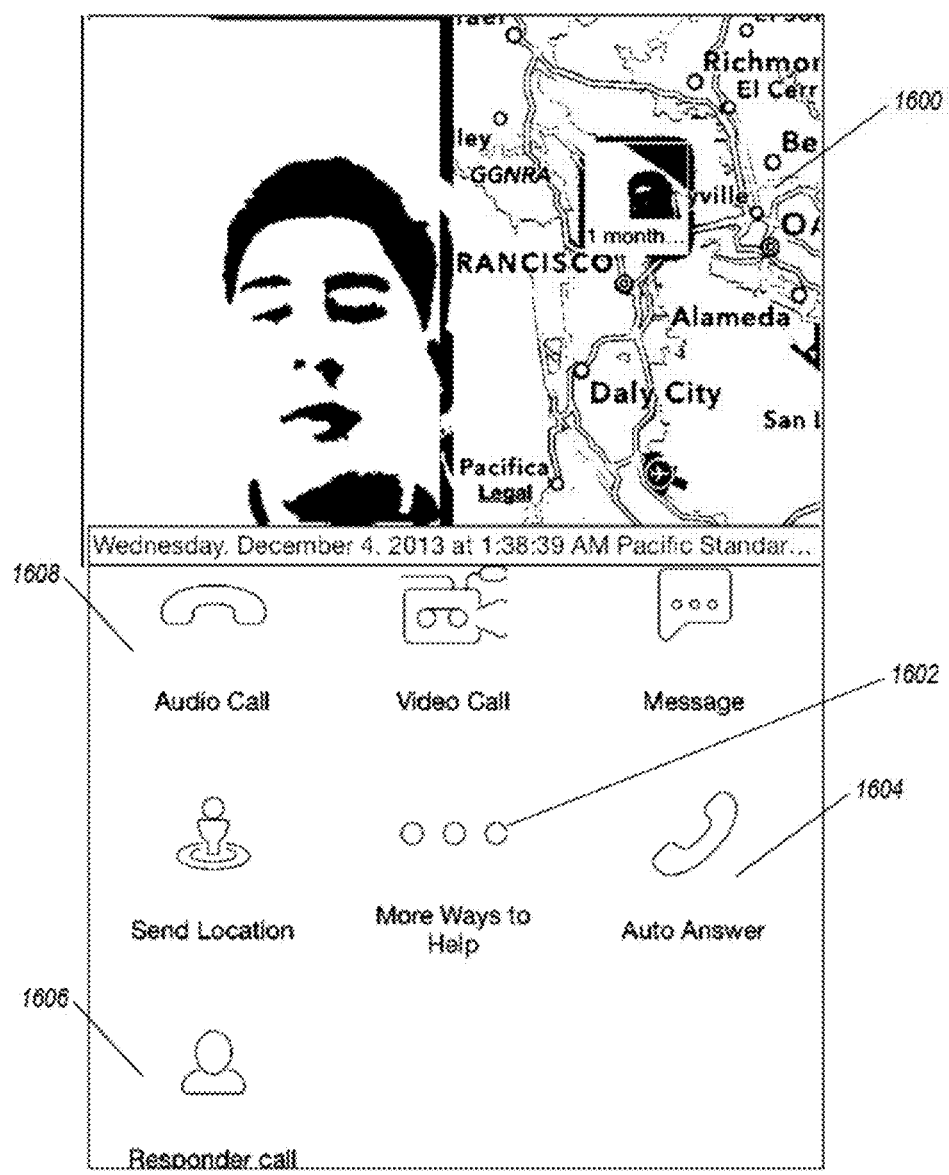
FIG. 16 is a screenshot of a user interface that can be presented on computing devices to display and access several security-related features.

FIG. 16 is a screenshot of a user interface that can be presented on computing devices to display and access several security-related features. For example, the screenshots can be presented on any of a variety of appropriate computing device, such as the mobile computing device 102, the mobile computing device 202, the user device 402, the responder device 404, the other computing devices 108*a-d*, and/or the other computing devices 204.

The map 1600 can display real-time locations of a user's friends. The "More Ways to Help" feature 1602 allows for a user to perform operations for other users (e.g., friends, family members, contacts). To access this feature, the other user that a user would like to help may need to have provided permission for the user to help the other user. For example, a user can use this feature to have a responder call the other user, send a safety message to the other user's friends, send a call request to the other user's friends, and/or other features. The "Auto Answer" feature 1604 allows a user, when given appropriate permissions, to initiate a video or audio call on another user' computing device without the other user needing to first answer the call. For example, a user can start audio and/or video communication with another user's device even if they are not able to press a key to accept the call. The "Responder Call" feature 1606 places a call directly from another user's device (e.g., friends' phone) to a responder so that the responder can pick up and engage the other user. The "Contact Friend" feature allows a user to audio call, video call, send a text message, and/or send a user's location to another user.

Figure 17:
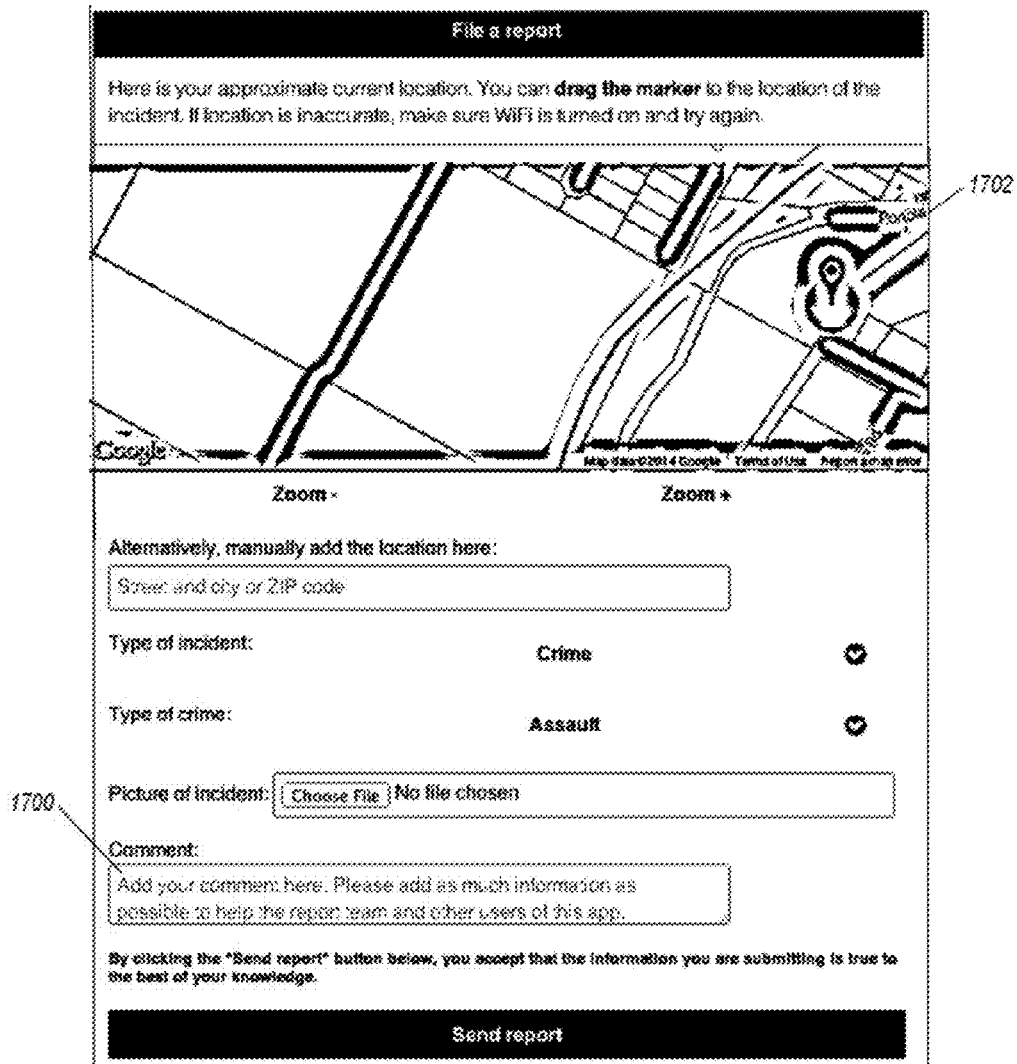
FIG. 17 is a screenshot of a user interface that can be presented on computing devices to report an incident.

FIG. 17 is a screenshot of a user interface that can be presented on computing devices to report an incident. For example, the screenshots can be presented on any of a variety of appropriate computing device, such as the mobile computing device 102, the mobile computing device 202, the user device 402, the responder device 404, the other computing devices 108*a-d*, and/or the other computing devices 204.

The "Report an Incident" feature 1702 can map the location of an incident based on the location of the computing device and/or manual location entry. The "Submit to Cloud" feature 1700 can upload information about an incident, such as the type of incident, photos, video, audio, and/or user comments. Alerts can be sent to appropriate authorities and/or other users in response to an incident being reported.

Figure 18A:
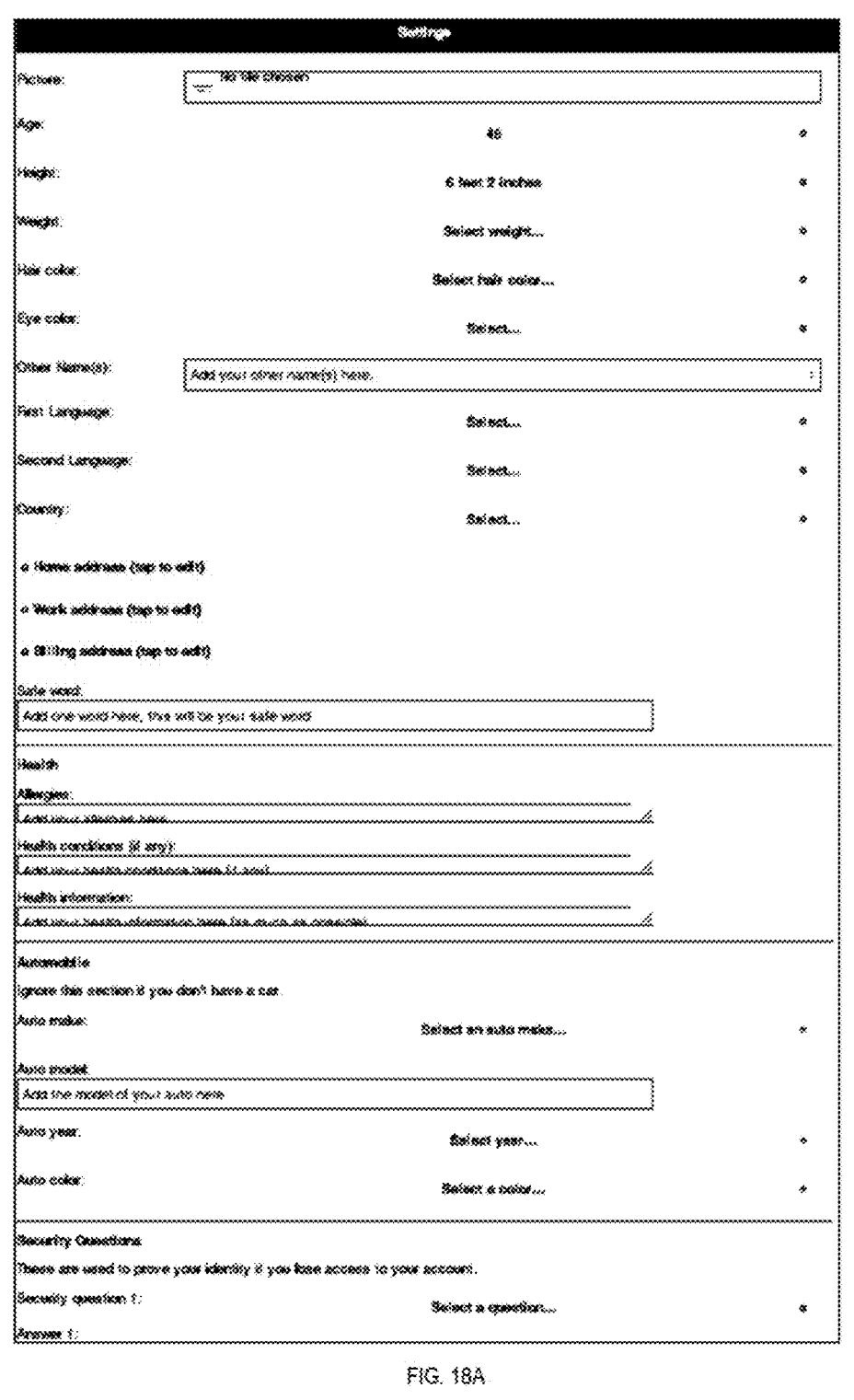
Figure 18B:
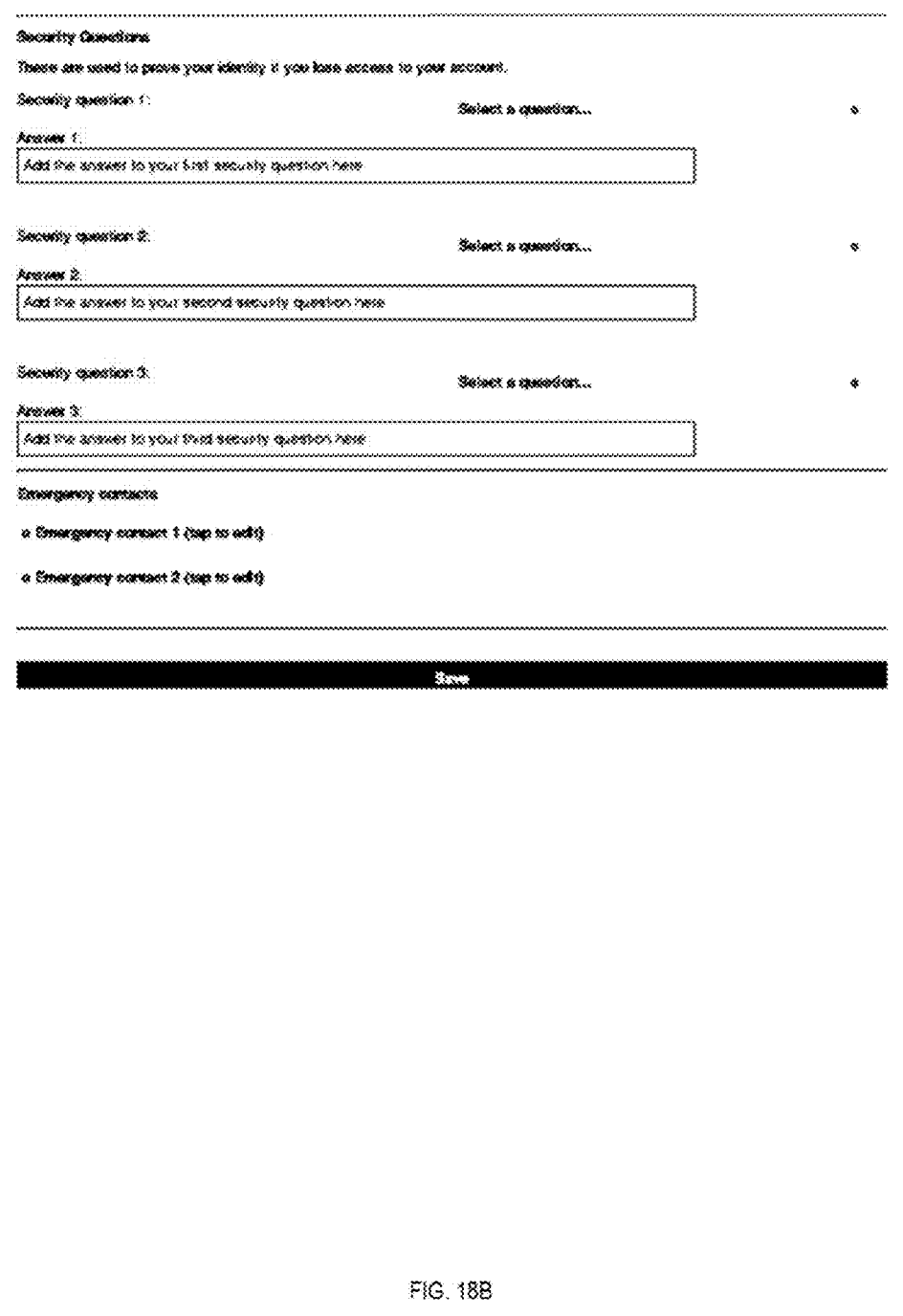

FIGS. 18A-B are a screenshot of a user interface through which a user can enter their profile information and register to use the security features discussed above.

Figure 19:
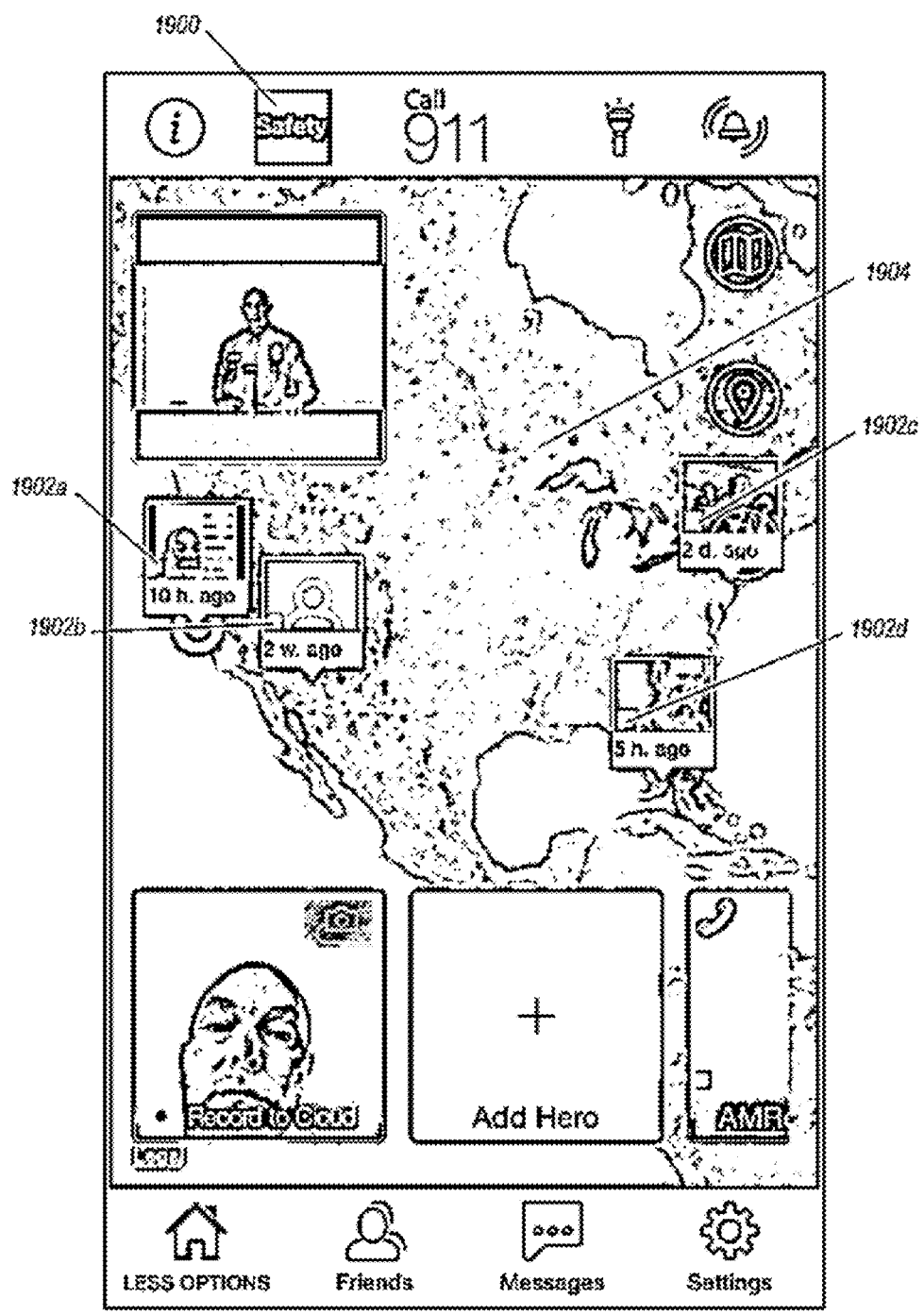
FIG. 19 is a screenshot of a user interface that depicts a safety level indicators.

FIG. 19 is a screenshot of a user interface that depicts a safety level indicator 1900 for the user of the computing device displaying the user interface as well as safety level indicators 1902*a-d* for the user's acquaintances, who identified at their recent/current locations on the map 1904. In the depicted example, the safety levels are identified by colors, such as green (safe), yellow (moderately safe), and red (unsafe). Other scales and intermediate levels are also possible, as well as other ways of indicating differing safety levels, such as numerical scales (e.g., scale of 1-10 in which 1 is unsafe and 10 is safe), textual descriptions (e.g., words "safe" and "unsafe"), and other user interface elements to convey to a user of the computing device safety levels for the user and his/her acquaintances. As discussed above, the safety level may be determined on the user device and/or by other computing devices (e.g., central server system) based on any of a variety of appropriate factors, such as whether the app active on their computing device (e.g., when was the last time their location updated), the current time (e.g., daytime, nighttime), whether the user is at or near one or more known safe locations (e.g., home, work, other defined positions in a user's profile), whether and how many of the user's acquaintances are available/online in the app, whether the user is currently located in a dangerous neighborhood (e.g., based on imported this crime/map data), and/or other relevant factors.

In one example use case, a user might want to see whether his/her children are safe and can do so by looking at their safety levels on the application. If anyone is red or yellow, the user can take action to find out what is going on and, possibly, assist the user through any of a variety of the features described above, such as auto-answer and remote control. I another example use case, the a user can have an alarm set on the app so that if a friend drops below a green safety level that a notification is automatically generated. The notification can prompt the user to examine the friend's status and to possibly take action to assist the friend.

A variety of additional features can be used in combination and/or alternatively to the features discussed above. For example, rewards and/or incentives can be offered and awarded for finding and/or capturing assailants identified through the technology discussed above. For example, a rewards/incentives system may be used to provide information or incentives to support others in supporting the user (including finding the user), or in capturing an assailant or other criminal involved in an incident. For example, the user may provide information and/or a reward for the capture of an assailant. For example, the user's support network/contacts may provide information and/or a reward for finding or assisting the user if they are lost or in an emergency situation. Bounties for leading to the identification and/or capture of an assailant may be made public or private (e.g., shared with a user's social network, close friends, family).

Figure 20:
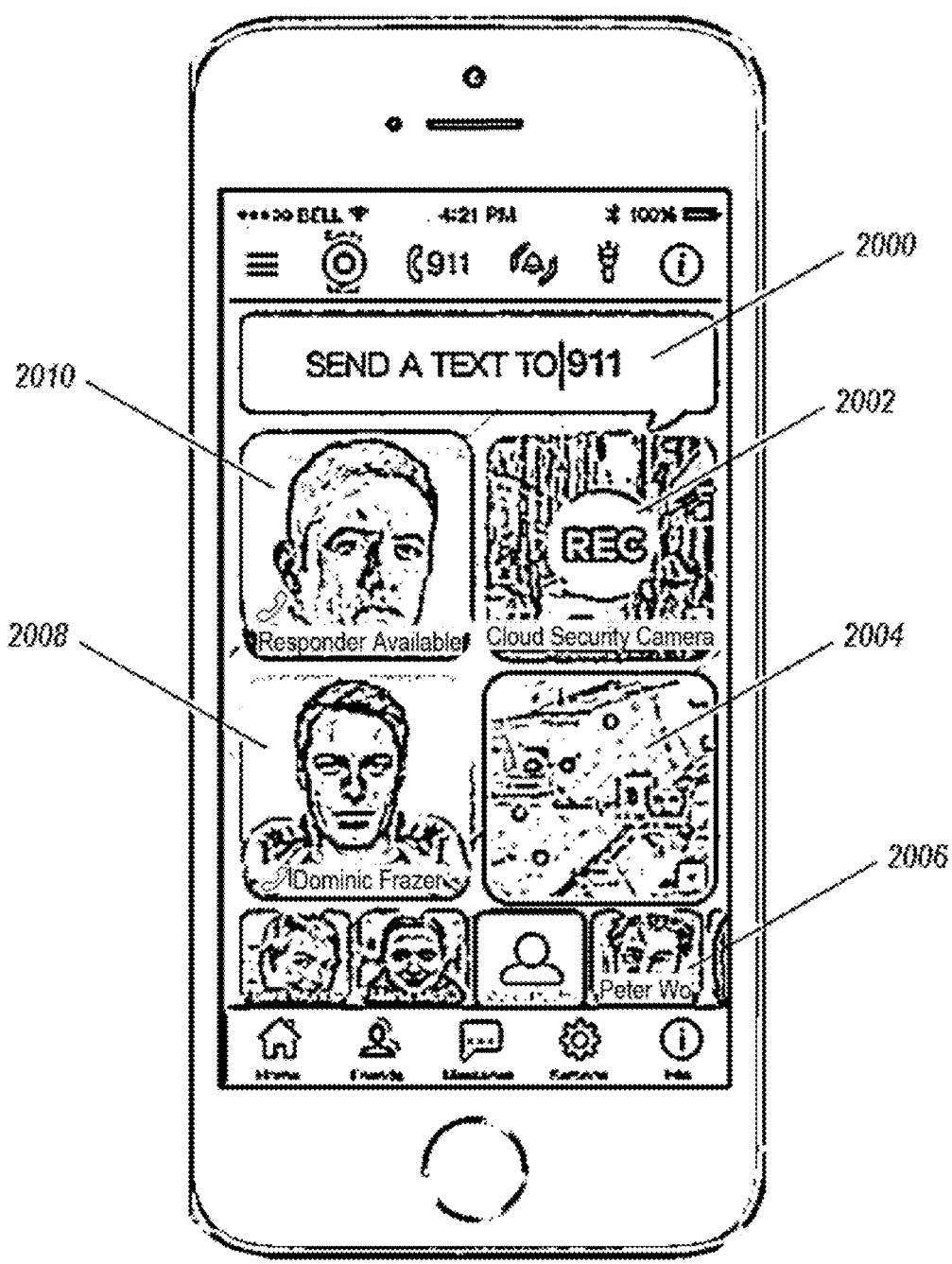
FIG. 20 is a screenshot of an example home screen for a mobile security application.

FIG. 20 is a screenshot of an example home screen for a mobile security application that includes features to send a text to 911 (2000), securely record video and/or audio to a cloud storage device (2002), view the location and status of acquaintances and/or responders (2004), select one or more acquaintances and/or responders (e.g., slider feature) (2006), contact a particular responder (2008), and view available responders (2010). These features can be static and/or dynamic. For example, the feature 2004 may show an updated map with nearby and current acquaintance/responder locations.

Figure 21:
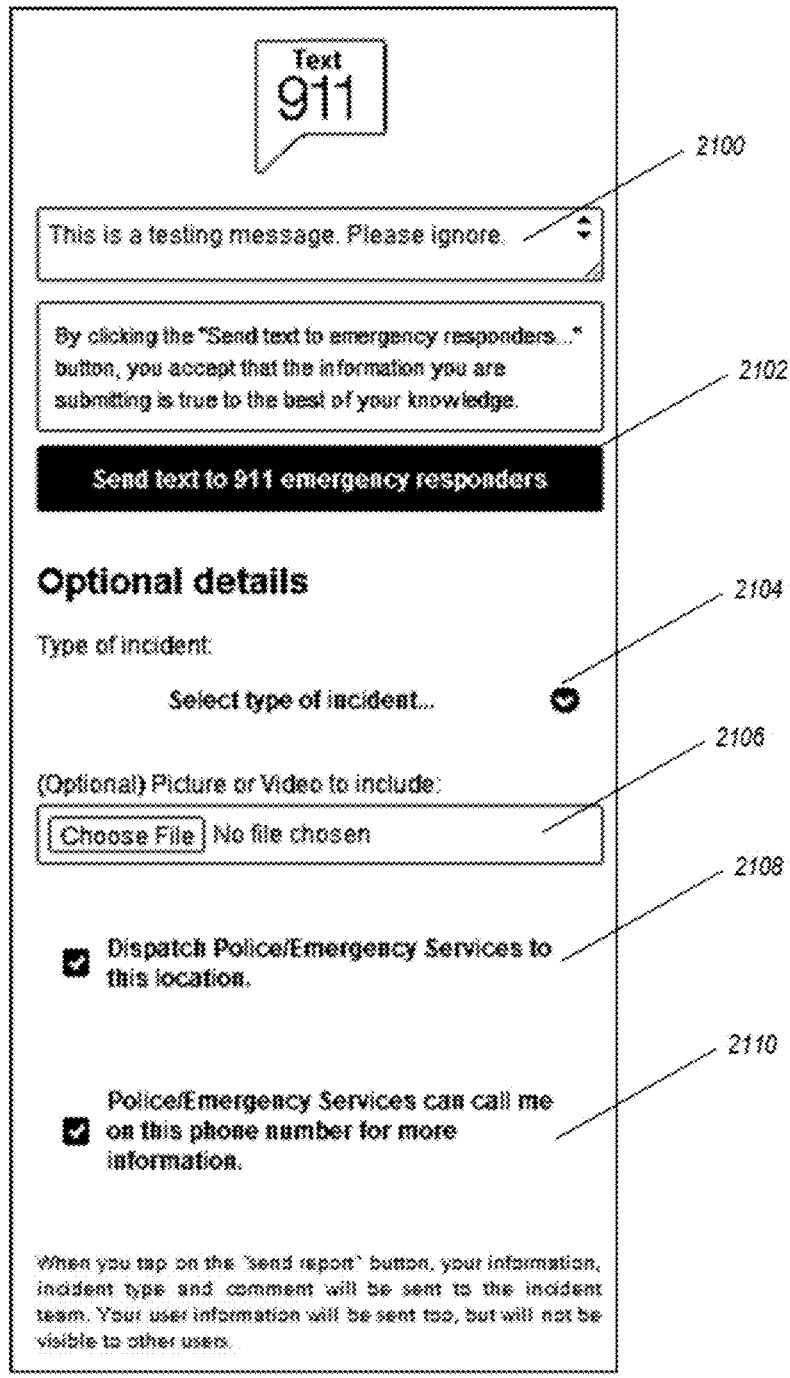
FIG. 21 is a screenshot of an example user interface through which a user can enter and transmit a text message to emergency responders.

FIG. 21 is a screenshot of an example user interface through which a user can enter and transmit a text message to emergency responders, such as 911 emergency services. The example user interface includes a text field into which a user can type a message (2100), a button to send a text message to emergency responders (2102), a dropdown menu through which a user can select one or more predefined incident types (e.g., crime, medical emergency, accident) (2104), an interface through which a picture, video, or other media (e.g., audio file) can be captured and/or selected for transmissions (2106), a selectable feature through which a user can indicate whether police or other emergency services should be dispatched to the user's location (2108), and a selectable feature through which a user can indicate whether police or other emergency services can call the user for further details (2110). Other features can also be included in the user interface that are not depicted in this screenshot, such as depicting a map of the user's current location, which can be modified and/or annotated (e.g., add location identifiers and descriptions to map) by the user and captured for transmission to the emergency service (e.g., screenshot of the map as modified/annotated by the user); fields through which a user can select and/or enter his/her current address; and/or a button through which a user can record a voice message that is either sent as audio or as text (using speech to text) to other users.

An affiliate program may be used to provide rewards (e.g., money, credits, free services) to users who refer the service to other users who sign up. For example, users may broadcast the service to their acquaintances on one or more social networks. Compensation may be provided beyond first level recipients of the referral. For instance, second tier acquaintances (friends of friends) who sign up may provide compensation to the original user who promoted the service, but at a lower level of compensation than for first tier acquaintances. Such tiered sharing/promoting of the service can be used to provide a user with a personal impact map that depicts the locations of people who signed up based on their referral, either directly or indirectly. Users signing up may be color coded based on the level at which they were referred by the original user (e.g., first tier referrals can be red, second tier referrals can be orange, third tier referrals can b green).

In another example, black box style tracking of a mobile device can be used to provide information about the user's situation at a later time that has been transmitted to a remote location, such as the user's locations, battery levels, photos, audio, video recorded from the device, calls, texts, other activities that may be helpful in determining if the user is safe or in danger, and their location.

In another example, particular billing and business practices can be used to charge users for this service and technology on a subscription basis. For example, users may be charged for the purchase or use of this technology, may be charged based upon connection time, recording time or volume, or number of connections, or a combination of these.

Virality, Affiliates

Users of this system may be encouraged to have their family or friends also sign up to use this service, and to download apps/software to do so. They may be provided with incentives to engage others in this service. It may be that the family or friends need software or hardware provided by this invention to most effectively support the user (for example receiving real time push notifications, map locations for the user, one-way or two-way video, etc.). This may also allow the family or friends to thereby become users themselves. The family or friends of a user may be able to have access to the users information, or they may only have access to select information about the user, as selected by the user in their preferences, or they may only have access to the information about a user at times or circumstances selected by the user (e.g. if the user has indicated an emergency, then their contacts get access to their location or other information), or they may only have access to the information about a user at times or circumstances selected by an emergency responder (e.g. if the emergency responder has indicated an emergency, then their contacts get access to their location or other information), or they may only have access to the information about a user at times or circumstances selected by another contact or member of this service (e.g. if a selected contact or service provider has indicated an emergency, then their contacts get access to their location or other information).

Pricing

All of the services in this invention may be priced separately, or provided for free, or bundled into different plans, or service levels, or using tiered pricing, or using country-specific or location-specific pricing. In one embodiment, features requiring recording or storage of certain information may be priced at a premium. In one embodiment, features requiring a human responder may be priced at a premium. In one embodiment, users may be charged a daily, weekly, monthly or yearly subscription fee for the use of the service. In one embodiment, users may be charged a per-minute, per-hour, per-day, per-week, per-month, or per-year usage fee for using any of the technologies features. For example, a user may be charged per-minute for recording in ready mode, for having access to a responder in ready mode, or for being in communication with a responder in ready mode.

Licensure

In one embodiment, this technology may be provided as part of a licensed service, including licensing the provider as a private patrol operator, burglar alarm or other alarm company, personal emergency response service company, private security or bodyguard company, or other types of licensing in certain jurisdictions. In one embodiment, this technology may be provided as part of a licensed service, including licensing the provider company as a private patrol operator, burglar alarm or other alarm company, personal emergency response service company, private security or bodyguard company, or other types of licensing in certain jurisdictions.

Geofencing and/or Location of User

In one embodiment, certain aspects of the service may be provided only when a user is in a given jurisdiction, or within another geographically-defined region (for example using geofencing) where the provider is appropriately licensed to provide this service. Examples of appropriate licensing include holding a state burglar alarm license, a private security license, or a personal emergency response system (PERS) license. In addition, in one embodiment the service selects a responder who is appropriately licensed for the jurisdiction that a user is physically located in. For example, if a user is located in the state of California, a responder is selected who is appropriately licensed to operate in the state of California. This selection of the responder may involve looking up responder licensing information for each responder in a database stored on a server, or using data on the mobile device of the responder. Responder groups may be defined that include responders licensed for certain jurisdictions, and when a user is in that certain jurisdiction, they may be connected with responders within a responder group appropriate for, or licensed in, that jurisdiction.

In one embodiment, the provision of service may be restricted to certain geographic regions where the user is located. In one embodiment, certain aspects of the service may be provided only when a user is in a given state, country, municipality, within a set distance of a defined position, or within another geographically-defined region (for example using geofencing).

In one embodiment, the user's location, user's language or user's language-preference may be used to select a responder based in part based upon the responder's spoken language(s) or the responder(s) location.

Examples of Hardware and Software

This disclosed technology provides for a number of different hardware devices, software applications, databases, connections, and other technologies that may be used alone or in combination. These include: mobile computing devices (e.g., mobile phones, tablets, cameras including video cameras, wearable computing devices, PDA's and other current or future devices), connection hardware (e.g., devices that may communicate via any type of existing or future wired or wireless communication method, including WiFi, Cellular (3G, 4G, LTE, 5G, etc.), internet, web, Bluetooth, etc.), web devices and/or computers (e.g., computers, servers, databases, and other hardware and software, such as computers and servers that run software that communicates and/or stores the information described), networks (e.g., wired and/or wireless networks including peer-to-peer, server-client, and other network architectures), cameras and microphones (e.g., any type of camera, microphone, speaker, lights, monitor for collecting and communicating information, such as public and/or private security cameras, cameras in the immediate vicinity of the user (based on the localization of the user and the cameras) may be used to gather further information about the user, or to display it to the responder or users contacts/supporters), drones (e.g., controlled or automatous drones that may collect or transmit information, such as automatous drones that are dispatched to the location of the user to provide real time video of the situation), and/or software.

Such software can include apps running on the users device, such as apps with videochat, recording, and other functionality as described, apps running on the responders device, such as apps with videochat, recording, and other functionality as described, and/or website for users. A website may be provided to allow users to do things including: sign-up, provide their information; and register their mobile device(s), select and contact members of their contact list, friends (including Facebook friends or contacts from other devices or social networks), family and supporters; track all new users or prospects contacted by a user, and it may track the ones contacted by them, so that the full diaspora of users contacted directly or indirectly by a single user may be determined, and statistics, locations, numbers may be presented to the user or others. This may also be used to incentivize a user to contact others, e.g. through affiliate marketing or direct sales approaches. Other measures of the spread of the technology and its virality may also be used, such as viral coefficients and social graphs. In another example, the software may be programmed to view or share information that they have recorded during prior incidents, such as audio/video, maps of their location, to view or share information recorded or shared by other users (e.g. re-sharing information), to pay or receive payment for the use of this service, or pay for calls/time or other content, to be a website for responders (e.g. a website may be provided to allow responders/supporters to do things including: sign-up, provide their information, register their mobile device(s), select and contact other users who have selected them to be supporters or responders, such as their friends, family, or members of the public, view or share information that they or users have recorded during current or prior incidents, such as audio/video, maps of their location, and/or pay or receive payment for the use of this service, or pay for calls/time or other content). The software can additionally include social network/social network apps for users/responders. These will allow users, their networks, and responders to communicate and to share information from this invention.

The disclosed technology can also be used on non-mobile computing devices, such as desktop computers, either through dedicated software, or through a web browser, or through a portal or social network app. For example, a desktop computer can be used to do things like send out a request for connection through a social network, and have the recipient click a link that starts an app (including one that is hosted remotely so that they don't have to download it) and allows them perform the functionality discussed throughout this document. Such interaction on a desktop computer can be performed by a webapp, which can be run within a webbrower, within dedicated software, and/or through social media applications (e.g., FACEBOOK app). WebRTC, HTML5, Browser and Social Functionality Additional technical features that can be used to implement this technology include WebRTC, which may be adapted with specialized code for cross-platform used, and Hybrid HTML5, which can allow for access to both native and HTML5 functionality on mobile devices. Plugins of such technologies or different technologies may also be used. WebRTC may be used for secure transmission of data, audio, video, messages, including two-way videochat, audiochat, and messaging. This information may all be recorded either locally on a user's device or responder's device. This information may all be recorded simultaneously to a remote server, including by initiating an additional webRTC connection to said remote server that streams all data to the remote server simultaneously with the two-way communication between a user and a responder. WebRTC can be used with the disclosed technology to securely transfer audio, video, data, messages, locations, images. This can be done in web browsers, using HTML5, in native IOS, ANDROID, Windows Phone, or other appropriate code. Plugins can also be used, such as those for Phonegap, Titanium, and/or Intel XDK.

The disclosed technology may additionally include a personal alarm light. This alarm light may include a flashing light. In one embodiment, this may be the 'flashlight' of a mobile phone, programmed to have a repeating flash pattern. This repeating flash pattern maybe 800 msec on, 200 msec off duty cycle. This repeating flash pattern maybe 500, 600, 700, 800, 900, 950, 990 msec on, and the balance of one second off. This flash pattern may serve as an indication that a user is using the technology. For example, this flash pattern may serve as an alarm warning light.

Device Carriers and Holders

The disclosed technology may additionally be combined with physical holsters/carriers that can be used to obtain consistent recording of a user's surrounding environment for a particular use. For example, a lanyard can be used to allow for hands free recording and operation of a mobile device. In another example, a dash cam mount can be used to allow for hands free recording while operating a vehicle. These holsters/mounts can include battery extensions (back-up power sources) and the placement of a device in these units may be detected by the device, which may in turn automatically enter a particular mode of operation.

Notifications Based on User Location

The disclosed technology may additionally include providing notifications when a user arrives at a particular geographic location or area. For example, when a user arrives home at the end of the night, a notice of the user's safe arrival may be provided to one or more other users/responders. Selection and designation of such a target location for notification can be performed by a user him/herself or by another users (e.g., responder). Additional alarms may be set and triggered if the user does not arrive at his/her destination by a particular time or within a particular window of time. In response to a user not arriving at a particular location within a particular time, other users may be notified and/or may automatically be entered into a communication session (e.g., text message session, video chat) with the user.

Training, Exercises

The disclosed technology may additionally include one or more training exercises to educate users on how to properly use the technology in the event of an emergency. Such exercised may take the form of text, audio, or video. Such exercised may take the form of games, simulations, or exercises. These simulations may train the user in scenarios designed to be similar to real-world emergency scenarios, so that in the event of a real emergency a user will already know how to react. In one example game, similar to the common game 'assassin' or 'killer', each user in a group may receive the name of another user in the group, with no users knowing who has their name. The objective of the game can be to tag the person whose name a user has by capturing a sufficiently clear and steady image or video of that user. Once that user has been tagged, then the user gets the name of the person they just tagged to be their next objective. The game can continue until there is one remaining player. The game can teach users how to properly operate the device under physically stressful and chaotic situations, which may mirror a real life scenario.

Games

In one example of a game, which may be used in training users to use this technology, augmented reality may be used to simulate situations of emergencies, crimes, or assaults. The user may use their device within the game in a similar way to which they would use their device in a real emergency situation. The user may receive a score, or feedback, based upon how well they used the device in the simulated situation. In one example of an augmented reality game the video camera of a mobile device may be used to simulate a gun (similar to the augmented reality game phonegun or a first person shooter type game), or to simulate a camera on which a user must 'catch' (by photographing or capturing on video) another user or a specified object or location.

Social Networks

This technology can be integrated with one or more social networks (e.g., FACEBOOK, TWITTER), such as for communication, status information, message broadcasting, and other features. Privacy of the users can be maintained, with access to a user's personal data and device access being restricted to only those users or user roles (e.g., fireman, police officer) that the user has explicitly designated. Additionally, the technology may not allow for a remote user to gain access to any private data that may be stored on a user device. The communication, settings, and automatic determinations that are made by this technology can be transparent and clearly identified to users.

A link or invitation may be sent to a first user to directly initiate a communication session with a responder. This link may be sent by email, SMS/text message, social network, or other electronic means. When the responder receives the link, including whether or not they have software installed on their local machine, they may click on the link or otherwise initiate communication using software that is stored on their local device, or software that is stored remotely from them and served to them via computer network. This may include either the user or the recipient using browser or social network plugins.

Lie Detection, Other Forms of Evidence

This technology may additionally be used in conjunction with lie detection technology, such as lie detection based on physical changes and stresses, such as blood pressure changes, breathing rate changes, heart rate changes, vocal pattern changes, and/or changes in eye movements, or brain wave (EEG, HGI) or brain scanning technologies. For example, if someone is identified as a suspect in a crime or other event using the technology, this may be verified at a later time through lie detection technology. This technology may additional be used in conjunction with other forms of evidence, for example forensic evidence, DNA evidence, digital surveillance evidence, location evidence or others. In one example, if someone is identified as a suspect in a crime or other event using the technology, this may be verified at a later time through corroboration with other forms of evidence.

Incentive Program

An incentive program can be provided to encourage participation and assistance of other users. For example, users could receive rewards (e.g., awards, badges, points, financial rewards, credits towards payment for software or use of services, credits towards payment for time using this technology) for contacting another user to inform them of the application, for encouraging them to download or sign up for the application, or for assisting another user in need through using the application. Such rewards could be redeemed for something (e.g., travel voucher, gift card) or publicized (e.g., press release with user's consent, national/regional award for good Samaritan). For example, a user could have displayed on a webpage how many other users they have invited to use this system, or how many other users they have as 'Friends' within this system, or how many other users have selected them as a responder or to be on a responder list.

Additional Data Sources for Geotargeted Alerts

Additional and/or alternative data sources can be used to provide geotargeted alerts to users who are located within one or more relevant geographic locations. For example, data sources providing information about emergencies (e.g., national emergency monitoring system) and/or weather-related events (e.g., weather/meteorological systems) can be accessed or can push information to this system and, when an event with at least a threshold predicted or occurring level of severity is identified, users that are located inside or within a selected distance from the affected area can receive an alert (e.g., message, recorded message, push notification) to inform them of the event, and people whom they have designated (for example their friends) can also receive a notification.

This technology can also be used with prosthetic devices, such as prosthetic devices that are controlled through brain-computer interfaces (BCIs). Aspects of the device may be controlled by BCI rather than a conventional user interface such as a touch screen. For example, data from such prosthetic devices may be provided to and used by the technology described above.

Speech to Text/Text to Speech, and Translations

Where appropriate, speech to text and text to speech technology can be used to convert speech to text for transmission/presentation to other users/devices, and to convert text to speech for presentation on user devices. Speech to text and text to speech operations can be performed locally on a user's computing device and/or remotely on one or more remote computer systems (e.g., central computer system). Additionally, translations from one language to another can be performed on speech and/or text, so as to facilitate communication between users speaking different languages. Likewise, such translations can be performed locally and/or remotely from a user computing device.

Facilitating Cross-Jurisdictional Assistance

As discussed above, the ability of a responder to assist within a particular jurisdiction based on licensure may be checked before connecting a user with that responder. Cross-Ls jurisdictional assistance (e.g., responder outside of user's jurisdiction providing assistance through application) may be facilitated by providing a variety of features, such as through recording security sessions, providing information to emergency authorities about ongoing cross-jurisdictional assistance, providing information to a court (e.g., to get approval), providing the responder with access to an appropriate PSAP for the user, using Ready Mode, allowing the responder to be automatically selected from a list, allowing the responder to see user's location, including as it changes and during video connection, the ability to 'cancel' repeated signals from a caller, rather than contact 911 multiple times, and/or the ability to follow up with the user later/the next day.

Call Center, QA/QC

In an example use case, the disclosed technology can be used in with call center and QA/QC functionality. For example, the disclosed technology provides for a network of responders working in a call-center environment, or working remotely at dispersed locations. The technology may be used in combination with all aspects of call center technology and best practices. Some aspects are described in: Call Center Management on Fast Forward: Succeeding in the New Era of Customer Relationships (3rd Edition) by Brad Cleveland, Layne Holley and Michael Blair (May 8, 2012), included by reference. In particular, the technology provides for: recording/archiving of the incoming and outgoing communication by each responder and for each user, rating/grading of each communication and each responder by users or by other raters, measurement of all parameters of each call and each responder including those typically used in call centers, including average utilization, latency to answer, length of call, quality of interaction, time to dispatch services, time to determine and document nature of call, and others. For remote responders, including responders to the scene, measurement of time from when call was received until responders arrived on scene, performed their duties can be made. This measurement may include determination of time of arrival on scene using localization technology as provided.

One-to-Many, Many-to-One, Many-to-Many

In another example, the disclosed technology can be used in a variety of different communication contexts, such as one to many, many to one, and many to many communications. For example, a single user may use this technology to communicate any of the information described to a plurality of recipients, either in real time or later. A plurality of users may use this invention to communicate any of the information described to a plurality of recipients, either in real time or later. For example, many users at an emergency scene may all be videotaping the scene from different angles. A single responder, or a team of responders, may select all of these users and see all of their information in coordination, for example on the same screen. This technology provides for selecting which users to coordinate in this way.

A single responder may use this technology to communicate any of the information described to a plurality of users, either in real time or later. For example, if many users are at the same crime scene, a single responder may use their locations to determine that they are all at the same scene, and to handle the situation in a unified way, communicating with all of the other users at the scene, or selecting all users within a fixed distance from a chosen point, and all of the other responders involved in the incident. The responders, or users, may select which other users or responders to including in one-to-many or many-to-many communication.

It is possible to use this technology for many to many communication, so that for a given group of users and responders, all information communicated by one member of the group is communicated to the others, in real time or later, so that the group may coordinate their efforts. This may take place by group audioconference or videoconference or text message or recorded audio message. This may take place by group members sending information to other members of the group for later retrieval, for example sending group messages, notifications, emails, etc.

With Other Services Including Mobile Fleets and Providers

In another example use, this technology can be used in coordination with other services that use mobile fleets of vehicles or personnel. For example, this technology described in this document may be used in combination with other service providers, such as taxi cab providers, car sharing and car services (e.g., UBER, LYFT, FLYWHEEL, GETAROUND), police dispatch, package delivery services (e.g., UPS, FEDEX), and/or mobile military units.

This technology may allow a user to signal that they want a mobile provider dispatched to their current location. Such a signal may be provided to members of mobile fleets who are selected based on a variety of factors, such as distance between members of the mobile fleets and the user (e.g., provide signal to members within a threshold distance of the user). For example, if the user wants help, a signal may be sent from the user's mobile computing device to a taxi cab or car service so that some or all drivers are alerted that the user is requesting a pick-up, a witness, and/or other assistance. In another example, a signal from a user's mobile computing device can be provided electronically via a computer network to a car service, such as the UBER service, in order to have a driver from the service dispatched to the location of the user. In a further example, a signal from a user's mobile computing device can be provided electronically via a computer network to a taxi cab service, such as the FLYWHEEL service, in order to have a taxi driver dispatched to the location of the user. This technology may provide a reward or incentive to members of the mobile fleet to arrive at the scene and/or provide assistance or pick-up to the user. This technology may also allow for members of the mobile fleet to 'accept' this reward, optionally making the reward no longer available to other members of the mobile fleet, and to be dispatched to the user's location.

This technology may also be used by members of a mobile fleet for their own protection, and/or for the protection of property. Example mobile fleet users can include taxicab drivers, car service drivers (e.g., UBER, LYFT, others), postal service workers, and/or delivery service workers (e.g., FEDEX, UPS, couriers).

With Video Tracking Technology

This technology can additionally and/or alternatively be used in coordination with videotracking technology to 'track' the location of a user by a camera that is not connected to the user. The camera may be stationary or may moving, such as being mounted to a moving vehicle, a flying vehicle, and/or a drone.

A user using the technology described herein may subscribe to a service for videotracking so that their safety or image may be monitored by a remote camera. The remote camera may maintain visual imaging of the user, including tracking the position of the user in 3D, panning, zooming, centering, and maintaining focus on the user. This may be accomplished in any of a variety of appropriate ways, such as through the use of a dedicated tracking tag which allows the system to track the position of the user via a variety of techniques and systems, such as geolocation technology (e.g., GPS-based and/or WiFi-based location technology); accelerometers; computation of accelerometer signals to estimate velocity and position; tracking of the location of the camera, tracking of the location of the user; tracking of the location of the camera relative of the location of the user; and/or WiFi, cellular, and/or other radio, light-based, or other signaling to communicate information between the user, a tag, a computer network, and/or hardware controlling the position or functioning of the camera. Example systems for remote video tracking that may be used include SOLOSHOT, including the SOLOSHOT2 and SOLOSHOT3 systems. The technology disclosed in this document can use a plurality of cameras configured so that the camera best suited to track the user (e.g., the camera closest to the user and/or with the best/clearest view of the user) is selected and used to track a user. Additionally, camera-based tracking can be used for a plurality of users such that the one or more cameras that are best suited to track each of plurality of users at a given time and location can be selected and used. Mobile communication devices described throughout this document can be used to provide location information that is used to track the location of users. For example, a mobile computing device such as a cell phone (e.g., smartphone) and/or tablet computing device, mobile watch, and/or other mobile communication device can be used to determine the location of an associated user relative to a remote camera and this location information can be used so that the user may be tracked and video recorded by a remote camera that is not connected with and/or controlled by the user. Video registration, video processing software, object recognition, and/or face recognition can also be used with video tracking and recording of a user. Information about a user/object that is being tracked, such as the position, acceleration, velocity of a user, object, and/or piece of property which is being tracked from a remote device, can be communicated to a remote camera controller so that the camera may maintain video monitoring of the user (or other object that is being tracked). For example, the communication may take place via a cellular, WiFi, and/or Bluetooth radio signal from a mobile device to a remote camera controller. A camera mounted on or about one user or vehicle may be used for monitoring of another user or vehicle. The disclosed technology can be used for continuous video monitoring of stationary or moving people, objects, vehicles, or pieces of property.

With Other Services Including Security, Government, Emergency Responders, Military In another example use, this technology can be used for coordination with other services including government services. For example, this technology provided here may be used in combination with other service providers. These may include:

Security companies. This technology may be used in combination with existing security services. For example, fixed security cameras can be augmented with this technology so that while someone is being monitored on a security camera, a security guard or police officer can interact with that person by one-way or two-way audio or video.

Government Emergency Call Centers. This technology may be used in combination with emergency dispatch centers (e.g. US 911 centers). Calls, information, video, audio, text messages, user location and information may be manually or automatically routed directly to a government emergency call center for further processing or dispatch of emergency personnel or other reasons.

Military Communication. This technology may be used in combination with military communication networks and in military contexts. Calls, information, video, audio, text messages, user location and information may be manually or automatically routed directly to a military emergency network or call center for further processing or dispatch of personnel or other reasons.

Direct communication with responders. Information may be provided directly to emergency responders. For example, if an emergency signal is sent out by a user, it may go directly to the mobile device of nearby police, providing them with any important captured information, including but not limited to the location of the user having the emergency, the identifying information of the user, any video, photos, or audio about the incident, or other useful information. This may help the responders to aid a user or victim, or to apprehend a suspect. The hardware and software may automatically detect the available responders closest to or in the best position or skills to aid with the incident.

In another example, this technology may be used in war, combat, disaster and anti-terrorism situations. For example, the technology provided herein may be used in military, police, war, combat, disaster and anti-terrorism situations to provide important information in real time and aid in these situations. Information from multiple users may be coordinated by central locations, for example displaying on a centralize map where all responses or users are coming in from, and allowing communication amongst them. This technology may have application in preventing violence within the military, including preventing violence against women perpetrated by other members of the military. This technology may also be used in real or simulated military or combat environments, including in military training, or war games, including civilian combat games like paintball, laser tag or others to coordinate teams, determine locations of users, and allow single or group communication by audio, video, text message or use of the other technology features.

Demonstration of Innocence or Guilt

This technology may be used to demonstrate a user's innocence (or guilt) in a crime or other incident. For example, if a user is using this technology, and this verifies the user's location at the time of a crime as being distant from the crime scene, this may be used to establish the innocence of the user. This may be enhanced through verification technologies that ensure that the user is physically present at the same location as the mobile device that is transmitting the location, including biometrics such as a fingerprint scanner, an iris scanner, face recognition or capturing an image or video of the user. In addition, this may be enhanced through verification technologies that are physically attached to the user, such as an ankle bracelet that communicates with the device through a wireless connection and verifies that the user is at the same location as the device, and thereby verifies that the user was or was not at a crime scene.

Lite Messaging

This technology may allow a user to send a "lite" message to initiate communication with other users in a manner that does not require the other users to have a particular application installed on their computing devices—allowing users to rely on and use the participation of other users who have not installed or registered to use a particular application (e.g., mobile security app). For example, a user can send out a lite message, for example, over email, SMS, social network messaging (e.g., FACEBOOK messaging, TWITTER), with the message including a selectable feature (e.g., link) that the recipient can select to immediate begin a connection with the sending user using existing technology on the recipient user's device (e.g., connection without the recipient user having to download/install a particular application). Selection of such a link can cause the recipient's device to identify one or more compatible technologies to use to communicate with the sending device. Such lite messaging can allow for users to send messages that create such links between the two users and to be able to use the functionality very easily and without much interaction by the recipient user (e.g., able to connect with sender with no more than 1, 2, 3, 4 clicks and/or 0, 1, 2, 3, 4 entered pieces of identification or information). In one example, a user (calling user) can send a message including a URL link through a messaging platform (email, SMS, Facebook, others) to a responder. This URL link can contain information specifying the sender, or the sender and responder, or the sender, responder. The URL link can also optionally include additional information, including information about the kind of communication being requested, the nature of the situation or topic of communication, the means of communicating, the locations of one or both users, encryption information (for example including a public key), or other information. When the responder receives this message, the responder can click on the URL link. This can bring up in the responders browser a way to communicate with the user who sent the message. For example, the responder's click's the link this can bring up on the responder's browser or on other software on their desktop, mobile device, tablet or wearable device a web page, an app, a widget, or another way for them to communicate with the calling user who sent the message. This web page, an app, a widget, or another way for them to communicate with the calling user may not require download if sufficient resources are already available on the responder's device. If sufficient resources are not available, then those resources may be provided to the responder, for example by the responder clicking on the link, for example by a website being sent to and displayed for the responder. This may not require the responder to take additional steps to install software on his device. When this web page, app, widget or way for the responder to communicate with the calling user is displayed, it can already be connected with the user who sent the message, or it can pre in a state ready to quickly form that communication connection, for example it can be pre-populated with the calling user's id or network address. The web page, app, widget or way for the responder to communicate with the calling user can display a message asking the responder if the responder would like to communicate with the calling user, or this communication can be begun automatically. If the responder selects that they do want to communicate with the calling user, then communication can be begun.

The disclosed technology may be implemented as part of a mobile personal emergency response system (PERS).
With News Information The technology described in this document can additionally be combined with news information for the current locations of users to provide a dynamically updated news feed and alert system through which users can be updated on events that may affect the health and safety of other users. For example, a dashboard user interface can be provided through which a responder can receive news updates for events that occurred in or around (e.g., within a threshold distance of) the location of other users that the responder is following. The news updates can be for events that may affect users located nearby, such as events that may negatively impact the health, safety, or well-being of people located nearby. The selection of news or information for a user may be based on a number of factors, including the proximity of the event to the user, the relevance to the user based on their selected preferences or their prior usage patterns, and/or selections made on their behalf by a friend, responder, and/or family member. For instance, news updates can be provided to a person and/or to their friends located near an event of natural disasters (e.g., tornadoes, hurricanes, earthquakes, floods, snow or blizzards, ice storms, thunderstorms, straight line winds, forest fires, tsunami), crime (e.g., reports of gun shots, terrorist events, bomb threats, robberies, car thefts, riots, arson), man-made disasters (e.g., bridge collapses, gas line ruptures/explosions, plane crashes, car crashes, boat accidents, train derailment), and/or other events (e.g., school or business closings, traffic or transportation delays, periods of bad air quality, water supply contamination) that may negatively affect people located nearby.

As an illustrative example, a parent serving as a responder for his/her children can receive news updates and alerts regarding events that occur near the current locations of his/her children and that may affect the well-being of his/her children. Such news updates can be dynamically adjusted as the children move from one location to another. For instance, if a first child is currently located in San Francisco and a second child is current located in Los Angeles, the news updates can be for events that occur in or around (e.g., within a threshold distance of) San Francisco as reported for the first child, and the news updates can be for events that occur in or around (e.g., within a threshold distance of) Los Angeles for the second child. When the first child subsequently takes a trip to New York for a week, the news updates over that week can be dynamically and automatically adjusted to be for New York and Los Angeles. When the first child returns to San Francisco, the updates can again be dynamically and automatically updated to be for San Francisco and Los Angeles. The location information for the children can be obtained and updated according to the techniques and using the components/systems/devices described throughout this document, for example, based on GPS geo-location provided by a mobile device, tablet, or smartphone.

Risk levels indicating the level of severity of the events can be provided with the news alerts. For example, news of a tornado around the current location of a user can be accompanied by a "high" risk level indicating that the event (tornado) posed a great risk to the health and well-being of people nearby. In another example, news of a thunderstorm with the chance to cause minor flooding can be accompanied with a "low" risk level indicating that the event (thunderstorm) posed a low risk to the health and well-being of people nearby. Risk levels can be determined manually and/or automatically, such as through keyword and/or phrase analysis, and/or natural language processing to match news alerts to predetermined event types each with one or more associated risk levels.

In addition to being provided to responders, news updates and alerts can also be provided to users who are currently located near events. For example, a user who is located in a city where a building fire is taking place can receive an alert regarding the fire in addition to the alert being provided to each of the user's responders.

News updates that are displayed/presented to users and/or responders can be controlled by such people. For example, a responder may set a filter to only display events that have a "high" risk level. In another example, a user may set a filter to display all events that occur nearby but to only display events that are located near other users for whom the user serves as a responder and that have "moderate" to "high" risk levels. Similarly, push notifications (and other notifications) can be provided to users and/or responders, and people can designate when such notifications (e.g., particular types of events, risk levels) are to be received. Both the users and the responders may control who receives notifications, whether notifications are on or off, and what the threshold for risk level or distance from the user is for an event before a notification is sent.

Additionally, information from a user's computing device that indicates whether a user is alright (e.g., unaffected) following an event can be obtained and used to provide responders with some sort of initial indication as to the well-being of the user. For example, following a natural disaster people with friends living in/around the area of the natural disaster may experience an immediate spike in their stress levels because they do not know whether or not their friends are safe. Information can be obtained from the mobile computing devices of such friends before, during, and/or after such events to provide an initial indication to the remote responders as to whether the friends are alright. A variety of information can be analyzed to provide these indications, such as a user's interaction with his/her mobile computing device (e.g., providing input through the touchscreen, adjusting settings on the device, adjusting the volume of the device, using the device's features, using the device to communicate, for example, using the device to place or receive a call, send a message, or access online content), detected movements of the device (e.g., detected motion consistent with walking, detected motion consistent a user carrying the device in his/her hand, detected motion consistent with driving in a car), and/or other information obtained from the device (e.g., changes in the orientation of the device, detected voice of the user). An indication of the user being alright (e.g., safe) may be the time since their last use of the device in any of the listed fashions. Additionally, the geographic location of the friends, as provided through the friends' mobile computing devices, can be compared to the locations/areas at which events have/are occurring to provide additional indications as to whether the friends have been affected.

Additionally, in the event that someone has been alerted to a potential danger for one of their friends, they may send a message to their friend using this system to inquire if that person is ok, for example with a one-touch button or virtual button to send a message. The recipient of such a message may also use this system to indicate that they are (or are not) OK, for example with a one-touch button or virtual button to send such a reply. Additionally, a professional responder may contact a user or their friends through this system in order to offer assistance in the circumstance that the user's estimated safety level falls below a set threshold. For example, a responder may send a message to all users within a certain radius of an event (or to the friends/family of these users) with the message explaining the situation, and/or providing a button that they can press to indicate whether they are ok to the responder or to others (e.g. friends), or to connect with the responder or to others (e.g. friends) in order to receive further assistance. This can be accomplished manually by a responder, or may be accomplished automatically through software that contacts a user on behalf of a responder, friend, or professional responder.

Additionally, a mobile computing device of a user for whom news updates and alerts are being provided to responders can provide additional details regarding the current surroundings of the user to the responders, such as automatically taking and providing pictures to the responders, recording and providing audio, and/or recording and providing video to the responders.

A user's group of responders may include additional users not explicitly designated by the user, but who have an association/membership within a group or organization that makes them trusted. For example, a student at a university may be able to designate all other students at the university as being responders. In this way, if a person (e.g., a student at a university) has an emergency, they may be able to send out a message to the nearest members of a group (e.g., other students) so that whoever is close to the scene can come to assist them. In addition to dispatching drones and other vehicles to the locations of users to monitor the users by video and other information feeds, autonomous automobiles (e.g., autonomous cars) can be dispatched to the locations of users to not only monitor the situation, but also to provide safe transit from the location for the users, including emergency transit (e.g., ambulance service).

Computing devices and computer systems described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connector that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display 616 (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A computer-implemented method for providing personal security features to a user of a mobile computing device, the method comprising:
    receiving, at the mobile computing device, input from the user of the mobile computing device that indicates a safety incident is occurring that poses a potential threat to the user's personal safety;
    determining, by the mobile computing device, a location of the mobile computing device using one or more data sources;
    receiving, at the mobile computing device, information that indicates whether responders are currently available for the user of the mobile computing device;
    when it is detected that no responders are currently available, taking an appropriate alternate action;
    communicating, by the mobile computing device, with another computing device as part of a two-way audiovisual teleconference over a first network connection, the communicating including transmitting the location of the mobile computing device;
    displaying, as part of the two-way audiovisual teleconference, real-time video from the another computing device, wherein the real-time video is output by the mobile computing device in a manner to convey to one or more people involved in the safety incident that a remote user of the another computing device is observing the incident in real time;
    recording video of the safety incident using one or more cameras that are accessible to the mobile computing device; and
    transmitting, by the mobile computing device over a second network connection and concurrently while displaying the real-time video, the video of the safety incident to a remote storage system for persistent storage.

2. The method of claim 1, wherein the first network connection is a peer-to-peer connection.

3. The method of claim 1, wherein the another computing device is used by a particular responder, and wherein the particular responder is selected based on one or more factors selected from the group consisting of user location, responder location, responder rating, responder skills, responder training, type of safety incident, and a predefined list of responders.

4. The method of claim 1, wherein the one or more data sources is selected from the group consisting of GPS data, WiFi data, beacon signals, and data transmitted by radio frequency that is useable to electronically locate a device.

5. The method of claim 1, further comprising receiving, by the mobile computing device, a geographic location for a user and determining, using a database of locations and corresponding licensure status, whether said user is located within one or more licensed jurisdictions.

6. The method of claim 1, further comprising:
    receiving, by the mobile computing device, a request to connect the mobile computing device with a responder service;
    identifying an appropriate responder service based on a location of the mobile computing device; and
    initiating contact with an appropriate responder service on behalf of the mobile computing device.

7. The method of claim 1, further comprising
    modifying, by the mobile computing device, the video of the safety incident by adding one or more features.

8. The method of claim 1, wherein another computing device determines or receives a geographic location for a user, and identifies, using a database of locations and corresponding responders, one or more appropriate responders based, at least in part, on said geographic location.

9. The method of claim 8, wherein the database of locations is a PSAP database.

10. The method of claim 1, wherein the one or more cameras accessible to the mobile computing device are mounted to the body of the user of the mobile computing device.

11. The method of claim 1, further comprising displaying, on the mobile computing device, a map that depicts geographically associated crime information.

12. The method of claim 11, further comprising receiving, at the mobile computing device, new crime information in substantially real time, and updating the map to additionally depict the new crime information.

13. The method of claim 1, further comprising:
    receiving, at the mobile computing device, an input to connect to each member of a group of users;
    obtaining network addresses for devices that are used by the members of the group of users; and sending, from the mobile computing device, messages requesting network connections with the devices using the network addresses.

14. The method of claim 1, further comprising obtaining, by the mobile computing device, status information for one or more users having one or more computing devices, and outputting the status information, wherein the status information includes, for a given user, one or more of an image of the given user, a video of the given user, whether the given user is available, whether the given user is on a call, whether the given user is away, or whether the given user is actively using the corresponding device.

15. The method of claim 1, further comprising determining, by the mobile computing device based on the determined location of the mobile computing device, whether the mobile computing device is within a predetermined geographically-defined region or within a predetermined distance of a defined position.

16. The method of claim 1, further comprising receiving, at the mobile computing device, a request to transmit a location to another computing device, and transmitting, from the mobile computing device, the determined location of the mobile computing device for receipt by the another computing device.

17. The method of claim 1, further comprising prompting, by the mobile computing device, one or more of: (i) an audio call or video call to be initiated from another mobile computing device to a third computing device based on network address information stored in the another mobile computing device, or (ii) a message to be transmitted from the another mobile computing device to the third computing device based on network address information stored in the another mobile computing device.

18. The method of claim 1, further comprising selecting, by the mobile computing device from among a plurality of responders, one or more responders based, at least in part, on user-generated ratings for the plurality of responders.

19. The method of claim 1, further comprising:
receiving, by the mobile computing device, an input describing an incident;
collecting one or more additional details regarding the incident, the collecting comprising detecting or sensing the one or more additional details by the mobile computing device; and
reporting, by the mobile computing device, the incident, including the input and the one or more additional details.

20. A computing device, comprising:
a user interface that is programmed to receive input from a user of the computing device that indicates a safety incident that poses a potential threat to personal safety and to receive information that indicates whether responders are currently available for a user of the computing device:
one or more cameras that are programmed to record video of the safety incident:
a geographic location unit that is programmed to determine a location of a computing device using one or more of a plurality of data sources;
a network interface that is programmed to communicate with another computing device as part of a two-way audiovisual teleconference over a first network connection and to cause the video of the safety incident to be concurrently transmitted, over a second network connection, to a remote storage system for persistent storage, the location of the computing device being sent over the first and second network connections, wherein the network interface is further programmed to take appropriate alternate action when it is detected that no responders are currently available; and
a display that is programmed to display, as part of the two-way audiovisual teleconference, real-time video from the another computing device, wherein the real-time video is output by the display in a manner to convey to one or more people involved in the safety incident that a remote user of the another computing device is observing the incident in real time.

21. The computing device of claim 20, wherein new crime information is received by the network interface, and wherein the computing device further comprises an output subsystem that is programmed to output, when the new crime information pertains to one or more locations within a threshold distance of the location of the mobile computing device, a notification associated with the new crime information.

22. The computing device of claim 20, further comprising a remote control module that is programmed to allow remote control of communications functionality for the computing device by another mobile computing device following a receipt of an instruction, by the network interface, from the another mobile computing device.

23. The method of claim 1, wherein the mobile computing device is a wearable computing device.

24. The method of claim 1, wherein the mobile computing device is embedded within a vehicle.

25. The method of claim 1, wherein the mobile computing device is mounted to a wall within a home or business.

26. The method of claim 1, further comprising detecting, at the wireless computing device, a wireless signal of a another mobile computing device, and identifying the another mobile computing device based, at least in part, on the detected wireless signal.

27. The method of claim 1, wherein the input from the user is received as a voice command.

28. The method of claim 1, wherein one or more drones are dispatched to a location of the safety incident.

29. The method of claim 1, further comprising providing a reward to one or more persons, in response to the one or more persons providing assistance to the user of the mobile device.

30. The method of claim 1, further comprising transmitting, by the mobile computing device for receipt by a ride-providing service, a request for service.

31. The method of claim 1, further comprising transmitting, by the mobile computing device for receipt by an emergency response service, a request for assistance.

32. The method of claim 1, further comprising transmitting, by the mobile computing device for receipt by a ride-providing service, a request for an autonomous vehicle.

33. The method of claim 1, further comprising receiving, at the mobile computing device, a request for connection, and automatically providing the connection without prompting the user of the mobile computing device.

34. The method of claim 33, wherein the connection is selected from the group consisting of an audio call connection and a video call connection.

35. The method of claim 1, further comprising receiving, at the mobile computing device, a second input from the user of the mobile computing device that specifies a time period when a call to the mobile computing device should be received.

36. The method of claim 1, wherein the video of the safety incident is captured and stored locally at the mobile computing device, and further comprising later transmitting, by the mobile computing device, the video of the safety incident for receipt by another computing device.

37. The method of claim 1, wherein the one or more cameras are accessible to the mobile computing device via wireless communication.

38. The method of claim 1, further comprising determining using artificial intelligence an identity of a person involved in the safety incident based, at least in part, on a feature of the video of the safety incident.

39. The method of claim 1, further comprising determining an identity of a person involved in the safety incident based, at least in part, on a comparison of a feature of the video of the safety incident with information stored in one or more data sources.

40. The method of claim 1, further comprising:
receiving at the mobile computing device a message from the another computing device, the message comprising instructions to contact a friend of the user of the mobile computing device;
identifying an appropriate friend to contact; and
communicating, by the mobile communication device, with a computing device used by the identified friend.

41. The method of claim 1, wherein at least one of the one or more cameras that are accessible to the mobile computing device is mounted to a stationary object.

42. The method of claim 1, wherein at least one of the one or more cameras that are accessible to the mobile computing device is mounted to a vehicle.

43. The method of claim 1, further comprising receiving at the mobile computing device, an alert relating to an event occurring in a proximity to a location of the mobile computing device.

44. The method of claim 1, further comprising playing, at the mobile computing device, a pre-recorded warning message.

45. The method of claim 1, further comprising determining, by the mobile computing device, an identity of a person involved in the safety incident based, at least in part, on facial recognition the person involved in the safety incident.

46. The method of claim 1, further comprising determining, by the mobile computing device, an identity of a person involved in the safety incident based, at least in part, on social network information.

47. The method of claim 1, further comprising capturing biometric input from the user of the mobile computing device.

48. The method of claim 47, wherein the biometric input is selected from the group consisting of the user's fingerprint, the user's iris, and the user's image.

49. The method of claim 1, wherein at least a portion of the computer-implemented method for providing personal security features executes within a web browser.

50. The method of claim 1, further comprising:
recording, by the mobile computing device, of a parameter of the user of the mobile device's status, the parameter selected from the group consisting of the user's location, audio input, video input, one or more inputs received by the mobile computing device, motion of the mobile computing device, and a physiological input of the user; and
transmitting, from the mobile computing device for receipt and storage by the another computing device, the recorded parameter.

51. The method of claim 1, further comprising ceding control, by the mobile computing device to the another computing device, of one or more aspects of the mobile computing device for remote control of the mobile computing device by the another computing device.

52. The method of claim 51, wherein the one or more aspects are selected from the group consisting of accepting a call, playing a warning, sending a message, capturing an image, capturing audio input, and capturing video input.

53. The method of claim 1, further comprising:
requesting, by the mobile computing device, input from the user of the mobile computing device indicative of a status of the user;
communicating, by the mobile computing device with a computing device if the requested input from the user is not received by the mobile computing device within a predetermined time period, wherein the computing device is selected from the group consisting of the another computing device and a computing device of a contact of the user of the mobile computing device.

\* \* \* \* \*